US012750532B2

(12) United States Patent
Hendry et al.

(10) Patent No.: US 12,750,532 B2
(45) Date of Patent: *Sep. 29, 2026

(54) IMAGE CODING APPARATUS AND METHOD BASED ON SIGNALING OF INFORMATION FOR FILTERING

(71) Applicant: LG Electronics Inc., Seoul (KR)

(72) Inventors: Hendry Hendry, Seoul (KR); Seethal Paluri, Seoul (KR); Seunghwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 108 days.

This patent is subject to a terminal disclaimer.

(21) Appl. No.: 18/795,627

(22) Filed: Aug. 6, 2024

(65) Prior Publication Data

US 2024/0397113 A1 Nov. 28, 2024

Related U.S. Application Data

(63) Continuation of application No. 17/777,371, filed as application No. PCT/KR2020/016141 on Nov. 17, 2020, now Pat. No. 12,096,042.

(60) Provisional application No. 62/937,237, filed on Nov. 18, 2019.

(51) Int. Cl.

| | |
|---|---|
| ***H04N 19/82*** | (2014.01) |
| ***H04N 19/117*** | (2014.01) |
| ***H04N 19/132*** | (2014.01) |
| ***H04N 19/167*** | (2014.01) |
| ***H04N 19/172*** | (2014.01) |
| ***H04N 19/70*** | (2014.01) |

(52) U.S. Cl.

CPC .......... *H04N 19/82* (2014.11); *H04N 19/117* (2014.11); *H04N 19/132* (2014.11); *H04N 19/167* (2014.11); *H04N 19/172* (2014.11); *H04N 19/70* (2014.11)

(58) Field of Classification Search

CPC .... H04N 19/117; H04N 19/132; H04N 19/14; H04N 19/167; H04N 19/172; H04N 19/70; H04N 19/82

USPC .................................................... 375/240.26

See application file for complete search history.

(56) References Cited

U.S. PATENT DOCUMENTS

| | | | | |
|---|---|---|---|---|
| 12,096,042 | B2 * | 9/2024 | Hendry | H04N 19/172 |
| 2020/0228843 | A1 * | 7/2020 | Lin | H04N 19/70 |
| 2022/0394301 | A1 * | 12/2022 | Deshpande | H04N 19/52 |

* cited by examiner

*Primary Examiner* — Kathleen M Walsh

(74) *Attorney, Agent, or Firm* — Fish & Richardson P.C.

(57) ABSTRACT

A decoding method performed by a decoding apparatus, according to embodiments of the present document, may comprise the steps of: acquiring, via a bitstream, image information including residual information; generating reconstructed samples of a current picture on the basis of the residual information; and generating modified reconstructed samples by performing an in-loop filtering procedure on the reconstructed samples of the current picture, wherein whether or not the in-loop filtering procedure is performed across virtual boundaries is determined. The virtual boundaries can bring, to the decoding apparatus, advantages from a hardware perspective.

3 Claims, 52 Drawing Sheets

FIG. 14

| seq_parameter_set_rbsp( ) { | **Descriptor** |
|---|---|
| … | |
| **subpics_present_flag** | u(1) |
| if( subpics_present_flag ) { | |
| **sps_num_subpics_minus1** | u(8) |
| for( i = 0; i <= sps_num_subpics_minus1; i++ ) { | |
| **subpic_ctu_top_left_x**[ i ] | u(v) |
| **subpic_ctu_top_left_y**[ i ] | u(v) |
| **subpic_width_minus1**[ i ] | u(v) |
| **subpic_height_minus1**[ i ] | u(v) |
| **subpic_treated_as_pic_flag**[ i ] | u(1) |
| **loop_filter_across_subpic_enabled_flag**[ i ] | u(1) |
| } | |
| } | |
| … | |
| **sps_sao_enabled_flag** | u(1) |
| **sps_alf_enabled_flag** | u(1) |
| … | |
| **sps_loop_filter_across_virtual_boundaries_disabled_present_flag** | u(1) |
| if( sps_loop_filter_across_virtual_boundaries_disabled_present_flag ) { | |
| **sps_num_ver_virtual_boundaries** | u(2) |
| for( i = 0; i < sps_num_ver_virtual_boundaries; i++ ) | |
| **sps_virtual_boundaries_pos_x**[ i ] | u(13) |
| **sps_num_hor_virtual_boundaries** | u(2) |
| for( i = 0; i < sps_num_hor_virtual_boundaries; i++ ) | |
| **sps_virtual_boundaries_pos_y**[ i ] | u(13) |
| } | |
| … | |
| } | |

FIG. 15 subpics_present_flag equal to 1 specifies that subpicture parameters are present in in the SPS RBSP syntax. subpics_present_flag equal to 0 specifies that subpicture parameters are not present in the SPS RBSP syntax.

sps_num_subpics_minus1 plus 1 specifies the number of subpictures. sps_num_subpics_minus1 shall be in the range of 0 to 254. When not present, the value of sps_num_subpics_minus1 is inferred to be equal to 0.

subpic_ctu_top_left_x[ i ] specifies horizontal position of top left CTU of i-th subpicture in unit of CtbSizeY. The length of the syntax element is Ceil( Log2( pic_width_max_in_luma_samples / CtbSizeY ) ) bits. When not present, the value of subpic_ctu_top_left_x[ i ] is inferred to be equal to 0.

subpic_ctu_top_left_y[ i ] specifies vertical position of top left CTU of i-th subpicture in unit of CtbSizeY. The length of the syntax element is Ceil( Log2( pic_height_max_in_luma_samples / CtbSizeY ) ) bits. When not present, the value of subpic_ctu_top_left_y[ i ] is inferred to be equal to 0.

subpic_width_minus1[ i ] plus 1 specifies the width of the i-th subpicture in units of CtbSizeY. The length of the syntax element is Ceil( Log2( pic_width_max_in_luma_samples / CtbSizeY ) ) bits. When not present, the value of subpic_width_minus1[ i ] is inferred to be equal to Ceil( pic_width_max_in_luma_samples / CtbSizeY ) − 1.

subpic_height_minus1[ i ] plus 1 specifies the height of the i-th subpicture in units of CtbSizeY. The length of the syntax element is Ceil( Log2( pic_height_max_in_luma_samples / CtbSizeY ) ) bits. When not present, the value of subpic_height_minus1[ i ] is inferred to be equal to Ceil( pic_height_max_in_luma_samples / CtbSizeY ) − 1.

subpic_treated_as_pic_flag[ i ] equal to 1 specifies that the i-th subpicture of each coded picture in the CLVS is treated as a picture in the decoding process excluding in-loop filtering operations. subpic_treated_as_pic_flag[ i ] equal to 0 specifies that the i-th subpicture of each coded picture in the CLVS is not treated as a picture in the decoding process excluding in-loop filtering operations. When not present, the value of subpic_treated_as_pic_flag[ i ] is inferred to be equal to 0.

loop_filter_across_subpic_enabled_flag[ i ] equal to 1 specifies that in-loop filtering operations may be performed across the boundaries of the i-th subpicture in each coded picture in the CLVS. loop_filter_across_subpic_enabled_flag[ i ] equal to 0 specifies that in-loop filtering operations are not performed across the boundaries of the i-th subpicture in each coded picture in the CLVS. When not present, the value of loop_filter_across_subpic_enabled_pic_flag[ i ] is inferred to be equal to 1.

sps_loop_filter_across_virtual_boundaries_disabled_present_flag equal to 1 specifies that the in-loop filtering operations are disabled across the virtual boundaries in pictures referring to the SPS. sps_loop_filter_across_virtual_boundaries_disabled_present_flag equal to 0 specifies that no such disabling of in-loop filtering operations is applied in pictures referring to the SPS. In-loop filtering operations include the deblocking filter, sample adaptive offset filter, and adaptive loop filter operations.

sps_sao_enabled_flag equal to 1 specifies that the sample adaptive offset process is applied to the reconstructed picture after the deblocking filter process. sps_sao_enabled_flag equal to 0 specifies that the sample adaptive offset process is not applied to the reconstructed picture after the deblocking filter process.

sps_alf_enabled_flag equal to 0 specifies that the adaptive loop filter is disabled. sps_alf_enabled_flag equal to 1 specifies that the adaptive loop filter is enabled.

sps_num_ver_virtual_boundaries specifies the number of sps_virtual_boundaries_pos_x[ i ] syntax elements that are present in the SPS. When sps_num_ver_virtual_boundaries is not present, it is inferred to be equal to 0.

sps_virtual_boundaries_pos_x[ i ] is used to compute the value of VirtualBoundariesPosX[ i ], which specifies the location of the i-th vertical virtual boundary in units of luma samples. The value of sps_virtual_boundaries_pos_x[ i ] shall be in the range of 1 to Ceil( pic_width_in_luma_samples ÷ 8 ) − 1, inclusive.

sps_num_hor_virtual_boundaries specifies the number of sps_virtual_boundaries_pos_y[ i ] syntax elements that are present in the SPS. When sps_num_hor_virtual_boundaries is not present, it is inferred to be equal to 0.

sps_virtual_boundaries_pos_y[ i ] is used to compute the value of VirtualBoundariesPosY[ i ], which specifies the location of the i-th horizontal virtual boundary in units of luma samples. The value of sps_virtual_boundaries_pos_y[ i ] shall be in the range of 1 to Ceil( pic_height_in_luma_samples ÷ 8 ) − 1, inclusive.

FIG. 16

| pic_parameter_set_rbsp( ) { | **Descriptor** |
|---|---|
| ... | |
| **no_pic_partition_flag** | u(1) |
| if( !no_pic_partition_flag ) { | |
| ... | |
| **loop_filter_across_tiles_enabled_flag** | u(1) |
| **loop_filter_across_slices_enabled_flag** | u(1) |
| } | |
| ... | |
| **deblocking_filter_control_present_flag** | u(1) |
| if( deblocking_filter_control_present_flag ) { | |
| **deblocking_filter_override_enabled_flag** | u(1) |
| **pps_deblocking_filter_disabled_flag** | u(1) |
| if( !pps_deblocking_filter_disabled_flag ) { | |
| **pps_beta_offset_div2** | se(v) |
| **pps_tc_offset_div2** | se(v) |
| } | |
| } | |
| ... | |
| } | |

FIG. 17 no_pic_partition_flag equal to 1 specifies that no picture partitioning applied to each picture referring to the PPS. no_pic_partition_flag equal to 0 specifies each picture referring to the PPS may be partitioned into more than one tile or slice.

loop_filter_across_tiles_enabled_flag equal to 1 specifies that in-loop filtering operations may be performed across tile boundaries in pictures referring to the PPS. loop_filter_across_tiles_enabled_flag equal to 0 specifies that in-loop filtering operations are not performed across tile boundaries in pictures referring to the PPS. The in-loop filtering operations include the deblocking filter, sample adaptive offset filter, and adaptive loop filter operations.

loop_filter_across_slices_enabled_flag equal to 1 specifies that in-loop filtering operations may be performed across slice boundaries in pictures referring to the PPS. loop_filter_across_slice_enabled_flag equal to 0 specifies that in-loop filtering operations are not performed across slice boundaries in pictures referring to the PPS. The in-loop filtering operations include the deblocking filter, sample adaptive offset filter, and adaptive loop filter operations.

deblocking_filter_control_present_flag equal to 1 specifies the presence of deblocking filter control syntax elements in the PPS. deblocking_filter_control_present_flag equal to 0 specifies the absence of deblocking filter control syntax elements in the PPS.

deblocking_filter_override_enabled_flag equal to 1 specifies the presence of pic_deblocking_filter_override_flag in the PHs referring to the PPS or slice_deblocking_filter_override_flag in the slice headers referring to the PPS. deblocking_filter_override_enabled_flag equal to 0 specifies the absence of pic_deblocking_filter_override_flag in PHs referring to the PPS or slice_deblocking_filter_override_flag in slice headers referring to the PPS. When not present, the value of deblocking_filter_override_enabled_flag is inferred to be equal to 0.

pps_deblocking_filter_disabled_flag equal to 1 specifies that the operation of deblocking filter is not applied for slices referring to the PPS in which slice_deblocking_filter_disabled_flag is not present. pps_deblocking_filter_disabled_flag equal to 0 specifies that the operation of the deblocking filter is applied for slices referring to the PPS in which slice_deblocking_filter_disabled_flag is not present. When not present, the value of pps_deblocking_filter_disabled_flag is inferred to be equal to 0.

pps_beta_offset_div2 and pps_tc_offset_div2 specify the default deblocking parameter offsets for β and tC (divided by 2) that are applied for slices referring to the PPS, unless the default deblocking parameter offsets are overridden by the deblocking parameter offsets present in the slice headers of the slices referring to the PPS. The values of pps_beta_offset_div2 and pps_tc_offset_div2 shall both be in the range of −6 to 6, inclusive. When not present, the value of pps_beta_offset_div2 and pps_tc_offset_div2 are inferred to be equal to 0.

FIG. 18

| picture_header_rbsp( ) { | **Descriptor** |
|---|---|
| … | |
| if( !sps_loop_filter_across_virtual_boundaries_disabled_present_flag ) { | |
| **ph_loop_filter_across_virtual_boundaries_disabled_present_flag** | u(1) |
| if( ph_loop_filter_across_virtual_boundaries_disabled_present_flag ) { | |
| **ph_num_ver_virtual_boundaries** | u(2) |
| for( i = 0; i < ph_num_ver_virtual_boundaries; i++ ) | |
| **ph_virtual_boundaries_pos_x**[ i ] | u(13) |
| **ph_num_hor_virtual_boundaries** | u(2) |
| for( i = 0; i < ph_num_hor_virtual_boundaries; i++ ) | |
| **ph_virtual_boundaries_pos_y**[ i ] | u(13) |
| } | |
| } | |
| … | |
| if( sps_sao_enabled_flag ) { | |
| **pic_sao_enabled_present_flag** | u(1) |
| if( pic_sao_enabled_present_flag ) { | |
| **pic_sao_luma_enabled_flag** | u(1) |
| if(ChromaArrayType != 0 ) | |
| **pic_sao_chroma_enabled_flag** | u(1) |
| } | |
| } | |
| if( sps_alf_enabled_flag ) { | |
| **pic_alf_enabled_present_flag** | u(1) |
| if( pic_alf_enabled_present_flag ) { | |
| **pic_alf_enabled_flag** | u(1) |
| if( pic_alf_enabled_flag ) { | |
| **pic_num_alf_aps_ids_luma** | u(3) |
| for( i = 0; i < pic_num_alf_aps_ids_luma; i++ ) | |
| **pic_alf_aps_id_luma**[ i ] | u(3) |
| if( ChromaArrayType != 0 ) | |
| **pic_alf_chroma_idc** | u(2) |
| if( pic_alf_chroma_idc ) | |
| **pic_alf_aps_id_chroma** | u(3) |
| } | |
| } | |
| } | |
| … | |
| if( deblocking_filter_override_enabled_flag ) { | |
| **pic_deblocking_filter_override_present_flag** | u(1) |
| if( pic_deblocking_filter_override_present_flag ) { | |
| **pic_deblocking_filter_override_flag** | u(1) |

FIG. 19

| | |
|---|---|
| if( pic_deblocking_filter_override_flag ) { | |
| **pic_deblocking_filter_disabled_flag** | u(1) |
| if( !pic_deblocking_filter_disabled_flag ) { | |
| **pic_beta_offset_div2** | se(v) |
| **pic_tc_offset_div2** | se(v) |
| } | |
| } | |
| } | |
| } | |
| … | |
| } | |

FIG. 20 ph_loop_filter_across_virtual_boundaries_disabled_present_flag equal to 1 specifies that the in-loop filtering operations are disabled across the virtual boundaries in pictures associated to the PH.
ph_loop_filter_across_virtual_boundaries_disabled__present_flag equal to 0 specifies that no such disabling of in-loop filtering operations is applied in pictures associated to the PH. The in-loop filtering operations include the deblocking filter, sample adaptive offset filter, and adaptive loop filter operations.

ph_num_ver_virtual_boundaries specifies the number of ph_virtual_boundaries_pos_x[ i ] syntax elements that are present in the PH.

ph_virtual_boundaries_pos_x[ i ] is used to compute the value of VirtualBoundariesPosX[ i ], which specifies the location of the i-th vertical virtual boundary in units of luma samples. The value of ph_virtual_boundaries_pos_x[ i ] shall be in the range of 1 to Ceil( pic_width_in_luma_samples ÷ 8 ) − 1, inclusive.

ph_num_hor_virtual_boundaries specifies the number of ph_virtual_boundaries_pos_y[ i ] syntax elements that are present in the PH.

ph_virtual_boundaries_pos_y[ i ] is used to compute the value of VirtualBoundariesPosY[ i ], which specifies the location of the i-th horizontal virtual boundary in units of luma samples. The value of ph_virtual_boundaries_pos_y[ i ] shall be in the range of 1 to Ceil( pic_height_in_luma_samples ÷ 8 ) − 1, inclusive.

pic_sao_enabled_present_flag equal to 1 specifies that pic_sao_luma_flag and pic_sao_chroma_flag are present in the PH. pic_sao_enabled_present_flag equal to 0 specifies that pic_sao_luma_flag and pic_sao_chroma_flag are not present in the PH. When pic_sao_enabled_present_flag is not present, it is inferred to be equal to 0.

pic_sao_luma_enabled_flag equal to 1 specifies that SAO is enabled for the luma component in all slices associated with the PH; pic_sao_luma_enabled_flag equal to 0 specifies that SAO for the luma component may be disabled for one, or more, or all slices associated with the PH.

pic_sao_chroma_enabled_flag equal to 1 specifies that SAO is enabled for the chroma component in all slices associated with the PH; pic_sao_chroma_enabled_flag equal to 0 specifies that SAO for chroma component may be disabled for one, or more, or all slices associated with the PH.

pic_alf_enabled_present_flag equal to 1 specifies that pic_alf_enabled_flag, pic_num_alf_aps_ids_luma, pic_alf_aps_id_luma[ i ], pic_alf_chroma_idc, and pic_alf_aps_id_chroma are present in the PH.
pic_alf_enabled_present_flag equal to 0 specifies that pic_alf_enabled_flag, pic_num_alf_aps_ids_luma, pic_alf_aps_id_luma[ i ], pic_alf_chroma_idc, and pic_alf_aps_id_chroma are not present in the PH. When pic_alf_enabled_present_flag is not present, it is inferred to be equal to 0.

pic_alf_enabled_flag equal to 1 specifies that adaptive loop filter is enabled for all slices associated with the PH and may be applied to Y, Cb, or Cr colour component in the slices. pic_alf_enabled_flag equal to 0 specifies that adaptive loop filter may be disabled for one, or more, or all slices associated with the PH. When not present, pic_alf_enabled_flag is inferred to be equal to 0.

pic_num_alf_aps_ids_luma specifies the number of ALF APSs that the slices associated with the PH refers to.

pic_alf_aps_id_luma[ i ] specifies the adaptation_parameter_set_id of the i-th ALF APS that the luma component of the slices associated with the PH refers to.

The value of alf_luma_filter_signal_flag of the APS NAL unit having aps_params_type equal to ALF_APS and adaptation_parameter_set_id equal to pic_alf_aps_id_luma[ i ] shall be equal to 1.

pic_alf_chroma_idc equal to 0 specifies that the adaptive loop filter is not applied to Cb and Cr colour components.
pic_alf_chroma_idc equal to 1 indicates that the adaptive loop filter is applied to the Cb colour component.
pic_alf_chroma_idc equal to 2 indicates that the adaptive loop filter is applied to the Cr colour component.
pic_alf_chroma_idc equal to 3 indicates that the adaptive loop filter is applied to Cb and Cr colour components. When pic_alf_chroma_idc is not present, it is inferred to be equal to 0.

pic_alf_aps_id_chroma specifies the adaptation_parameter_set_id of the ALF APS that the chroma component of the slices associated with the PH refers to.

pic_deblocking_filter_override_present_flag equal to 1 specifies that pic_deblocking_filter_override_flag is present in the PH. pic_deblocking_filter_override_present_flag equal to 0 specifies that pic_deblocking_filter_override_flag is not present in the PH. When pic_deblocking_filter_override_present_flag is not present, it is inferred to be equal to 0.

pic_deblocking_filter_override_flag equal to 1 specifies that deblocking parameters are present in the PH.
pic_deblocking_filter_override_flag equal to 0 specifies that deblocking parameters are not present in the PH. When not present, the value of pic_pic_deblocking_filter_override_flag is inferred to be equal to 0.

FIG. 21 pic_deblocking_filter_disabled_flag equal to 1 specifies that the operation of the deblocking filter is not applied for the slices associated with the PH. pic_deblocking_filter_disabled_flag equal to 0 specifies that the operation of the deblocking filter is applied for the slices associated with the PH. When pic_deblocking_filter_disabled_flag is not present, it is inferred to be equal to pps_deblocking_filter_disabled_flag.

pic_beta_offset_div2 and pic_tc_offset_div2 specify the deblocking parameter offsets for β and tC (divided by 2) for the slices associated with the PH. The values of pic_beta_offset_div2 and pic_tc_offset_div2 shall both be in the range of −6 to 6, inclusive. When not present, the values of pic_beta_offset_div2 and pic_tc_offset_div2 are inferred to be equal to pps_beta_offset_div2 and pps_tc_offset_div2, respectively.

FIG. 22

| slice_header( ) { | **Descriptor** |
|---|---|
| ... | |
| if( pps_cu_chroma_qp_offset_list_enabled_flag ) | |
| **cu_chroma_qp_offset_enabled_flag** | u(1) |
| if( sps_sao_enabled_flag && !pic_sao_enabled_present_flag ) { | |
| **slice_sao_luma_flag** | u(1) |
| if( ChromaArrayType != 0 ) | |
| **slice_sao_chroma_flag** | u(1) |
| } | |
| if( sps_alf_enabled_flag && !pic_alf_enabled_present_flag ) { | |
| **slice_alf_enabled_flag** | u(1) |
| if( slice_alf_enabled_flag ) { | |
| **slice_num_alf_aps_ids_luma** | u(3) |
| for( i = 0; i < slice_num_alf_aps_ids_luma; i++ ) | |
| **slice_alf_aps_id_luma**[ i ] | u(3) |
| if( ChromaArrayType != 0 ) | |
| **slice_alf_chroma_idc** | u(2) |
| if( slice_alf_chroma_idc ) | |
| **slice_alf_aps_id_chroma** | u(3) |
| } | |
| } | |
| if( deblocking_filter_override_enabled_flag && !pic_deblocking_filter_override_present_flag ) | |
| **slice_deblocking_filter_override_flag** | u(1) |
| if( slice_deblocking_filter_override_flag ) { | |
| **slice_deblocking_filter_disabled_flag** | u(1) |
| if( !slice_deblocking_filter_disabled_flag ) { | |
| **slice_beta_offset_div2** | se(v) |
| **slice_tc_offset_div2** | se(v) |
| } | |
| } | |
| ... | |
| } | |

FIG. 23 cu_chroma_qp_offset_enabled_flag equal to 1 specifies that the cu_chroma_qp_offset_flag may be present in the transform unit and palette coding syntax. cu_chroma_qp_offset_enabled_flag equal to 0 specifies that the cu_chroma_qp_offset_flag is not present in the transform unit or palette coding syntax. When not present, the value of cu_chroma_qp_offset_enabled_flag is inferred to be equal to 0.

slice_sao_luma_flag equal to 1 specifies that SAO is enabled for the luma component in the current slice; slice_sao_luma_flag equal to 0 specifies that SAO is disabled for the luma component in the current slice. When slice_sao_luma_flag is not present, it is inferred to be equal to pic_sao_luma_enabled_flag.

slice_sao_chroma_flag equal to 1 specifies that SAO is enabled for the chroma component in the current slice; slice_sao_chroma_flag equal to 0 specifies that SAO is disabled for the chroma component in the current slice. When slice_sao_chroma_flag is not present, it is inferred to be equal to pic_sao_chroma_enabled_flag.

slice_alf_enabled_flag equal to 1 specifies that adaptive loop filter is enabled and may be applied to Y, Cb, or Cr colour component in a slice. slice_alf_enabled_flag equal to 0 specifies that adaptive loop filter is disabled for all colour components in a slice. When not present, the value of slice_alf_enabled_flag is inferred to be equal to pic_alf_enabled_flag.

slice_num_alf_aps_ids_luma specifies the number of ALF APSs that the slice refers to. When slice_alf_enabled_flag is equal to 1 and slice_num_alf_aps_ids_luma is not present, the value of slice_num_alf_aps_ids_luma is inferred to be equal to the value of pic_num_alf_aps_ids_luma.

slice_alf_aps_id_luma[ i ] specifies the adaptation_parameter_set_id of the i-th ALF APS that the luma component of the slice refers to. The TemporalId of the APS NAL unit having aps_params_type equal to ALF_APS and adaptation_parameter_set_id equal to slice_alf_aps_id_luma[ i ] shall be less than or equal to the TemporalId of the coded slice NAL unit. When slice_alf_enabled_flag is equal to 1 and slice_alf_aps_id_luma[ i ] is not present, the value of slice_alf_aps_id_luma[ i ] is inferred to be equal to the value of pic_alf_aps_id_luma[ i ].

The value of alf_luma_filter_signal_flag of the APS NAL unit having aps_params_type equal to ALF_APS and adaptation_parameter_set_id equal to slice_alf_aps_id_luma[ i ] shall be equal to 1.

slice_alf_chroma_idc equal to 0 specifies that the adaptive loop filter is not applied to Cb and Cr colour components. slice_alf_chroma_idc equal to 1 indicates that the adaptive loop filter is applied to the Cb colour component. slice_alf_chroma_idc equal to 2 indicates that the adaptive loop filter is applied to the Cr colour component. slice_alf_chroma_idc equal to 3 indicates that the adaptive loop filter is applied to Cb and Cr colour components. When slice_alf_chroma_idc is not present, it is inferred to be equal to pic_alf_chroma_idc.

slice_alf_aps_id_chroma specifies the adaptation_parameter_set_id of the ALF APS that the chroma component of the slice refers to. The TemporalId of the APS NAL unit having aps_params_type equal to ALF_APS and adaptation_parameter_set_id equal to slice_alf_aps_id_chroma shall be less than or equal to the TemporalId of the coded slice NAL unit. When slice_alf_enabled_flag is equal to 1 and slice_alf_aps_id_chroma is not present, the value of slice_alf_aps_id_chroma is inferred to be equal to the value of pic_alf_aps_id_chroma.

The value of alf_chroma_filter_signal_flag of the APS NAL unit having aps_params_type equal to ALF_APS and adaptation_parameter_set_id equal to slice_alf_aps_id_chroma shall be equal to 1.

slice_deblocking_filter_override_flag equal to 1 specifies that deblocking parameters are present in the slice header. slice_deblocking_filter_override_flag equal to 0 specifies that deblocking parameters are not present in the slice header. When not present, the value of slice_deblocking_filter_override_flag is inferred to be equal to pic_deblocking_filter_override_flag.

slice_deblocking_filter_disabled_flag equal to 1 specifies that the operation of the deblocking filter is not applied for the current slice. slice_deblocking_filter_disabled_flag equal to 0 specifies that the operation of the deblocking filter is applied for the current slice. When slice_deblocking_filter_disabled_flag is not present, it is inferred to be equal to pic_deblocking_filter_disabled_flag.

slice_beta_offset_div2 and slice_tc_offset_div2 specify the deblocking parameter offsets for β and tC (divided by 2) for the current slice. The values of slice_beta_offset_div2 and slice_tc_offset_div2 shall both be in the range of −6 to 6, inclusive. When not present, the values of slice_beta_offset_div2 and slice_tc_offset_div2 are inferred to be equal to pic_beta_offset_div2 and pic_tc_offset_div2, respectively.

FIG. 24

| seq_parameter_set_rbsp( ) { | **Descriptor** |
|---|---|
| **sps_decoding_parameter_set_id** | u(4) |
| … | |
| **sps_loop_filter_across_virtual_boundaries_disabled_flag** | u(1) |
| if( sps_loop_filter_across_virtual_boundaries_disabled_flag ) { | |
| **sps_loop_filter_across_virtual_boundaries_disabled_present_flag** | u(1) |
| if( sps_loop_filter_across_virtual_boundaries_disabled_present_flag ) { | |
| **sps_num_ver_virtual_boundaries** | u(2) |
| for( i = 0; i < sps_num_ver_virtual_boundaries; i++ ) | |
| **sps_virtual_boundaries_pos_x**[ i ] | u(13) |
| **sps_num_hor_virtual_boundaries** | u(2) |
| for( i = 0; i < sps_num_hor_virtual_boundaries; i++ ) | |
| **sps_virtual_boundaries_pos_y**[ i ] | u(13) |
| } | |
| } | |
| … | |
| } | |

FIG. 25 sps_loop_filter_across_virtual_boundaries_disabled_flag equal to 1 specifies that the in-loop filtering operations are disabled across the virtual boundaries in pictures referring to the SPS. sps_loop_filter_across_virtual_boundaries_disabled_present_flag equal to 0 specifies that no such disabling of in-loop filtering operations is applied in pictures referring to the SPS. In-loop filtering operations include the deblocking filter, sample adaptive offset filter, and adaptive loop filter operations.
sps_loop_filter_across_virtual_boundaries_disabled_present_flag equal to 1 specifies that the syntax elements for the in-loop filtering operations for the virtual boundaries is present in the SPS. sps_loop_filter_across_virtual_boundaries_disabled_present_flag equal to 0 specifies that the syntax elements for the virtual boundaries in-loop filtering operations is not present in the SPS. In-loop filtering operations include the deblocking filter, sample adaptive offset filter, and adaptive loop filter operations.
When gdr_enabled_flag is equal to 1, sps_loop_filter_across_virtual_boundaries_disabled_flag is constraint to be 1 and sps_loop_filter_across_virtual_boundaries_disabled_present_flag is constraint to be 0.
sps_num_ver_virtual_boundaries specifies the number of sps_virtual_boundaries_pos_x[ i ] syntax elements that are present in the SPS. When sps_num_ver_virtual_boundaries is not present, it is inferred to be equal to 0.
sps_virtual_boundaries_pos_x[ i ] is used to compute the value of VirtualBoundariesPosX[ i ], which specifies the location of the i-th vertical virtual boundary in units of luma samples. sps_virtual_boundaries_pos_x[ i ] shall be in the range of 1 to Ceil( pic_width_in_luma_samples ÷ 8 ) − 1, inclusive.
sps_num_hor_virtual_boundaries specifies the number of sps_virtual_boundaries_pos_y[ i ] syntax elements that are present in the SPS. When sps_num_hor_virtual_boundaries is not present, it is inferred to be equal to 0.
When sps_loop_filter_across_virtual_boundaries_disabled_flag is equal to 1 and sps_loop_filter_across_virtual_boundaries_disabled_present_flag is equal to 1, the sum of sps_num_ver_virtual_boundaries and sps_num_hor_virtual_boundaries shall be greater than 0.
sps_virtual_boundaries_pos_y[ i ] is used to compute the value of VirtualBoundariesPosY[ i ], which specifies the location of the i-th horizontal virtual boundary in units of luma samples. sps_virtual_boundaries_pos_y[ i ] shall be in the range of 1 to Ceil( pic_height_in_luma_samples ÷ 8 ) − 1, inclusive.

FIG. 26

| picture_header_rbsp( ) { | **Descriptor** |
| --- | --- |
| **non_reference_picture_flag** | u(1) |
| ... | |
| if( sps_loop_filter_across_virtual_boundaries_disabled_flag &&<br>!sps_loop_filter_across_virtual_boundaries_disabled_present_flag ) { | |
| **ph_num_ver_virtual_boundaries** | u(2) |
| for( i = 0; i < ph_num_ver_virtual_boundaries; i++ ) | |
| **ph_virtual_boundaries_pos_x**[ i ] | u(13) |
| **ph_num_hor_virtual_boundaries** | u(2) |
| for( i = 0; i < ph_num_hor_virtual_boundaries; i++ ) | |
| **ph_virtual_boundaries_pos_y**[ i ] | ue(v) |
| } | |
| ... | |
| } | |

FIG. 27 ph_num_ver_virtual_boundaries specifies the number of ph_virtual_boundaries_pos_x[ i ] syntax elements that are present in the PH. When ph_num_ver_virtual_boundaries is not present, it is inferred to be equal to 0.
ph_num_hor_virtual_boundaries specifies the number of ph_virtual_boundaries_pos_y[ i ] syntax elements that are present in the PH. When ph_num_hor_virtual_boundaries is not present, it is inferred to be equal to 0.

The parameter VirtualBoundariesDisabledFlag is derived as follows:

```
VirtualBoundariesDisabledFlag = 0
if( sps_loop_filter_across_virtual_boundaries_disabled_flag )
    if( sps_loop_filter_across_virtual_boundaries_disabled_present_flag | |
            ( ph_num_ver_virtual_boundaries + ph_num_ver_virtual_boundaries > 0 ) )
        VirtualBoundariesDisabledFlag = 1
```

The parameter VirtualBoundariesNumVer is derived as follows:

```
VirtualBoundariesNumVer = 0
if( sps_loop_filter_across_virtual_boundaries_disabled_flag )
        VirtualBoundariesNumVer =
sps_loop_filter_across_virtual_boundaries_disabled_present_flag ?
        sps_num_ver_virtual_boundaries : ph_num_ver_virtual_boundaries          (7-43)
```

ph_virtual_boundaries_pos_x[ i ] is used to compute the value of VirtualBoundariesPosX[ i ], which specifies the location of the i-th vertical virtual boundary in units of luma samples.
ph_virtual_boundaries_pos_x[ i ] shall be in the range of 1 to Ceil( pic_width_in_luma_samples ÷ 8 ) − 1, inclusive.
The location of the vertical virtual boundary VirtualBoundariesPosX[ i ] is derived as follows:

```
VirtualBoundariesPosX[ i ] = 0
if( sps_loop_filter_across_virtual_boundaries_disabled_flag )
    VirtualBoundariesPosX[ i ] =
(sps_loop_filter_across_virtual_boundaries_disabled_present_flag ?
        sps_virtual_boundaries_pos_x[ i ] : ph_virtual_boundaries_pos_x[ i ]) * 8          (7-44)
```

The distance between any two vertical virtual boundaries shall be greater than or equal to CtbSizeY luma samples.
ph_num_hor_virtual_boundaries specifies the number of ph_virtual_boundaries_pos_y[ i ] syntax elements that are present in the PH. When ph_num_hor_virtual_boundaries is not present, it is inferred to be equal to 0.
The parameter VirtualBoundariesNumHor is derived as follows:

```
VirtualBoundariesNumHor = 0
if( sps_loop_filter_across_virtual_boundaries_disabled_flag )
    VirtualBoundariesNumHor =
sps_loop_filter_across_virtual_boundaries_disabled_present_flag ?
            sps_num_hor_virtual_boundaries : ph_num_hor_virtual_boundaries          (7-45)
```

ph_virtual_boundaries_pos_y[ i ] is used to compute the value of VirtualBoundariesPosY[ i ], which specifies the location of the i-th horizontal virtual boundary in units of luma samples.
ph_virtual_boundaries_pos_y[ i ] shall be in the range of 1 to Ceil( pic_height_in_luma_samples ÷ 8 ) − 1, inclusive.
The location of the horizontal virtual boundary VirtualBoundariesPosY[ i ] is derived as follows:

```
VirtualBoundariesPosY[ i ]
if( sps_loop_filter_across_virtual_boundaries_disabled_flag )
    VirtualBoundariesPosY[ i ] =
(sps_loop_filter_across_virtual_boundaries_disabled_present_flag ?
        sps_virtual_boundaries_pos_y[ i ] : ph_virtual_boundaries_pos_y[ i ]) * 8          (7-46)
```

The distance between any two horizontal virtual boundaries shall be greater than or equal to CtbSizeY luma samples.

FIG. 28

| seq_parameter_set_rbsp( ) { | **Descriptor** |
|---|---|
| **sps_decoding_parameter_set_id** | u(4) |
| ... | |
| **sps_loop_filter_across_virtual_boundaries_disabled_flag** | u(1) |
| if( sps_loop_filter_across_virtual_boundaries_disabled_flag ) { | |
| **sps_loop_filter_across_virtual_boundaries_disabled_present_flag** | u(1) |
| if( sps_loop_filter_across_virtual_boundaries_disabled_present_flag ) { | |
| **sps_num_ver_virtual_boundaries** | u(2) |
| for( i = 0; i < sps_num_ver_virtual_boundaries; i++ ) | |
| **sps_virtual_boundaries_pos_x**[ i ] | u(13) |
| **sps_num_hor_virtual_boundaries** | u(2) |
| for( i = 0; i < sps_num_hor_virtual_boundaries; i++ ) | |
| **sps_virtual_boundaries_pos_y**[ i ] | u(13) |
| } | |
| } | |
| ... | |
| } | |

FIG. 29 sps_loop_filter_across_virtual_boundaries_disabled_flag equal to 1 specifies that the in-loop filtering operations are disabled across the virtual boundaries in pictures referring to the SPS. sps_loop_filter_across_virtual_boundaries_disabled_present_flag equal to 0 specifies that no such disabling of in-loop filtering operations is applied in pictures referring to the SPS. In-loop filtering operations include the deblocking filter, sample adaptive offset filter, and adaptive loop filter operations.
sps_loop_filter_across_virtual_boundaries_disabled_present_flag equal to 1 specifies that the syntax elements for the in-loop filtering operations for the virtual boundaries is present in the SPS. sps_loop_filter_across_virtual_boundaries_disabled_present_flag equal to 0 specifies that the syntax elements for the virtual boundaries in-loop filtering operations is not present in the SPS. In-loop filtering operations include the deblocking filter, sample adaptive offset filter, and adaptive loop filter operations.
When gdr_enabled_flag is equal to 1, sps_loop_filter_across_virtual_boundaries_disabled_flag is constraint to be 1 and sps_loop_filter_across_virtual_boundaries_disabled_present_flag is constraint to be 0.
sps_num_ver_virtual_boundaries specifies the number of sps_virtual_boundaries_pos_x[ i ] syntax elements that are present in the SPS. When sps_num_ver_virtual_boundaries is not present, it is inferred to be equal to 0.
sps_virtual_boundaries_pos_x[ i ] is used to compute the value of VirtualBoundariesPosX[ i ], which specifies the location of the i-th vertical virtual boundary in units of luma samples. sps_virtual_boundaries_pos_x[ i ] shall be in the range of 1 to Ceil( pic_width_in_luma_samples ÷ 8 ) − 1, inclusive.
sps_num_hor_virtual_boundaries specifies the number of sps_virtual_boundaries_pos_y[ i ] syntax elements that are present in the SPS. When sps_num_hor_virtual_boundaries is not present, it is inferred to be equal to 0.
When sps_loop_filter_across_virtual_boundaries_disabled_flag is equal to 1 and sps_loop_filter_across_virtual_boundaries_disabled_present_flag is equal to 1, the sum of sps_num_ver_virtual_boundaries and sps_num_hor_virtual_boundaries shall be greater than 0.
sps_virtual_boundaries_pos_y[ i ] is used to compute the value of VirtualBoundariesPosY[ i ], which specifies the location of the i-th horizontal virtual boundary in units of luma samples. sps_virtual_boundaries_pos_y[ i ] shall be in the range of 1 to Ceil( pic_height_in_luma_samples ÷ 8 ) − 1, inclusive.

FIG. 30

| picture_header_rbsp( ) { | **Descriptor** |
|---|---|
| **non_reference_picture_flag** | u(1) |
| ... | |
| if( sps_loop_filter_across_virtual_boundaries_disabled_flag && !sps_loop_filter_across_virtual_boundaries_disabled_present_flag ) { | |
| **ph_loop_filter_across_virtual_boundaries_disabled_present_flag** | u(1) |
| if( ph_loop_filter_across_virtual_boundaries_disabled_present_flag ) { | |
| **ph_num_ver_virtual_boundaries** | u(2) |
| for( i = 0; i < ph_num_ver_virtual_boundaries; i++ ) | |
| **ph_virtual_boundaries_pos_x**[ i ] | u(13) |
| **ph_num_hor_virtual_boundaries** | u(2) |
| for( i = 0; i < ph_num_hor_virtual_boundaries; i++ ) | |
| **ph_virtual_boundaries_pos_y**[ i ] | u(13) |
| } | |
| } | |
| ... | |
| } | |

FIG. 31 ph_loop_filter_across_virtual_boundaries_disabled_present_flag equal to 1 specifies that the in-loop filtering operations are disabled across the virtual boundaries in pictures associated to the PH. ph_loop_filter_across_virtual_boundaries_disabled__present_flag equal to 0 specifies that no such disabling of in-loop filtering operations is applied in pictures associated to the PH. The in-loop filtering operations include the deblocking filter, sample adaptive offset filter, and adaptive loop filter operations. When not present, the value of ph_loop_filter_across_virtual_boundaries_disabled_present_flag is inferred to be equal to 0.

The parameter VirtualBoundariesDisabledFlag is derived as follows:

```
VirtualBoundariesDisabledFlag = 0
if( sps_loop_filter_across_virtual_boundaries_disabled_flag )
    VirtualBoundariesDisabledFlag =
sps_loop_filter_across_virtual_boundaries_disabled_present_flag
        || ph_loop_filter_across_virtual_boundaries_disabled_present_flag
```

Alternatively, the following constraint may be specified:
When sps_loop_filter_across_virtual_boundaries_disabled_flag is equal to 1 and sps_loop_filter_across_virtual_boundaries_disabled_present_flag is equal to 0, ph_loop_filter_across_virtual_boundaries_disabled_present_flag is equal to 1.
ph_num_ver_virtual_boundaries specifies the number of ph_virtual_boundaries_pos_x[ i ] syntax elements that are present in the PH. When ph_num_ver_virtual_boundaries is not present, it is inferred to be equal to 0. The parameter VirtualBoundariesNumVer is derived as follows:

```
VirtualBoundariesNumVer = 0
if( sps_loop_filter_across_virtual_boundaries_disabled_flag )
        VirtualBoundariesNumVer =
sps_loop_filter_across_virtual_boundaries_disabled_present_flag ?
            sps_num_ver_virtual_boundaries : ph_num_ver_virtual_boundaries          (7-43)
```

ph_num_hor_virtual_boundaries specifies the number of ph_virtual_boundaries_pos_y[ i ] syntax elements that are present in the PH. When ph_num_hor_virtual_boundaries is not present, it is inferred to be equal to 0.

The distance between any two vertical virtual boundaries shall be greater than or equal to CtbSizeY luma samples.
The location of the vertical virtual boundary VirtualBoundariesPosX[ i ] is derived as follows:

```
VirtualBoundariesPosX[ i ] = 0
if( sps_loop_filter_across_virtual_boundaries_disabled_flag )
    VirtualBoundariesPosX[ i ] =
(sps_loop_filter_across_virtual_boundaries_disabled_present_flag ?
            sps_virtual_boundaries_pos_x[ i ] : ph_virtual_boundaries_pos_x[ i ]) * 8
```

FIG. 32 ph_virtual_boundaries_pos_x[ i ] is used to compute the value of VirtualBoundariesPosX[ i ], which specifies the location of the i-th vertical virtual boundary in units of luma samples.
ph_virtual_boundaries_pos_x[ i ] shall be in the range of 1 to Ceil( pic_width_in_luma_samples ÷ 8 ) − 1, inclusive.
The location of the vertical virtual boundary VirtualBoundariesPosX[ i ] is derived as follows:

```
VirtualBoundariesPosX[ i ] = 0
if( sps_loop_filter_across_virtual_boundaries_disabled_flag )
    VirtualBoundariesPosX[ i ] =
(sps_loop_filter_across_virtual_boundaries_disabled_present_flag ?
        sps_virtual_boundaries_pos_x[ i ] : ph_virtual_boundaries_pos_x[ i ]) * 8          (7-44)
```

The distance between any two vertical virtual boundaries shall be greater than or equal to CtbSizeY luma samples.
ph_num_hor_virtual_boundaries specifies the number of ph_virtual_boundaries_pos_y[ i ] syntax elements that are present in the PH. When ph_num_hor_virtual_boundaries is not present, it is inferred to be equal to 0.
The parameter VirtualBoundariesNumHor is derived as follows:

```
VirtualBoundariesNumHor = 0
if( sps_loop_filter_across_virtual_boundaries_disabled_flag )
    VirtualBoundariesNumHor =
sps_loop_filter_across_virtual_boundaries_disabled_present_flag ?
            sps_num_hor_virtual_boundaries : ph_num_hor_virtual_boundaries          (7-45)
```

ph_virtual_boundaries_pos_y[ i ] is used to compute the value of VirtualBoundariesPosY[ i ], which specifies the location of the i-th horizontal virtual boundary in units of luma samples.
ph_virtual_boundaries_pos_y[ i ] shall be in the range of 1 to Ceil( pic_height_in_luma_samples ÷ 8 ) − 1, inclusive.
The location of the horizontal virtual boundary VirtualBoundariesPosY[ i ] is derived as follows:

```
VirtualBoundariesPosY[ i ] = 0
if( sps_loop_filter_across_virtual_boundaries_disabled_flag )
    VirtualBoundariesPosY[ i ] =
(sps_loop_filter_across_virtual_boundaries_disabled_present_flag ?
            sps_virtual_boundaries_pos_y[ i ] : ph_virtual_boundaries_pos_y[ i ]) * 8          (7-46)
```

The distance between any two horizontal virtual boundaries shall be greater than or equal to CtbSizeY luma samples
When sps_loop_filter_across_virtual_boundaries_disabled_flag is equal to 1 and ph_loop_filter_across_virtual_boundaries_disabled_present_flag is equal to 1, the sum of ph_num_ver_virtual_boundaries and ph_num_hor_virtual_boundaries shall be greater than 0.

FIG. 33

| seq_parameter_set_rbsp( ) { | Descriptor |
|---|---|
| **sps_decoding_parameter_set_id** | u(4) |
| … | |
| **sps_loop_filter_across_virtual_boundaries_disabled_present_flag** | u(1) |
| if( sps_loop_filter_across_virtual_boundaries_disabled_present_flag ) { | |
| **sps_num_ver_virtual_boundaries** | u(2) |
| for( i = 0; i < sps_num_ver_virtual_boundaries; i++ ) | |
| **sps_virtual_boundaries_pos_x**[ i ] | u(13) |
| **sps_num_hor_virtual_boundaries** | u(2) |
| for( i = 0; i < sps_num_hor_virtual_boundaries; i++ ) | |
| **sps_virtual_boundaries_pos_y**[ i ] | u(13) |
| } else | |
| **sps_ph_loop_filter_across_virtual_boundaries_disabled_present_flag** | u(1) |
| … | |
| } | |

FIG. 34 sps_loop_filter_across_virtual_boundaries_disabled_present_flag equal to 1 specifies that virtual boundary locations for disabling in-loop filter operations are present in the SPS. sps_loop_filter_across_virtual_boundaries_disabled_present_flag equal to 0 specifies that virtual boundary locations for disabling in-loop filter operations are not present in the SPS . In-loop filtering operations include the deblocking filter, sample adaptive offset filter, and adaptive loop filter operations.

sps_num_ver_virtual_boundaries specifies the number of sps_virtual_boundaries_pos_x[ i ] syntax elements that are present in the SPS. When sps_num_ver_virtual_boundaries is not present, it is inferred to be equal to 0.

sps_virtual_boundaries_pos_x[ i ] is used to compute the value of VirtualBoundariesPosX[ i ], which specifies the location of the i-th vertical virtual boundary in units of luma samples. sps_virtual_boundaries_pos_x[ i ] shall be in the range of 1 to Ceil( pic_width_in_luma_samples ÷ 8 ) − 1, inclusive.

sps_num_hor_virtual_boundaries specifies the number of sps_virtual_boundaries_pos_y[ i ] syntax elements that are present in the SPS. When sps_num_hor_virtual_boundaries is not present, it is inferred to be equal to 0.

When sps_loop_filter_across_virtual_boundaries_disabled_present_flag is equal to 1, the sum of sps_num_ver_virtual_boundaries and sps_num_hor_virtual_boundaries shall be greater than 0.

sps_virtual_boundaries_pos_y[ i ] is used to compute the value of VirtualBoundariesPosY[ i ], which specifies the location of the i-th horizontal virtual boundary in units of luma samples. sps_virtual_boundaries_pos_y[ i ] shall be in the range of 1 to Ceil( pic_height_in_luma_samples ÷ 8 ) − 1, inclusive.

sps_ph_loop_filter_across_virtual_boundaries_disabled_present_flag equal to 1 specifies that virtual boundary locations for disabling in-loop filter operations may be present in the picture header of pictures referring to the SPS. sps_ph_loop_filter_across_virtual_boundaries_disabled_present_flag equal to 0 specifies that virtual boundary locations for disabling in-loop filter operations are not present in picture header of pictures referring to the SPS. In-loop filtering operations include the deblocking filter, sample adaptive offset filter, and adaptive loop filter operations. When not present, sps_ph_loop_filter_across_virtual_boundaries_disabled_present_flag is inferred to be equal to 0

When gdr_enabled_flag is equal to 1, sps_loop_filter_across_virtual_boundaries_disabled_present_flag is constrained to be equal to 0 and and sps_ph_loop_filter_across_virtual_boundaries_disabled_present_flag is constrained to be 1.

FIG. 35

| picture_header_rbsp( ) { | **Descriptor** |
|---|---|
| **non_reference_picture_flag** | u(1) |
| ... | |
| if( sps_ph_loop_filter_across_virtual_boundaries_disabled_present_flag) { | |
| **ph_loop_filter_across_virtual_boundaries_disabled_present_flag** | u(1) |
| if( ph_loop_filter_across_virtual_boundaries_disabled_present_flag ) { | |
| **ph_num_ver_virtual_boundaries** | u(2) |
| for( i = 0; i < ph_num_ver_virtual_boundaries; i++ ) | |
| **ph_virtual_boundaries_pos_x**[ i ] | u(13) |
| **ph_num_hor_virtual_boundaries** | u(2) |
| for( i = 0; i < ph_num_hor_virtual_boundaries; i++ ) | |
| **ph_virtual_boundaries_pos_y**[ i ] | u(13) |
| } | |
| } | |
| ... | |
| } | |

FIG. 36 ph_loop_filter_across_virtual_boundaries_disabled_present_flag equal to 1 specifies that the in-loop filtering operations are disabled across the virtual boundaries in pictures associated to the PH. ph_loop_filter_across_virtual_boundaries_disabled__present_flag equal to 0 specifies that no such disabling of in-loop filtering operations is applied in pictures associated to the PH. The in-loop filtering operations include the deblocking filter, sample adaptive offset filter, and adaptive loop filter operations. When not present, the value of ph_loop_filter_across_virtual_boundaries_disabled_present_flag is inferred to be equal to 0.

The parameter VirtualBoundariesDisabledFlag is derived as follows:

VirtualBoundariesDisabledFlag =
sps_loop_filter_across_virtual_boundaries_disabled_present_flag ||
sps_ph_loop_filter_across_virtual_boundaries_disabled_present_flag ||
ph_loop_filter_across_virtual_boundaries_disabled_present_flag (7-42)

ph_num_ver_virtual_boundaries specifies the number of ph_virtual_boundaries_pos_x[ i ] syntax elements that are present in the PH. When ph_num_ver_virtual_boundaries is not present, it is inferred to be equal to 0. . When sps_loop_filter_across_virtual_boundaries_disabled_present_flag is equal to 1, ph_num_ver_virtual_boundaries is constraint to be greater than 0.

The parameter VirtualBoundariesNumVer is derived as follows:

VirtualBoundariesNumVer = sps_loop_filter_across_virtual_boundaries_disabled_present_flag ?
sps_num_ver_virtual_boundaries :
(sps_ph_loop_filter_across_virtual_boundaries_disabled_present_flag ?
ph_num_ver_virtual_boundaries : 0) (7-43)

ph_virtual_boundaries_pos_x[ i ] is used to compute the value of VirtualBoundariesPosX[ i ], which specifies the location of the i-th vertical virtual boundary in units of luma samples. ph_virtual_boundaries_pos_x[ i ] shall be in the range of 1 to Ceil( pic_width_in_luma_samples ÷ 8 ) − 1, inclusive.

The location of the vertical virtual boundary VirtualBoundariesPosX[ i ] is derived as follows:

VirtualBoundariesPosX[ i ] = (sps_loop_filter_across_virtual_boundaries_disabled_present_flag ?
sps_virtual_boundaries_pos_x[ i ] :
(sps_ph_loop_filter_across_virtual_boundaries_disabled_present_flag ?
ph_virtual_boundaries_pos_x[ i ]) * 8 : 0) (7-44)

The distance between any two vertical virtual boundaries shall be greater than or equal to CtbSizeY luma samples.

FIG. 37 ph_num_hor_virtual_boundaries specifies the number of ph_virtual_boundaries_pos_y[ i ] syntax elements that are present in the PH. When ph_num_hor_virtual_boundaries is not present, it is inferred to be equal to 0.
When ph_loop_filter_across_virtual_boundaries_disabled_present_flag is equal to 1, the sum of ph_num_ver_virtual_boundaries and ph_num_hor_virtual_boundaries shall be greater than 0.
The parameter VirtualBoundariesNumHor is derived as follows:

VirtualBoundariesNumHor = sps_loop_filter_across_virtual_boundaries_disabled_present_flag ?
sps_num_hor_virtual_boundaries :
(sps_ph_loop_filter_across_virtual_boundaries_disabled_present_flag ?
ph_num_hor_virtual_boundaries : 0) (7-45)

ph_virtual_boundaries_pos_y[ i ] is used to compute the value of VirtualBoundariesPosY[ i ], which specifies the location of the i-th horizontal virtual boundary in units of luma samples.
ph_virtual_boundaries_pos_y[ i ] shall be in the range of 1 to Ceil( pic_height_in_luma_samples ÷ 8 ) − 1, inclusive.
The location of the horizontal virtual boundary VirtualBoundariesPosY[ i ] is derived as follows:

VirtualBoundariesPosY[ i ] = (sps_loop_filter_across_virtual_boundaries_disabled_present_flag ?
sps_virtual_boundaries_pos_y[ i ] :
(sps_ph_loop_filter_across_virtual_boundaries_disabled_present_flag ?
ph_virtual_boundaries_pos_y[ i ]) * 8) : 0 ) (7-46)

The distance between any two horizontal virtual boundaries shall be greater than or equal to CtbSizeY luma samples

FIG. 38

| seq_parameter_set_rbsp( ) { | **Descriptor** |
|---|---|
| **sps_decoding_parameter_set_id** | u(4) |
| … | |
| **sps_loop_filter_across_virtual_boundaries_disabled_flag** | u(1) |
| if( sps_loop_filter_across_virtual_boundaries_disabled_flag ) { | |
| **sps_loop_filter_across_virtual_boundaries_disabled_present_flag** | u(1) |
| if( sps_loop_filter_across_virtual_boundaries_disabled_present_flag ) { | |
| **sps_num_ver_virtual_boundaries** | u(2) |
| for( i = 0; i < sps_num_ver_virtual_boundaries; i++ ) | |
| **sps_virtual_boundaries_pos_x**[ i ] | u(13) |
| **sps_num_hor_virtual_boundaries** | u(2) |
| for( i = 0; i < sps_num_hor_virtual_boundaries; i++ ) | |
| **sps_virtual_boundaries_pos_y**[ i ] | u(13) |
| } | |
| } | |
| … | |
| } | |

FIG. 39 sps_loop_filter_across_virtual_boundaries_disabled_flag equal to 1 specifies that the in-loop filtering operations are disabled across the virtual boundaries in pictures referring to the SPS. sps_loop_filter_across_virtual_boundaries_disabled_present_flag equal to 0 specifies that no such disabling of in-loop filtering operations is applied in pictures referring to the SPS. In-loop filtering operations include the deblocking filter, sample adaptive offset filter, and adaptive loop filter operations.
sps_loop_filter_across_virtual_boundaries_disabled_present_flag equal to 1 specifies that the syntax elements for the in-loop filtering operations for the virtual boundaries is present in the SPS. sps_loop_filter_across_virtual_boundaries_disabled_present_flag equal to 0 specifies that the syntax elements for the virtual boundaries in-loop filtering operations is not present in the SPS. In-loop filtering operations include the deblocking filter, sample adaptive offset filter, and adaptive loop filter operations.
When gdr_enabled_flag is equal to 1, sps_loop_filter_across_virtual_boundaries_disabled_flag is constraint to be 1 and sps_loop_filter_across_virtual_boundaries_disabled_present_flag is constraint to be 0.
sps_num_ver_virtual_boundaries specifies the number of sps_virtual_boundaries_pos_x[ i ] syntax elements that are present in the SPS. When sps_num_ver_virtual_boundaries is not present, it is inferred to be equal to 0.
sps_virtual_boundaries_pos_x[ i ] is used to compute the value of VirtualBoundariesPosX[ i ], which specifies the location of the i-th vertical virtual boundary in units of luma samples. sps_virtual_boundaries_pos_x[ i ] shall be in the range of 1 to Ceil( pic_width_in_luma_samples ÷ 8 ) − 1, inclusive.
sps_num_hor_virtual_boundaries specifies the number of sps_virtual_boundaries_pos_y[ i ] syntax elements that are present in the SPS. When sps_num_hor_virtual_boundaries is not present, it is inferred to be equal to 0.
When sps_loop_filter_across_virtual_boundaries_disabled_flag is equal to 1 and sps_loop_filter_across_virtual_boundaries_disabled_present_flag is equal to 1, the sum of sps_num_ver_virtual_boundaries and sps_num_hor_virtual_boundaries shall be greater than 0.
sps_virtual_boundaries_pos_y[ i ] is used to compute the value of VirtualBoundariesPosY[ i ], which specifies the location of the i-th horizontal virtual boundary in units of luma samples. sps_virtual_boundaries_pos_y[ i ] shall be in the range of 1 to Ceil( pic_height_in_luma_samples ÷ 8 ) − 1, inclusive.

FIG. 40

| picture_header_rbsp( ) { | **Descriptor** |
| --- | --- |
| **non_reference_picture_flag** | u(1) |
| … | |
| if( sps_loop_filter_across_virtual_boundaries_disabled_flag) { | |
| **ph_loop_filter_across_virtual_boundaries_disabled_present_flag** | u(1) |
| if( ph_loop_filter_across_virtual_boundaries_disabled_present_flag ) { | |
| **ph_num_ver_virtual_boundaries** | u(2) |
| for( i = 0; i < ph_num_ver_virtual_boundaries; i++ ) | |
| **ph_virtual_boundaries_pos_x**[ i ] | u(13) |
| **ph_num_hor_virtual_boundaries** | u(2) |
| for( i = 0; i < ph_num_hor_virtual_boundaries; i++ ) | |
| **ph_virtual_boundaries_pos_y**[ i ] | u(13) |
| } | |
| } | |
| … | |
| } | |

FIG. 41 ph_loop_filter_across_virtual_boundaries_disabled_present_flag equal to 1 specifies that the in-loop filtering operations are disabled across the virtual boundaries in pictures associated to the PH. ph_loop_filter_across_virtual_boundaries_disabled__present_flag equal to 0 specifies that no such disabling of in-loop filtering operations is applied in pictures associated to the PH. The in-loop filtering operations include the deblocking filter, sample adaptive offset filter, and adaptive loop filter operations. When not present, the value of ph_loop_filter_across_virtual_boundaries_disabled_present_flag is inferred to be equal to 0.

The parameter VirtualBoundariesDisabledFlag is derived as follows:

```
VirtualBoundariesDisabledFlag = 0
if( sps_loop_filter_across_virtual_boundaries_disabled_flag )
    VirtualBoundariesDisabledFlag =
sps_loop_filter_across_virtual_boundaries_disabled_present_flag
        || ph_loop_filter_across_virtual_boundaries_disabled_present_flag
```

Alternatively, the following constraint may be specified:
When sps_loop_filter_across_virtual_boundaries_disabled_flag is equal to 1 and sps_loop_filter_across_virtual_boundaries_disabled_present_flag is equal to 0, ph_loop_filter_across_virtual_boundaries_disabled_present_flag is equal to 1
ph_num_ver_virtual_boundaries specifies the number of ph_virtual_boundaries_pos_x[ i ] syntax elements that are present in the PH. When ph_num_ver_virtual_boundaries is not present, it is inferred to be equal to 0.
The parameter VirtualBoundariesNumVer is derived as follows:

```
VirtualBoundariesNumVer = sps_num_ver_virtual_boundaries +
ph_num_ver_virtual_boundaries                    (7-43)
```

ph_num_hor_virtual_boundaries specifies the number of ph_virtual_boundaries_pos_y[ i ] syntax elements that are present in the PH. When ph_num_hor_virtual_boundaries is not present, it is inferred to be equal to 0.

The distance between any two vertical virtual boundaries shall be greater than or equal to CtbSizeY luma samples.

ph_virtual_boundaries_pos_x[ i ] is used to compute the value of VirtualBoundariesPosX[ i ], which specifies the location of the i-th vertical virtual boundary in units of luma samples. ph_virtual_boundaries_pos_x[ i ] shall be in the range of 1 to Ceil( pic_width_in_luma_samples ÷ 8 ) − 1, inclusive.
The list VirtualBoundariesPosX[ i ], for I ranges from 0 to VirtualBoundariesNumVer − 1, inclusive, is derived as follows:

```
for( i = 0; i < VirtualBoundariesNumVer; i++) {
    if( sps_loop_filter_across_virtual_boundaries_disabled_flag ) {
        VirtualBoundariesPosX[ i ] = ( i < sps_num_ver_virtual_boundaries ) ?
            sps_virtual_boundaries_pos_x[ i ] :
            ph_virtual_boundaries_pos_x[ i − sps_num_ver_virtual_boundaries ]
        VirtualBoundariesPosX[ i ]  *=  8
    } else
        VirtualBoundariesPosX[ i ] = 0
}
```

FIG. 42

The distance between any two vertical virtual boundaries shall be greater than or equal to CtbSizeY luma samples.
ph_num_hor_virtual_boundaries specifies the number of ph_virtual_boundaries_pos_y[ i ] syntax elements that are present in the PH. When ph_num_hor_virtual_boundaries is not present, it is inferred to be equal to 0.
The parameter VirtualBoundariesNumHor is derived as follows:

VirtualBoundariesNumHor = sps_num_hor_virtual_boundaries + ph_num_hor_virtual_boundaries (7-45)

ph_virtual_boundaries_pos_y[ i ] is used to compute the value of VirtualBoundariesPosY[ i ], which specifies the location of the i-th horizontal virtual boundary in units of luma samples.
ph_virtual_boundaries_pos_y[ i ] shall be in the range of 1 to Ceil( pic_height_in_luma_samples ÷ 8 ) − 1, inclusive.
The location of the horizontal virtual boundary VirtualBoundariesPosY[ i ] is derived as follows:
The list VirtualBoundariesPosY[ i ], for i ranges from 0 to VirtualBoundariesNumHor − 1, inclusive, is derived as follows:

```
for( i = 0; i < VirtualBoundariesNumHor; i++) {
    if( sps_loop_filter_across_virtual_boundaries_disabled_flag ) {
        VirtualBoundariesPosY[ i ] = ( i < sps_num_hor_virtual_boundaries ) ?
            sps_virtual_boundaries_pos_y[ i ] :
            ph_virtual_boundaries_pos_y[ i − sps_num_hor_virtual_boundaries ]
        VirtualBoundariesPosY[ i ] *= 8
    } else
        VirtualBoundariesPosY[ i ] = 0
}
```

The distance between any two horizontal virtual boundaries shall be greater than or equal to CtbSizeY luma samples
When sps_loop_filter_across_virtual_boundaries_disabled_flag is equal to 1 and ph_loop_filter_across_virtual_boundaries_disabled_present_flag is equal to 1, the sum of ph_num_ver_virtual_boundaries and ph_num_hor_virtual_boundaries shall be greater than 0.

FIG. 43

| seq_parameter_set_rbsp( ) { | **Descriptor** |
|---|---|
| **sps_decoding_parameter_set_id** | u(4) |
| … | |
| **sps_loop_filter_across_virtual_boundaries_disabled_flag** | u(1) |
| if( sps_loop_filter_across_virtual_boundaries_disabled_flag ) { | |
| **sps_num_ver_virtual_boundaries** | u(2) |
| for( i = 0; i < sps_num_ver_virtual_boundaries; i++ ) | |
| **sps_virtual_boundaries_pos_x**[ i ] | u(13) |
| **sps_num_hor_virtual_boundaries** | u(2) |
| for( i = 0; i < sps_num_hor_virtual_boundaries; i++ ) | |
| **sps_virtual_boundaries_pos_y**[ i ] | u(13) |
| } | |
| … | |
| } | |

FIG. 44 sps_loop_filter_across_virtual_boundaries_disabled_flag equal to 1 specifies that the in-loop filtering operations are disabled across the virtual boundaries in pictures referring to the SPS. sps_loop_filter_across_virtual_boundaries_disabled_present_flag equal to 0 specifies that no such disabling of in-loop filtering operations is applied in pictures referring to the SPS. In-loop filtering operations include the deblocking filter, sample adaptive offset filter, and adaptive loop filter operations.

sps_loop_filter_across_virtual_boundaries_disabled_present_flag equal to 1 specifies that the syntax elements for the in-loop filtering operations for the virtual boundaries is present in the SPS. sps_loop_filter_across_virtual_boundaries_disabled_present_flag equal to 0 specifies that the syntax elements for the virtual boundaries in-loop filtering operations is not present in the SPS. In-loop filtering operations include the deblocking filter, sample adaptive offset filter, and adaptive loop filter operations.

When gdr_enabled_flag is equal to 1, sps_loop_filter_across_virtual_boundaries_disabled_flag is constraint to be 1 and sps_loop_filter_across_virtual_boundaries_disabled_present_flag is constraint to be 0.

sps_num_ver_virtual_boundaries specifies the number of sps_virtual_boundaries_pos_x[ i ] syntax elements that are present in the SPS. When sps_num_ver_virtual_boundaries is not present, it is inferred to be equal to 0.

sps_virtual_boundaries_pos_x[ i ] is used to compute the value of VirtualBoundariesPosX[ i ], which specifies the location of the i-th vertical virtual boundary in units of luma samples. sps_virtual_boundaries_pos_x[ i ] shall be in the range of 1 to Ceil( pic_width_in_luma_samples ÷ 8 ) − 1, inclusive.

sps_num_hor_virtual_boundaries specifies the number of sps_virtual_boundaries_pos_y[ i ] syntax elements that are present in the SPS. When sps_num_hor_virtual_boundaries is not present, it is inferred to be equal to 0.

When sps_loop_filter_across_virtual_boundaries_disabled_flag is equal to 1 and sps_loop_filter_across_virtual_boundaries_disabled_present_flag is equal to 1, the sum of sps_num_ver_virtual_boundaries and sps_num_hor_virtual_boundaries shall be greater than 0.

sps_virtual_boundaries_pos_y[ i ] is used to compute the value of VirtualBoundariesPosY[ i ], which specifies the location of the i-th horizontal virtual boundary in units of luma samples. sps_virtual_boundaries_pos_y[ i ] shall be in the range of 1 to Ceil( pic_height_in_luma_samples ÷ 8 ) − 1, inclusive.

FIG. 45

| picture_header_rbsp( ) { | **Descriptor** |
|---|---|
| **non_reference_picture_flag** | u(1) |
| ... | |
| if( sps_loop_filter_across_virtual_boundaries_disabled_flag) { | |
| **ph_loop_filter_across_virtual_boundaries_disabled_present_flag** | u(1) |
| if( ph_loop_filter_across_virtual_boundaries_disabled_present_flag ) { | |
| for( i = 0; i < sps_num_ver_virtual_boundaries; i++ ) { | |
| **ph_virtual_boundaries_pos_x_delta**[ i ] | ue(v) |
| if( ph_virtual_boundaries_pos_x_delta[ i ] > 0 ) | |
| **ph_virtual_boundaries_pos_x_sign**[ i ] | u(1) |
| } | |
| for( i = 0; i < sps_num_hor_virtual_boundaries; i++ ) { | |
| **ph_virtual_boundaries_pos_y_delta**[ i ] | ue(v) |
| if( ph_virtual_boundaries_pos_y_delta[ i ] > 0 ) | |
| **ph_virtual_boundaries_pos_y_sign**[ i ] | u(1) |
| } | |
| } | |
| } | |
| ... | |
| } | |

FIG. 46 ph_loop_filter_across_virtual_boundaries_disabled_present_flag equal to 1 specifies that the in-loop filtering operations are disabled across the virtual boundaries in pictures associated to the PH. ph_loop_filter_across_virtual_boundaries_disabled_present_flag equal to 0 specifies that no such disabling of in-loop filtering operations is applied in pictures associated to the PH. The in-loop filtering operations include the deblocking filter, sample adaptive offset filter, and adaptive loop filter operations. When not present, the value of ph_loop_filter_across_virtual_boundaries_disabled_present_flag is inferred to be equal to 0.

The parameter VirtualBoundariesDisabledFlag is derived as follows:

```
VirtualBoundariesDisabledFlag = (sps_num_ver_virtual_boundaries +
                                 sps_num_hor_virtual_boundaries > 0 ) ? 1 : 0
```

ph_virtual_boundaries_pos_x_delta[ i ] is used to compute the value of VirtualBoundariesPosX[ i ], which specifies the location of the i-th vertical virtual boundary in units of luma samples. ph_virtual_boundaries_pos_x[ i ] shall be in the range of 1 to Ceil( pic_width_in_luma_samples ÷ 8 ) − 1, inclusive.
ph_virtual_boundaries_pos_x_sign[ i ] specifies the sign of the i-th virtual boundary, which specifies the location of the i th vertical virtual boundary in units of luma samples. When not present, the value of ph_virtual_boundaries_pos_x_sign[ i ] is inferred to be equal to 0.
The variable phVirtualBoundariesPosX[ i ] for i ranges from 0 to sps_num_ver_virtual_boundaries − 1, inclusive, is initialized as follows:

```
phVirtualBoundariesPosX[ i ]  = ph_virtual_boundaries_pos_x_delta[ i ] *
                                ( 1 − 2 * ph_virtual_boundaries_pos_x_sign[ i ])
```

The location of the vertical virtual boundary VirtualBoundariesPosX[ i ] is derived as follows:

```
VirtualBoundariesPosX[ i ] = 0
if( sps_loop_filter_across_virtual_boundaries_disabled_flag ) {
    if( ph_loop_filter_across_virtual_boundaries_disabled_present_flag )          (7-44)
        VirtualBoundariesPosX[ i ] = ( sps_virtual_boundaries_pos_x[ i ] +
                   phVirtualBoundariesPosX[ i ] ) * 8
    else
        VirtualBoundariesPosX[ i ] = ( sps_virtual_boundaries_pos_x[ i ] )  * 8
}
```

The distance between any two vertical virtual boundaries shall be greater than or equal to CtbSizeY luma samples.
ph_num_hor_virtual_boundaries specifies the number of ph_virtual_boundaries_pos_y[ i ] syntax elements that are present in the PH. When ph_num_hor_virtual_boundaries is not present, it is inferred to be equal to 0.
ph_virtual_boundaries_pos_y_delta[ i ] is used to compute the value of VirtualBoundariesPosY[ i ], which specifies the location of the i-th horizontal virtual boundary in units of luma samples. ph_virtual_boundaries_pos_y[ i ] shall be in the range of 1 to Ceil( pic_height_in_luma_samples ÷ 8 ) − 1, inclusive.
The location of the horizontal virtual boundary VirtualBoundariesPosY[ i ] is derived as follows:

FIG. 47 ph_virtual_boundaries_pos_y_sign [ i ] specifies the sign of the i-th virtual boundary, which specifies the location of the i th horizontal virtual boundary in units of luma samples. When not present, the value of ph_virtual_boundaries_pos_y_sign[ i ] is inferred to be equal to 0.
The variable phVirtualBoundariesPosY[ i ] for i ranges from 0 to sps_num_hor_virtual_boundaries − 1, inclusive, is initialized as follows:

```
phVirtualBoundariesPosY[ i ]  = ph_virtual_boundaries_pos_y_delta[ i ] *
                                ( 1 − 2 * ph_virtual_boundaries_pos_y_sign [ i ])

    VirtualBoundariesPosY[ i ] = 0
    if( sps_loop_filter_across_virtual_boundaries_disabled_flag ) {
        if( ph_loop_filter_across_virtual_boundaries_disabled_present_flag )          (7-46)
            VirtualBoundariesPosY[ i ] = ( sps_virtual_boundaries_pos_y[ i ] +
            phVirtualBoundariesPosY[ i ] ) * 8
        else
            VirtualBoundariesPosY[ i ] = ( sps_virtual_boundaries_pos_y[ i ] )  * 8
    }
```

The distance between any two horizontal virtual boundaries shall be greater than or equal to CtbSizeY luma samples
When sps_loop_filter_across_virtual_boundaries_disabled_flag is equal to 1 and ph_loop_filter_across_virtual_boundaries_disabled_present_flag is equal to 1, the sum of ph_num_ver_virtual_boundaries and ph_num_hor_virtual_boundaries shall be greater than 0.
When sps_loop_filter_across_virtual_boundaries_disabled_flag is equal to 1 and ph_loop_filter_across_virtual_boundaries_disabled_present_flag is equal to 1, the sum of sps_num_ver_virtual_boundaries, sps_num_hor_virtual_boundaries, ph_num_ver_virtual_boundaries and ph_num_hor_virtual_boundaries shall not be greater than 8.

FIG. 48

| seq_parameter_set_rbsp( ) { | Descriptor |
|---|---|
| **sps_decoding_parameter_set_id** | u(4) |
| ... | |
| **sps_loop_filter_across_virtual_boundaries_disabled_flag** | u(1) |
| if( sps_loop_filter_across_virtual_boundaries_disabled_flag ) { | |
| **sps_loop_filter_across_virtual_boundaries_disabled_present_flag** | u(1) |
| if( sps_loop_filter_across_virtual_boundaries_disabled_present_flag ) { | |
| **sps_num_ver_virtual_boundaries** | u(2) |
| for( i = 0; i < sps_num_ver_virtual_boundaries; i++ ) | |
| **sps_virtual_boundaries_pos_x**[ i ] | u(13) |
| **sps_num_hor_virtual_boundaries** | u(2) |
| for( i = 0; i < sps_num_hor_virtual_boundaries; i++ ) | |
| **sps_virtual_boundaries_pos_y**[ i ] | u(13) |
| } | |
| } | |
| ... | |
| } | |

FIG. 49 sps_loop_filter_across_virtual_boundaries_disabled_flag equal to 1 specifies that the in-loop filtering operations are disabled across the virtual boundaries in pictures referring to the SPS. sps_loop_filter_across_virtual_boundaries_disabled_present_flag equal to 0 specifies that no such disabling of in-loop filtering operations is applied in pictures referring to the SPS. In-loop filtering operations include the deblocking filter, sample adaptive offset filter, and adaptive loop filter operations.

sps_loop_filter_across_virtual_boundaries_disabled_present_flag equal to 1 specifies that the syntax elements for the in-loop filtering operations for the virtual boundaries is present in the SPS. sps_loop_filter_across_virtual_boundaries_disabled_present_flag equal to 0 specifies that the syntax elements for the virtual boundaries in-loop filtering operations is not present in the SPS. In-loop filtering operations include the deblocking filter, sample adaptive offset filter, and adaptive loop filter operations.

When gdr_enabled_flag is equal to 1, sps_loop_filter_across_virtual_boundaries_disabled_flag is constraint to be 1 and sps_loop_filter_across_virtual_boundaries_disabled_present_flag is constraint to be 0.

sps_num_ver_virtual_boundaries specifies the number of sps_virtual_boundaries_pos_x[ i ] syntax elements that are present in the SPS. When sps_num_ver_virtual_boundaries is not present, it is inferred to be equal to 0.

sps_virtual_boundaries_pos_x[ i ] is used to compute the value of VirtualBoundariesPosX[ i ], which specifies the location of the i-th vertical virtual boundary in units of luma samples. sps_virtual_boundaries_pos_x[ i ] shall be in the range of 1 to Ceil( pic_width_in_luma_samples ÷ 8 ) − 1, inclusive.

sps_num_hor_virtual_boundaries specifies the number of sps_virtual_boundaries_pos_y[ i ] syntax elements that are present in the SPS. When sps_num_hor_virtual_boundaries is not present, it is inferred to be equal to 0.

When sps_loop_filter_across_virtual_boundaries_disabled_flag is equal to 1 and sps_loop_filter_across_virtual_boundaries_disabled_present_flag is equal to 1, the sum of sps_num_ver_virtual_boundaries and sps_num_hor_virtual_boundaries shall be greater than 0.

sps_virtual_boundaries_pos_y[ i ] is used to compute the value of VirtualBoundariesPosY[ i ], which specifies the location of the i-th horizontal virtual boundary in units of luma samples. sps_virtual_boundaries_pos_y[ i ] shall be in the range of 1 to Ceil( pic_height_in_luma_samples ÷ 8 ) − 1, inclusive.

FIG. 50

| picture_header_rbsp( ) { | **Descriptor** |
|---|---|
| **non_reference_picture_flag** | u(1) |
| … | |
| if( sps_loop_filter_across_virtual_boundaries_disabled_flag) { | |
| **ph_loop_filter_across_virtual_boundaries_disabled_present_flag** | u(1) |
| if( ph_loop_filter_across_virtual_boundaries_disabled_present_flag ) { | |
| if( !sps_num_ver_virtual_boundaries ) | |
| **ph_num_ver_virtual_boundaries** | u(2) |
| for( i = 0; i < ph_num_ver_virtual_boundaries; i++ ) { | |
| **ph_virtual_boundaries_pos_x_delta**[ i ] | ue(v) |
| if( ph_virtual_boundaries_pos_x_delta[ i ] > 0 ) | |
| **ph_virtual_boundaries_pos_x_sign**[ i ] | u(1) |
| } | |
| if( !sps_num_hor_virtual_boundaries ) | |
| **ph_num_hor_virtual_boundaries** | u(2) |
| for( i = 0; i < ph_num_hor_virtual_boundaries; i++ ) { | |
| **ph_virtual_boundaries_pos_y_delta**[ i ] | ue(v) |
| if( ph_virtual_boundaries_pos_y_delta[ i ] > 0 ) | |
| **ph_virtual_boundaries_pos_y_sign**[ i ] | u(1) |
| } | |
| } | |
| } | |
| … | |
| } | |

FIG. 51 ph_loop_filter_across_virtual_boundaries_disabled_present_flag equal to 1 specifies that the in-loop filtering operations are disabled across the virtual boundaries in pictures associated to the PH. ph_loop_filter_across_virtual_boundaries_disabled_present_flag equal to 0 specifies that no such disabling of in-loop filtering operations is applied in pictures associated to the PH. The in-loop filtering operations include the deblocking filter, sample adaptive offset filter, and adaptive loop filter operations. When not present, the value of ph_loop_filter_across_virtual_boundaries_disabled_present_flag is inferred to be equal to 0.

The parameter VirtualBoundariesDisabledFlag is derived as follows:

```
VirtualBoundariesDisabledFlag = 0
if( sps_loop_filter_across_virtual_boundaries_disabled_flag )
    VirtualBoundariesDisabledFlag =
sps_loop_filter_across_virtual_boundaries_disabled_present_flag
        | | ph_loop_filter_across_virtual_boundaries_disabled_present_flag
```

Alternatively, the following constraint may be specified:
When sps_loop_filter_across_virtual_boundaries_disabled_flag is equal to 1 and sps_loop_filter_across_virtual_boundaries_disabled_present_flag is equal to 0, ph_loop_filter_across_virtual_boundaries_disabled_present_flag is equal to 1 ph_num_ver_virtual_boundaries specifies the number of ph_virtual_boundaries_pos_x_delta[ i ] syntax elements that are present in the PH. When ph_num_ver_virtual_boundaries is not present, it is inferred to be equal to sps_num_ver_virtual_boundaries.

ph_num_hor_virtual_boundaries specifies the number of ph_virtual_boundaries_pos_y_delta[ i ] syntax elements that are present in the PH. When ph_num_hor_virtual_boundaries is not present, it is inferred to be equal to sps_num_hot_virtual_boundaries.

ph_virtual_boundaries_pos_x_delta[ i ] is used to compute the value of VirtualBoundariesPosX[ i ], which specifies the location of the i-th vertical virtual boundary in units of luma samples. ph_virtual_boundaries_pos_x[ i ] shall be in the range of 1 to Ceil( pic_width_in_luma_samples ÷ 8 ) − 1, inclusive.

ph_virtual_boundaries_pos_x_sign [ i ] specifies the sign of the i-th virtual boundary, which specifies the location of the i th vertical virtual boundary in units of luma samples. When not present, the value of ph_virtual_boundaries_pos_x_sign[ i ] is inferred to be equal to 0.

The variable phVirtualBoundariesPosX[ i ] for i ranges from 0 to sps_num_ver_virtual_boundaries − 1, inclusive, is initialized as follows:

```
phVirtualBoundariesPosX[ i ] = ph_virtual_boundaries_pos_x_delta[ i ] *
                        ( 1 − 2 * ph_virtual_boundaries_pos_x_sign[ i ])
```

The location of the vertical virtual boundary VirtualBoundariesPosX[ i ] is derived as follows:

```
VirtualBoundariesPosX[ i ] = 0
if( sps_loop_filter_across_virtual_boundaries_disabled_flag ) {
    if( sps_loop_filter_across_virtual_boundaries_disabled_present_flag ) {
        if( ph_loop_filter_across_virtual_boundaries_disabled_present_flag )        (7-44)
            VirtualBoundariesPosX[ i ] = ( sps_virtual_boundaries_pos_x[ i ] +
                        phVirtualBoundariesPosC[ i ] ) * 8
        else
            VirtualBoundariesPosX[ i ] = ( sps_virtual_boundaries_pos_x[ i ] ) * 8
    } else if( ph_loop_filter_across_virtual_boundaries_disabled_present_flag)
        VirtualBoundariesPosX[ i ] = phVirtualBoundariesPosX[ i ] * 8
}
```

FIG. 52

The distance between any two vertical virtual boundaries shall be greater than or equal to CtbSizeY luma samples.
ph_num_hor_virtual_boundaries specifies the number of ph_virtual_boundaries_pos_y[ i ] syntax elements that are present in the PH. When ph_num_hor_virtual_boundaries is not present, it is inferred to be equal to 0.
ph_virtual_boundaries_pos_y_delta[ i ] is used to compute the value of VirtualBoundariesPosY[ i ], which specifies the location of the i-th horizontal virtual boundary in units of luma samples.
ph_virtual_boundaries_pos_y[ i ] shall be in the range of 1 to Ceil( pic_height_in_luma_samples ÷ 8 ) − 1, inclusive.
The location of the horizontal virtual boundary VirtualBoundariesPosY[ i ] is derived as follows:
ph_virtual_boundaries_pos_y_sign [ i ] specifies the sign of the i-th virtual boundary, which specifies the location of the i th horizontal virtual boundary in units of luma samples. When not present, the value of ph_virtual_boundaries_pos_y_sign[ i ] is inferred to be equal to 0.
The variable phVirtualBoundariesPosY[ i ] for i ranges from 0 to sps_num_hor_virtual_boundaries − 1, inclusive, is initialized as follows:

```
phVirtualBoundariesPosY[ i ]  = ph_virtual_boundaries_pos_y_delta[ i ] *
                        ( 1 − 2 * ph_virtual_boundaries_pos_y_sign[ i ])

    VirtualBoundariesPosY[ i ] = 0
    if( sps_loop_filter_across_virtual_boundaries_disabled_flag )
        if( sps_loop_filter_across_virtual_boundaries_disabled_present_flag )
            if( ph_loop_filter_across_virtual_boundaries_disabled_present_flag )        (7-46)
                VirtualBoundariesPosY[ i ] = ( sps_virtual_boundaries_pos_y[ i ] +
                            phVirtualBoundariesPosY[ i ] ) * 8
            else
                VirtualBoundariesPosY[ i ] = ( sps_virtual_boundaries_pos_y[ i ] )  * 8
        else if( ph_loop_filter_across_virtual_boundaries_disabled_present_flag)
            VirtualBoundariesPosY[ i ] = phVirtualBoundariesPosY[ i ] ) * 8
    }
```

The distance between any two horizontal virtual boundaries shall be greater than or equal to CtbSizeY luma samples
When sps_loop_filter_across_virtual_boundaries_disabled_flag is equal to 1 and ph_loop_filter_across_virtual_boundaries_disabled_present_flag is equal to 1, the sum of ph_num_ver_virtual_boundaries and ph_num_hor_virtual_boundaries shall be greater than 0.
When sps_loop_filter_across_virtual_boundaries_disabled_flag is equal to 1 and ph_loop_filter_across_virtual_boundaries_disabled_present_flag is equal to 1, the sum of sps_num_ver_virtual_boundaries, sps_num_hor_virtual_boundaries, ph_num_ver_virtual_boundaries and ph_num_hor_virtual_boundaries shall not be greater than 8.

IMAGE CODING APPARATUS AND METHOD BASED ON SIGNALING OF INFORMATION FOR FILTERING

CROSS-REFERENCE TO RELATED APPLICATIONS

This application is a continuation of U.S. application Ser. No. 17/777,371, filed on May 17, 2022, which is a National Stage application under 35 U.S.C. § 371 of International Application No. PCT/KR2020/016141, filed on Nov. 17, 2020, which claims the benefit of U.S. Provisional Application No. 62/937,237, filed on Nov. 18, 2019. The disclosures of the prior applications are incorporated by reference in their entirety.

BACKGROUND OF THE DISCLOSURE

Field of the Disclosure

The present document relates to an image coding apparatus and method based on signaling of information for filtering.

Related Art

Recently, demand for high-resolution, high-quality image/video such as 4K or 8K or higher ultra high definition (UHD) image/video has increased in various fields. As image/video data has high resolution and high quality, the amount of information or bits to be transmitted increases relative to the existing image/video data, and thus, transmitting image data using a medium such as an existing wired/wireless broadband line or an existing storage medium or storing image/video data using existing storage medium increase transmission cost and storage cost.

In addition, interest and demand for immersive media such as virtual reality (VR) and artificial reality (AR) content or holograms has recently increased and broadcasting for image/video is having characteristics different from reality images such as game images has increased.

Accordingly, a highly efficient image/video compression technology is required to effectively compress, transmit, store, and reproduce information of a high-resolution, high-quality image/video having various characteristics as described above. Specifically, there is discussion on a method for effectively signaling in-loop filtering-related information and subpicture-related information for improving subjective/objective visual quality of a reconstructed picture.

SUMMARY

According to an embodiment of the present document, a method and an apparatus for increasing image coding efficiency are provided.

According to an embodiment of the present document, efficient filtering application method and apparatus are provided.

According to an embodiment of the present document, a method and apparatus for effectively applying deblocking, sample adaptive offset (SAO), and adaptive loop filtering (ALF) are provided.

According to an embodiment of the present document, in-loop filtering may be performed based on virtual boundaries.

According to an embodiment of the present document, a sequence parameter set (SPS) may include an SPS virtual boundaries enabled flag indicating whether in-loop filtering is performed across virtual boundaries.

According to an embodiment of the present document, in-loop filtering may be performed across the virtual boundaries, based on the SPS virtual boundaries enabled flag.

According to an embodiment of the present document, an encoding apparatus for performing video/image encoding is provided.

According to one embodiment of the present document, there is provided a computer-readable digital storage medium in which encoded video/image information, generated according to the video/image encoding method disclosed in at least one of the embodiments of the present document, is stored.

According to an embodiment of the present document, there is provided a computer-readable digital storage medium in which encoded information or encoded video/image information, causing to perform the video/image decoding method disclosed in at least one of the embodiments of the present document by the decoding apparatus, is stored.

According to an embodiment of the present document, overall image/video compression efficiency may be improved.

According to an embodiment of the present document, subjective/objective visual quality may be improved through efficient filtering.

An in-loop filtering process based on virtual boundaries according to an embodiment of present document may save a hardware resource.

According to an embodiment of the present document, the in-loop filtering process based on the virtual boundaries may be effectively performed, and filtering performance may be improved.

According to an embodiment of the present document, information for in-loop filtering based on the virtual boundaries may be effectively signaled.

BRIEF DESCRIPTION OF THE DRAWINGS

FIG. 14 to FIG. 15 show an exemplary syntax and semantics of an SPS according to the present embodiment.

FIG. 16 to FIG. 17 show an exemplary syntax and semantics of a picture parameter set (PPS) according to the present embodiment.

FIG. 18 to FIG. 21 show an exemplary syntax and semantics of a picture header according to the present embodiment.

FIG. 22 to FIG. 23 show an exemplary syntax and semantics of a slice header according to the present embodiment.

FIG. 24 shows an exemplary syntax of the SPS according to the present embodiment.

FIG. 25 shows an exemplary semantics of syntax elements included in the syntax.

FIG. 26 shows an exemplary syntax of the header information (the picture header) according to the present embodiment.

FIG. 27 shows an exemplary semantics of syntax elements included in the syntax.

FIG. 28 shows an exemplary syntax of the SPS according to the present embodiment.

FIG. 29 shows an exemplary semantics of syntax elements included in the syntax.

FIG. 30 shows an exemplary syntax of the header information (the picture header) according to the present embodiment.

FIG. 31 to FIG. 32 show an exemplary semantics of syntax elements included in the syntax.

FIG. 33 shows an exemplary syntax of the SPS according to the present embodiment.

FIG. 34 shows an exemplary semantics of syntax elements included in the syntax.

FIG. 35 shows an exemplary syntax of the header information (the picture header) according to the present embodiment.

FIG. 36 to FIG. 37 show an exemplary semantics of syntax elements included in the syntax.

FIG. 38 shows an exemplary syntax of the SPS according to the present embodiment.

FIG. 39 shows an exemplary semantics of syntax elements included in the syntax.

FIG. 40 shows an exemplary syntax of the header information (the picture header) according to the present embodiment.

FIG. 41 to FIG. 42 show an exemplary semantics of syntax elements included in the syntax.

FIG. 43 shows an exemplary syntax of the SPS according to the present embodiment.

FIG. 44 shows an exemplary semantics of syntax elements included in the syntax.

FIG. 45 shows an exemplary syntax of the header information (the picture header) according to the present embodiment.

FIG. 46 to FIG. 47 show an exemplary semantics of syntax elements included in the syntax.

FIG. 48 shows an exemplary syntax of the SPS according to the present embodiment.

FIG. 49 shows an exemplary semantics of syntax elements included in the syntax.

FIG. 50 shows an exemplary syntax of the header information (the picture header) according to the present embodiment.

FIG. 51 to FIG. 52 show an exemplary semantics of syntax elements included in the syntax.

DESCRIPTION OF EXEMPLARY EMBODIMENTS

Figure 1:
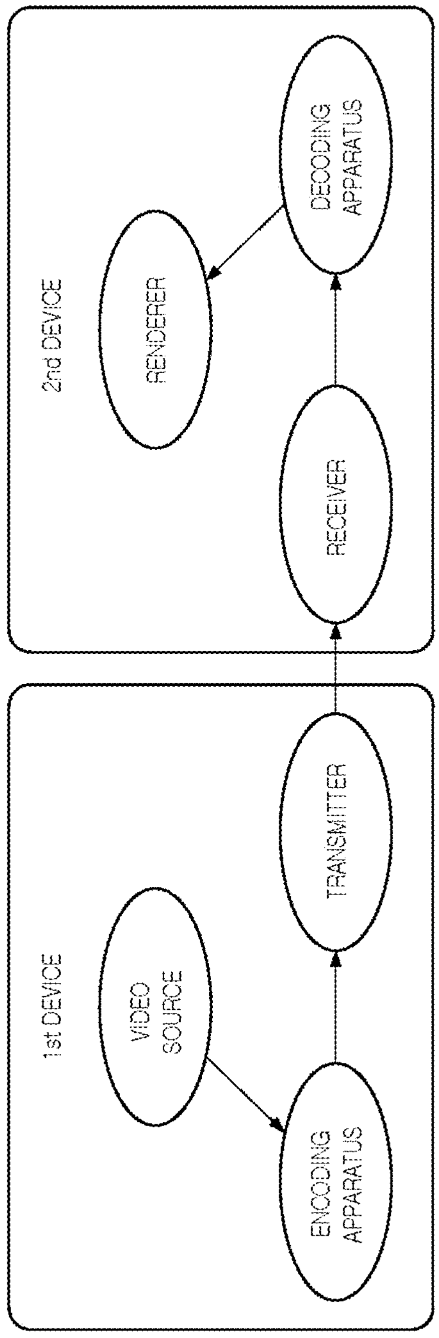
FIG. 1 schematically shows an example of a video/image coding system to which embodiments of the present disclosure may be applied.

The present disclosure may be modified in various forms, and specific embodiments thereof will be described and illustrated in the drawings. However, the embodiments are not intended for limiting the disclosure. The terms used in the following description are used to merely describe specific embodiments, but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

In addition, each configuration of the drawings described in this document is an independent illustration for explaining functions as features that are different from each other, and does not mean that each configuration is implemented by mutually different hardware or different software. For example, two or more of the configurations can be combined to form one configuration, and one configuration can also be divided into multiple configurations. Without departing from the gist of this document, embodiments in which configurations are combined and/or separated are included in the scope of claims.

Hereinafter, examples of the present embodiment will be described in detail with reference to the accompanying drawings. In addition, like reference numerals are used to indicate like elements throughout the drawings, and the same descriptions on the like elements will be omitted.

This document relates to video/image coding. For example, methods/embodiments disclosed in this document may be related to the versatile video coding (VVC) standard (ITU-T Rec. H.266), the next-generation video/image coding standard after VVC, or other video coding related standards (e.g., high efficiency video coding (HEVC) standard (ITU-T Rec. H.265), essential video coding (EVC) standard, AVS2 standard, and the like).

This document suggests various embodiments of video/image coding, and the above embodiments may also be performed in combination with each other unless otherwise specified.

In this document, a video may refer to a series of images overtime. A picture generally refers to the unit representing one image at a particular time frame, and a slice/tile refers to the unit constituting a part of the picture in terms of coding. A slice/tile may include one or more coding tree units (CTUs). One picture may consist of one or more slices/tiles. One picture may consist of one or more tile groups. One tile group may include one or more tiles.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows. Alternatively, the sample may mean a pixel value in the spatial domain, and when such a pixel value is transformed to the frequency domain, it may mean a transform coefficient in the frequency domain.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

In the present specification, "at least one of A and B" may mean "only A", "only B", or "both A and B". Further, in the present specification, the expression "at least one of A or B" or "at least one of A and/or B" may be interpreted the same as "at least one of A and B".

Further, in the present specification, "at least one of A, B and C" may mean "only A", "only B", "only C", or "any combination of A, B and C". Further, "at least one of A, B or C" or "at least one of A, B and/or C" may mean "at least one of A, B and C".

Further, the parentheses used in the present specification may mean "for example". Specifically, in the case that "prediction (intra prediction)" is expressed, it may be indicated that "intra prediction" is proposed as an example of "prediction". In other words, the term "prediction" in the present specification is not limited to "intra prediction", and it may be indicated that "intra prediction" is proposed as an example of "prediction". Further, even in the case that "prediction (i.e., intra prediction)" is expressed, it may be indicated that "intra prediction" is proposed as an example of "prediction".

In the present specification, technical features individually explained in one drawing may be individually implemented, or may be simultaneously implemented.

FIG. 1 illustrates an example of a video/image coding system to which the disclosure of the present document may be applied.

Referring to FIG. 1, a video/image coding system may include a source device and a reception device. The source device may transmit encoded video/image information or data to the reception device through a digital storage medium or network in the form of a file or streaming.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of processes such as prediction, transform, and quantization for compaction and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of processes such as dequantization, inverse transform, and prediction corresponding to the operation of the encoding apparatus.

The renderer may render the decoded video/image. The rendered video/image may be displayed through the display.

Figure 2:
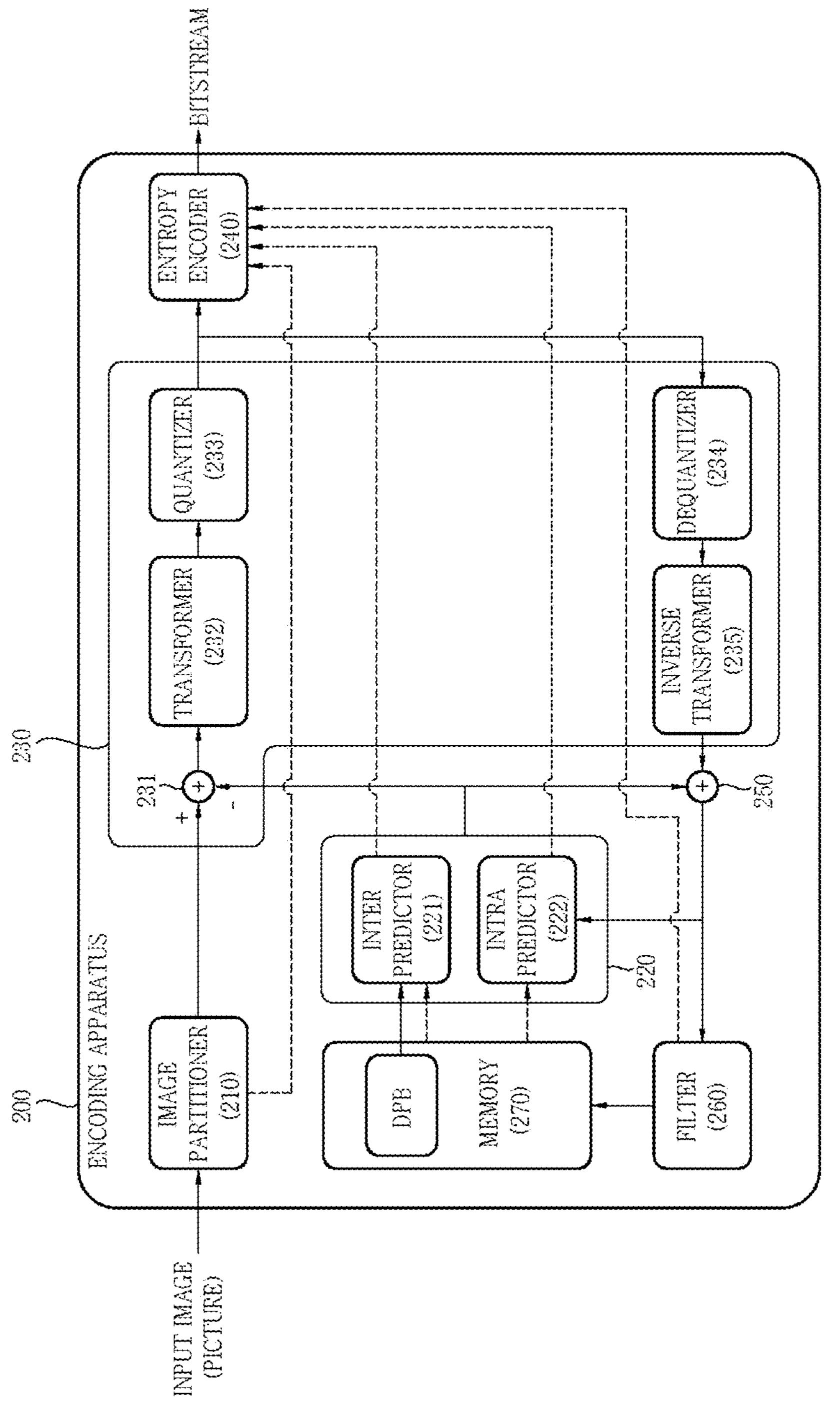
FIG. 2 is a view schematically illustrating the configuration of a video/image encoding apparatus to which embodiments of the present disclosure may be applied.

FIG. 2 is a diagram schematically illustrating the configuration of a video/image encoding apparatus to which the disclosure of the present document may be applied.

Hereinafter, what is referred to as the video encoding apparatus may include an image encoding apparatus.

Referring to FIG. 2, the encoding apparatus 200 may include and be configured with an image partitioner 210, a predictor 220, a residual processor 230, an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or reconstructed block generator. The image partitioner 210, the predictor 220, the residual processor 230, the entropy encoder 240, the adder 250, and the filter 260, which have been described above, may be configured by one or more hardware components (e.g., encoder chipsets or processors) according to an embodiment. In addition, the memory 270 may include a decoded picture buffer (DPB), and may also be configured by a digital storage medium. The hardware component may further include the memory 270 as an internal/external component.

The image partitioner 210 may split an input image (or, picture, frame) input to the encoding apparatus 200 into one or more processing units. As an example, the processing unit may be called a coding unit (CU). In this case, the coding unit may be recursively split according to a Quad-tree binary-tree ternary-tree (QTBTTT) structure from a coding tree unit (CTU) or the largest coding unit (LCU). For example, one coding unit may be split into a plurality of coding units of a deeper depth based on a quad-tree structure, a binary-tree structure, and/or a ternary-tree structure. In this case, for example, the quad-tree structure is first applied and the binary-tree structure and/or the ternary-tree structure may be later applied. Alternatively, the binary-tree structure may also be first applied. A coding process according to the present disclosure may be performed based on a final coding unit which is not split any more. In this case, based on coding efficiency according to image characteristics or the like, the maximum coding unit may be directly used as the final coding unit, or as necessary, the coding unit may be recursively split into coding units of a deeper depth, such that a coding unit having an optimal size may be used as the final coding unit. Here, the coding process may include a process such as prediction, transform, and reconstruction to be described later. As another example, the processing unit may further include a prediction unit (PU) or a transform unit (TU). In this case, each of the prediction unit and the transform unit may be split or partitioned from the aforementioned final coding unit. The prediction unit may be a unit of sample prediction, and the transform unit may be a unit for inducing a transform coefficient and/or a unit for inducing a residual signal from the transform coefficient.

The unit may be interchangeably used with the term such as a block or an area in some cases. Generally, an M×N block may represent samples composed of M columns and N rows or a group of transform coefficients. The sample may generally represent a pixel or a value of the pixel, and may also represent only the pixel/pixel value of a luma component, and also represent only the pixel/pixel value of a chroma component. The sample may be used as the term corresponding to a pixel or a pel configuring one picture (or image).

The subtractor 231 may generate a residual signal (residual block, residual samples, or residual sample array) by subtracting a prediction signal (predicted block, prediction samples, or prediction sample array) output from the predictor 220 from an input image signal (original block, original samples, or original sample array), and the generated residual signal is transmitted to the transformer 232. The predictor 220 may perform prediction for a processing target block (hereinafter, referred to as a "current block"), and generate a predicted block including prediction samples for the current block. The predictor 220 may determine whether intra prediction or inter prediction is applied on a current block or in a CU unit. As described later in the description of each prediction mode, the predictor may generate various kinds of information related to prediction, such as prediction mode information, and transfer the generated information to the entropy encoder 240. The information on the prediction may be encoded in the entropy encoder 240 and output in the form of a bitstream.

The intra predictor 222 may predict a current block with reference to samples within a current picture. The referenced samples may be located neighboring to the current block, or may also be located away from the current block according to the prediction mode. The prediction modes in the intra prediction may include a plurality of non-directional modes and a plurality of directional modes. The non-directional mode may include, for example, a DC mode or a planar mode. The directional mode may include, for example, 33 directional prediction modes or 65 directional prediction modes according to the fine degree of the prediction direction. However, this is illustrative and the directional prediction modes which are more or less than the above number may be used according to the setting. The intra predictor 222 may also determine the prediction mode applied to the current block using the prediction mode applied to the neighboring block.

The inter predictor 221 may induce a predicted block of the current block based on a reference block (reference sample array) specified by a motion vector on a reference picture. At this time, in order to decrease the amount of motion information transmitted in the inter prediction mode, the motion information may be predicted in units of a block, a sub-block, or a sample based on the correlation of the motion information between the neighboring block and the current block. The motion information may include a motion vector and a reference picture index. The motion information may further include inter prediction direction (L0 prediction, L1 prediction, Bi prediction, or the like) information. In the case of the inter prediction, the neighboring block may include a spatial neighboring block existing within the current picture and a temporal neighboring block existing in the reference picture. The reference picture including the reference block and the reference picture including the temporal neighboring block may also be the same as each other, and may also be different from each other. The temporal neighboring block may be called the name such as a collocated reference block, a collocated CU (colCU), or the like, and the reference picture including the temporal neighboring block may also be called a collocated picture (colPic). For example, the inter predictor 221 may configure a motion information candidate list based on the neighboring blocks, and generate information indicating what candidate is used to derive the motion vector and/or the reference picture index of the current block. The inter prediction may be performed based on various prediction modes, and for example, in the case of a skip mode and a merge mode, the inter predictor 221 may use the motion information of the neighboring block as the motion information of the current block. In the case of the skip mode, the residual signal may not be transmitted unlike the merge mode. A motion vector prediction (MVP) mode may indicate the motion vector of the current block by using the motion vector of the neighboring block as a motion vector predictor, and signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may perform an intra block copy (IBC) for prediction of a block. The intra block copy may be used for content image/moving image coding of a game or the like, for example, screen content coding (SCC). The IBC basically performs prediction in the current picture, but may be performed similarly to inter prediction in that a reference block is derived in the current picture. That is, the IBC may use at least one of inter prediction techniques described in the present document.

The prediction signal generated through the inter predictor 221 and/or the intra predictor 222 may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a graph-based transform (GBT), or a conditionally non-linear transform (CNT). Here, the GBT means transform obtained from a graph when relationship information between pixels is represented by the graph. The CNT refers to the transform obtained based on a prediction signal generated using all previously reconstructed pixels. In addition, the transform process may be applied to square pixel blocks having the same size, or may be applied to blocks having a variable size rather than a square.

The quantizer 233 may quantize the transform coefficients and transmit them to the entropy encoder 240, and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order, and generate information on the quantized transform coefficients based on the quantized transform coefficients in the one-dimensional vector form. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction together with or separately from the quantized transform coefficients (e.g., values of syntax elements and the like). Encoded information (e.g., encoded video/image information) may be transmitted or stored in the unit of a network abstraction layer (NAL) in the form of a bitstream. The video/image information may further include information on various parameter sets, such as an adaptation parameter set (APS), a picture parameter set (PPS), a sequence parameter set (SPS), or a video parameter set (VPS). In addition, the video/image information may further include general constraint information. In the present document, information and/or syntax elements being signaled/transmitted to be described later may be encoded through the above-described encoding process, and be included in the bitstream. The bitstream may be transmitted through a network, or may be stored in a digital storage medium. Here, the network may include a broadcasting network and/or a communication network, and the digital storage medium may include various storage media, such as USB, SD, CD, DVD, Blu-ray, HDD, SSD, and the like. A transmitter (not illustrated) transmitting a signal output from the entropy encoder 240 and/or a storage unit (not illustrated) storing the signal may be configured as an internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the predictor 220 to generate a reconstructed signal (reconstructed picture, reconstructed block, reconstructed samples, or reconstructed sample array). If there is no residual for the processing target block, such as a case that a skip mode is applied, the predicted block may be used as the reconstructed block. The generated reconstructed signal may be used for intra prediction of a next processing target block in the current picture, and may be used for inter prediction of a next picture through filtering as described below.

Meanwhile, luma mapping with chroma scaling (LMCS) may be applied during a picture encoding and/or reconstruction process.

The filter 260 may improve subjective/objective image quality by applying filtering to the reconstructed signal. For example, the filter 260 may generate a modified reconstructed picture by applying various filtering methods to the reconstructed picture, and store the modified reconstructed picture in the memory 270, specifically, in a DPB of the memory 270. The various filtering methods may include, for example, deblocking filtering, a sample adaptive offset (SAO), an adaptive loop filter, a bilateral filter, and the like. The filter 260 may generate various kinds of information related to the filtering, and transfer the generated information to the entropy encoder 290 as described later in the description of each filtering method. The information related to the filtering may be encoded by the entropy encoder 290 and output in the form of a bitstream.

The modified reconstructed picture transmitted to the memory 270 may be used as a reference picture in the inter predictor 221. When the inter prediction is applied through the encoding apparatus, prediction mismatch between the encoding apparatus 200 and the decoding apparatus can be avoided and encoding efficiency can be improved.

The DPB of the memory 270 may store the modified reconstructed picture for use as the reference picture in the inter predictor 221. The memory 270 may store motion information of a block from which the motion information in the current picture is derived (or encoded) and/or motion information of blocks in the picture, having already been reconstructed. The stored motion information may be transferred to the inter predictor 221 to be utilized as motion information of the spatial neighboring block or motion information of the temporal neighboring block. The memory 270 may store reconstructed samples of reconstructed blocks in the current picture, and may transfer the reconstructed samples to the intra predictor 222.

Figure 3:
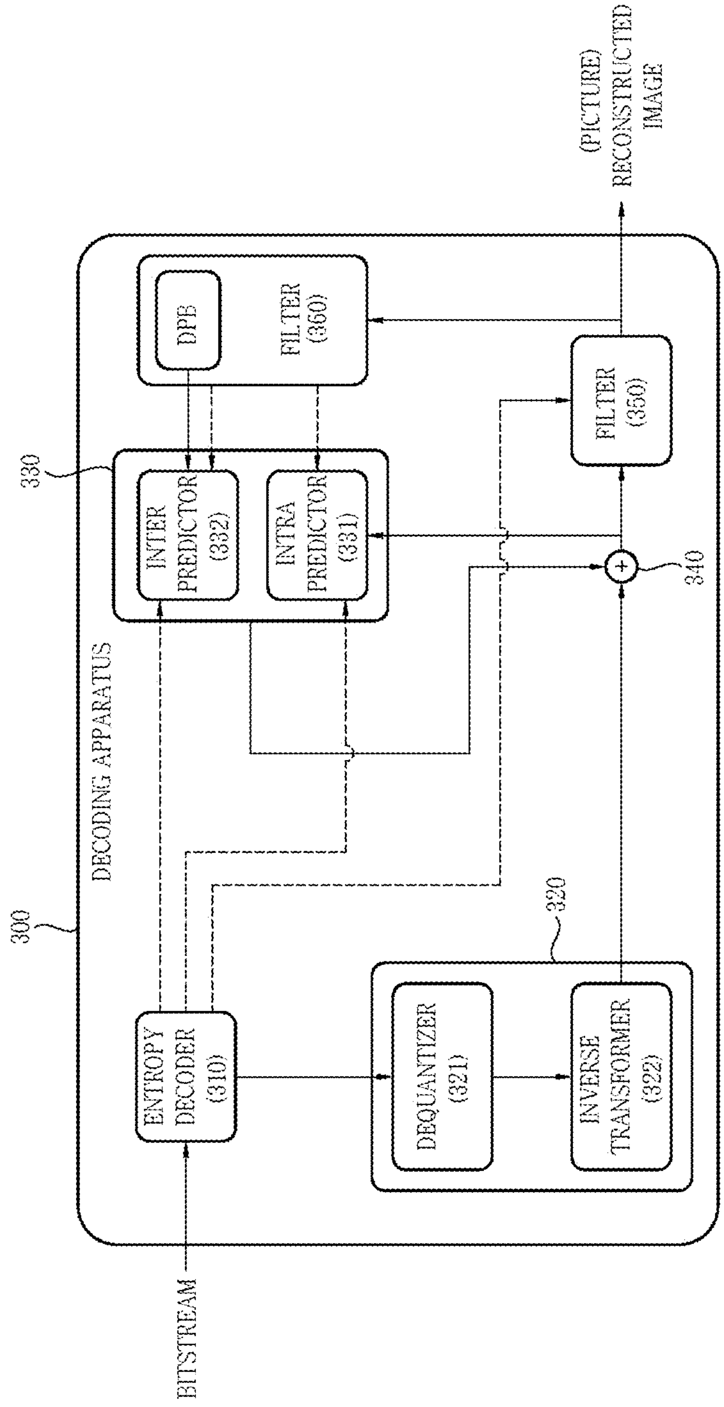
FIG. 3 is a view schematically illustrating the configuration of a video/image decoding apparatus to which embodiments of the present disclosure may be applied.

FIG. 3 is a diagram for schematically explaining the configuration of a video/image decoding apparatus to which the disclosure of the present document may be applied.

Referring to FIG. 3, the decoding apparatus 300 may include and configured with an entropy decoder 310, a residual processor 320, a predictor 330, an adder 340, a filter 350, and a memory 360. The predictor 330 may include an inter predictor 331 and an intra predictor 332. The residual processor 320 may include a dequantizer 321 and an inverse transformer 322. The entropy decoder 310, the residual processor 320, the predictor 330, the adder 340, and the filter 350, which have been described above, may be configured by one or more hardware components (e.g., decoder chipsets or processors) according to an embodiment. Further, the memory 360 may include a decoded picture buffer (DPB), and may be configured by a digital storage medium. The hardware component may further include the memory 360 as an internal/external component.

When the bitstream including the video/image information is input, the decoding apparatus 300 may reconstruct the image in response to a process in which the video/image information is processed in the encoding apparatus illustrated in FIG. 2. For example, the decoding apparatus 300 may derive the units/blocks based on block split-related information acquired from the bitstream. The decoding apparatus 300 may perform decoding using the processing unit applied to the encoding apparatus. Therefore, the processing unit for the decoding may be, for example, a coding unit, and the coding unit may be split according to the quad-tree structure, the binary-tree structure, and/or the ternary-tree structure from the coding tree unit or the maximum coding unit. One or more transform units may be derived from the coding unit. In addition, the reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in this document may be decoded may decode the decoding process and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model by using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor 330, and information on the residual on which the entropy decoding has been performed in the entropy decoder 310, that is, the quantized transform coefficients and related parameter information, may be input to the dequantizer 321. In addition, information on filtering among information decoded by the entropy decoder 310 may be provided to the filter 350. Meanwhile, a receiver (not illustrated) for receiving a signal output from the encoding apparatus may be further configured as an internal/external element of the decoding apparatus 300, or the receiver may be a constituent element of the entropy decoder 310. Meanwhile, the decoding apparatus according to the present document may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the predictor 330, the adder 340, the filter 350, and the memory 360.

The dequantizer 321 may dequantize the quantized transform coefficients to output the transform coefficients. The dequantizer 321 may rearrange the quantized transform coefficients in a two-dimensional block form. In this case, the rearrangement may be performed based on a coefficient scan order performed by the encoding apparatus. The dequantizer 321 may perform dequantization for the quantized transform coefficients using a quantization parameter (e.g., quantization step size information), and acquire the transform coefficients.

The inverse transformer 322 inversely transforms the transform coefficients to acquire the residual signal (residual block, residual sample array).

The predictor 330 may perform the prediction of the current block, and generate a predicted block including the prediction samples of the current block. The predictor may determine whether the intra prediction is applied or the inter prediction is applied to the current block based on the information about prediction output from the entropy decoder 310, and determine a specific intra/inter prediction mode.

The predictor may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may perform an intra block copy (IBC) for prediction of a block. The intra block copy may be used for content image/moving image coding of a game or the like, for example, screen content coding (SCC). The IBC basically performs prediction in the current picture, but may be performed similarly to inter prediction in that a reference block is derived in the current picture. That is, the IBC may use at least one of inter prediction techniques described in the present document.

The intra predictor 332 may predict the current block by referring to the samples in the current picture. The referred samples may be located in the neighborhood of the current block, or may be located apart from the current block according to the prediction mode. In intra prediction, prediction modes may include a plurality of non-directional modes and a plurality of directional modes. The intra predictor 332 may determine the prediction mode to be applied to the current block by using the prediction mode applied to the neighboring block.

The inter predictor 331 may derive a predicted block for the current block based on a reference block (reference sample array) specified by a motion vector on a reference picture. In this case, in order to reduce the amount of motion information being transmitted in the inter prediction mode, motion information may be predicted in the unit of blocks, subblocks, or samples based on correlation of motion information between the neighboring block and the current block. The motion information may include a motion vector and a reference picture index. The motion information may further include information on inter prediction direction (L0 prediction, L1 prediction, Bi prediction, and the like). In case of inter prediction, the neighboring block may include a spatial neighboring block existing in the current picture and a temporal neighboring block existing in the reference picture. For example, the inter predictor 331 may construct a motion information candidate list based on neighboring blocks, and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, or reconstructed sample array) by adding the obtained residual signal to the prediction signal (predicted block or predicted sample array)

output from the predictor 330. If there is no residual for the processing target block, such as a case that a skip mode is applied, the predicted block may be used as the reconstructed block.

The adder 340 may be called a reconstructor or a reconstructed block generator. The generated reconstructed signal may be used for the intra prediction of a next block to be processed in the current picture, and as described later, may also be output through filtering or may also be used for the inter prediction of a next picture.

Meanwhile, a luma mapping with chroma scaling (LMCS) may also be applied in the picture decoding process.

The filter 350 may improve subjective/objective image quality by applying filtering to the reconstructed signal. For example, the filter 350 may generate a modified reconstructed picture by applying various filtering methods to the reconstructed picture, and store the modified reconstructed picture in the memory 360, specifically, in a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 331. The memory 360 may store the motion information of the block from which the motion information in the current picture is derived (or decoded) and/or the motion information of the blocks in the picture having already been reconstructed. The stored motion information may be transferred to the inter predictor 331 so as to be utilized as the motion information of the spatial neighboring block or the motion information of the temporal neighboring block. The memory 360 may store reconstructed samples of reconstructed blocks in the current picture, and transfer the reconstructed samples to the intra predictor 332.

In the present specification, the embodiments described in the predictor 330, the dequantizer 321, the inverse transformer 322, and the filter 350 of the decoding apparatus 300 may also be applied in the same manner or corresponding to the predictor 220, the dequantizer 234, the inverse transformer 235, and the filter 260 of the encoding apparatus 200.

Meanwhile, as described above, in performing video coding, prediction is performed to improve compression efficiency. Through this, a predicted block including prediction samples for a current block as a block to be coded (i.e., a coding target block) may be generated. Here, the predicted block includes prediction samples in a spatial domain (or pixel domain). The predicted block is derived in the same manner in an encoding apparatus and a decoding apparatus, and the encoding apparatus may signal information (residual information) on residual between the original block and the predicted block, rather than an original sample value of an original block, to the decoding apparatus, thereby increasing image coding efficiency. The decoding apparatus may derive a residual block including residual samples based on the residual information, add the residual block and the predicted block to generate reconstructed blocks including reconstructed samples, and generate a reconstructed picture including the reconstructed blocks.

The residual information may be generated through a transform and quantization process. For example, the encoding apparatus may derive a residual block between the original block and the predicted block, perform a transform process on residual samples (residual sample array) included in the residual block to derive transform coefficients, perform a quantization process on the transform coefficients to derive quantized transform coefficients, and signal related residual information to the decoding apparatus (through a bit stream). Here, the residual information may include value information of the quantized transform coefficients, location information, a transform technique, a transform kernel, a quantization parameter, and the like. The decoding apparatus may perform dequantization/inverse transform process based on the residual information and derive residual samples (or residual blocks). The decoding apparatus may generate a reconstructed picture based on the predicted block and the residual block. Also, for reference for inter prediction of a picture afterward, the encoding apparatus may also dequantize/inverse-transform the quantized transform coefficients to derive a residual block and generate a reconstructed picture based thereon.

In this document, at least one of quantization/dequantization and/or transform/inverse transform may be omitted. When the quantization/dequantization is omitted, the quantized transform coefficient may be referred to as a transform coefficient. When the transform/inverse transform is omitted, the transform coefficient may be called a coefficient or a residual coefficient or may still be called the transform coefficient for uniformity of expression.

In this document, the quantized transform coefficient and the transform coefficient may be referred to as a transform coefficient and a scaled transform coefficient, respectively. In this case, the residual information may include information on transform coefficient(s), and the information on the transform coefficient(s) may be signaled through residual coding syntax. Transform coefficients may be derived based on the residual information (or information on the transform coefficient(s)), and scaled transform coefficients may be derived through inverse transform (scaling) on the transform coefficients. Residual samples may be derived based on inverse transform (transform) of the scaled transform coefficients. This may be applied/expressed in other parts of this document as well.

The predictor of the encoding apparatus/decoding apparatus may derive prediction samples by performing inter prediction in units of blocks. Inter prediction can be a prediction derived in a manner that is dependent on data elements (e.g. sample values or motion information, etc) of picture(s) other than the current picture. When the inter prediction is applied to the current block, based on the reference block (reference sample arrays) specified by the motion vector on the reference picture pointed to by the reference picture index, the predicted block (prediction sample arrays) for the current block can be derived. In this case, in order to reduce the amount of motion information transmitted in the inter prediction mode, the motion information of the current block may be predicted in units of blocks, subblocks, or samples based on the correlation between the motion information between neighboring blocks and the current block. The motion information may include the motion vector and the reference picture index. The motion information may further include inter prediction type (L0 prediction, L1 prediction, Bi prediction, etc.) information. When the inter prediction is applied, the neighboring blocks may include a spatial neighboring block existing in the current picture and a temporal neighboring block existing in the reference picture. The reference picture including the reference block and the reference picture including the temporal neighboring block may be the same or different. The temporal neighboring block may be called a collocated reference block, a collocated CU (colCU), etc., and a reference picture including the temporally neighboring block may be called a collocated picture (colPic). For example, a motion information candidate list may be constructed based on neighboring blocks of the current block, and a flag or index information indicating which candidate is selected (used) to derive the motion vector and/or the reference picture index of the current block may be signaled. The inter prediction may be performed based on various prediction modes. For example, in the skip mode and the merge mode, the motion information of the current block may be the same as the motion information of a selected neighboring block. In the skip mode, unlike the merge mode, a residual signal may not be transmitted. In the case of a motion vector prediction (MVP) mode, a motion vector of a selected neighboring block may be used as a motion vector predictor, and a motion vector difference may be signaled. In this case, the motion vector of the current block may be derived using the sum of the motion vector predictor and the motion vector difference.

The motion information may include L0 motion information and/or L1 motion information according to an inter prediction type (L0 prediction, L1 prediction, Bi prediction, etc.). A motion vector in the L0 direction may be referred to as an L0 motion vector or MVL0, and a motion vector in the L1 direction may be referred to as an L1 motion vector or MVL1. The prediction based on the L0 motion vector may be called L0 prediction, the prediction based on the L1 motion vector may be called the L1 prediction, and the prediction based on both the L0 motion vector and the L1 motion vector may be called a bi-prediction. Here, the L0 motion vector may indicate a motion vector associated with the reference picture list L0 (L0), and the L1 motion vector may indicate a motion vector associated with the reference picture list L1 (L1). The reference picture list L0 may include pictures that are previous than the current picture in output order as reference pictures, and the reference picture list L1 may include pictures that are subsequent than the current picture in output order. The previous pictures may be called forward (reference) pictures, and the subsequent pictures may be called backward (reference) pictures. The reference picture list L0 may further include pictures that are subsequent than the current picture in output order as reference pictures. In this case, the previous pictures may be indexed first, and the subsequent pictures may be indexed next in the reference picture list L0. The reference picture list L1 may further include pictures previous than the current picture in output order as reference pictures. In this case, the subsequent pictures may be indexed first in the reference picture list 1 and the previous pictures may be indexed next. Here, the output order may correspond to a picture order count (POC) order.

Figure 4:
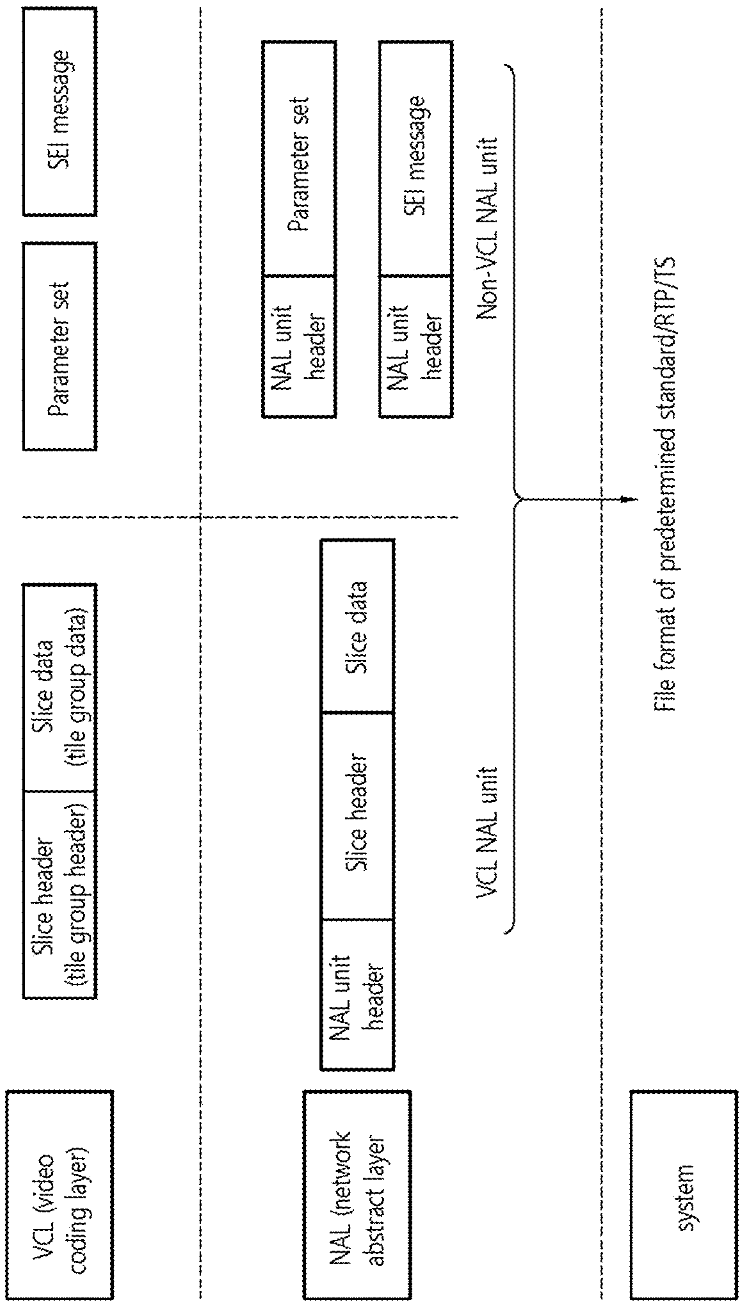
FIG. 4 exemplarily shows a hierarchical architecture for a coded video/image.

FIG. 4 exemplarily shows a hierarchical structure for a coded image/video.

Referring to FIG. 4, the coded image/video is divided into VCL (video coding layer) that deals with an image/video decoding process and itself, a subsystem that transmits and stores the coded information, and a network abstraction layer (NAL) that exists between the VCL and subsystems and is responsible for network adaptation functions.

The VCL may generate VCL data including compressed image data (slice data), or generate parameter sets including a picture parameter set (Picture Parameter Set: PPS), a sequence parameter set (Sequence Parameter Set: SPS), a video parameter set (Video Parameter Set: VPS) etc. or a supplemental enhancement information (SEI) message additionally necessary for the decoding process of an image.

In the NAL, a NAL unit may be generated by adding header information (NAL unit header) to a raw byte sequence payload (RBSP) generated in the VCL. In this case, the RBSP refers to slice data, parameter sets, SEI messages, etc. generated in the VCL. The NAL unit header may include NAL unit type information specified according to RBSP data included in the corresponding NAL unit.

As shown in the figure, the NAL unit may be divided into a VCL NAL unit and a Non-VCL NAL unit according to the RBSP generated in the VCL. The VCL NAL unit may mean a NAL unit including information (sliced data) about an image, and the Non-VCL NAL unit may mean a NAL unit containing information (parameter set or SEI message) necessary for decoding an image.

The above-described VCL NAL unit and Non-VCL NAL unit may be transmitted through a network by attaching header information according to a data standard of the subsystem. For example, the NAL unit may be transformed into a data form of a predetermined standard such as H.266/VVC file format, Real-time Transport Protocol (RTP), Transport Stream (TS), etc. and transmitted through various networks.

As described above, in the NAL unit, the NAL unit type may be specified according to the RBSP data structure included in the corresponding NAL unit, and information on this NAL unit type may be stored and signaled in the NAL unit header.

For example, the NAL unit may be roughly classified into the VCL NAL unit type and the Non-VCL NAL unit type depending on whether the NAL unit includes information about the image (slice data). The VCL NAL unit type may be classified according to property and a type of a picture included in the VCL NAL unit, and the Non-VCL NAL unit type may be classified according to the type of a parameter set.

The following is an example of the NAL unit type specified according to the type of parameter set included in the Non-VCL NAL unit type.

APS (Adaptation Parameter Set) NAL unit: Type for NAL unit including APS

DPS (Decoding Parameter Set) NAL unit: Type for NAL unit including DPS

VPS (Video Parameter Set) NAL unit: Type for NAL unit including VPS

SPS (Sequence Parameter Set) NAL unit: Type for NAL unit including SPS

PPS (Picture Parameter Set) NAL unit: Type for NAL unit including PPS

PH (Picture header) NAL unit: Type for NAL unit including PH

The above-described NAL unit types have syntax information for the NAL unit type, and the syntax information may be stored and signaled in the NAL unit header. For example, the syntax information may be nal_unit_type, and NAL unit types may be specified by a nal_unit_type value.

Meanwhile, as described above, one picture may include a plurality of slices, and one slice may include a slice header and slice data. In this case, one picture header may be further added to a plurality of slices (a slice header and a slice data set) in one picture. The picture header (picture header syntax) may include information/parameters commonly applicable to the picture. In this document, a slice may be mixed or replaced with a tile group. Also, in this document, a slice header may be mixed or replaced with a type group header.

The slice header (slice header syntax or slice header information) may include information/parameters commonly applicable to the slice. The APS (APS syntax) or PPS (PPS syntax) may include information/parameters commonly applicable to one or more slices or pictures. The SPS (SPS syntax) may include information/parameters commonly applicable to one or more sequences. The VPS (VPS syntax) may include information/parameters commonly applicable to multiple layers. The DPS (DPS syntax) may include information/parameters commonly applicable to the entire video. The DPS may include information/parameters related to concatenation of a coded video sequence (CVS). In this document, high level syntax (HLS) may include at least one of the APS syntax, PPS syntax, SPS syntax, VPS syntax, DPS syntax, picture header syntax, and slice header syntax.

In this document, the image/video information encoded in the encoding apparatus and signaled in the form of a bitstream to the decoding apparatus may include, as well as picture partitioning-related information in the picture, intra/inter prediction information, residual information, in-loop filtering information, etc. the information included in the slice header, the information included in the picture header, the information included in the APS, the information included in the PPS, the information included in the SPS, the information included in the VPS, and/or the information included in the DPS. In addition, the image/video information may further include information of the NAL unit header.

Meanwhile, in order to compensate for a difference between an original image and a reconstructed image due to an error occurring in a compression encoding process such as quantization, an in-loop filtering process may be performed on reconstructed samples or reconstructed pictures as described above. As described above, the in-loop filtering may be performed by the filter of the encoding apparatus and the filter of the decoding apparatus, and a deblocking filter, SAO, and/or adaptive loop filter (ALF) may be applied. For example, the ALF process may be performed after the deblocking filtering process and/or the SAO process are completed. However, even in this case, the deblocking filtering process and/or the SAO process may be omitted.

Hereinafter, picture reconstruction and filtering will be described in detail. In image/video coding, a reconstructed block may be generated based on intra prediction/inter prediction in each block unit, and a reconstructed picture including the reconstructed blocks may be generated. When the current picture/slice is an I picture/slice, blocks included in the current picture/slice may be reconstructed based on only intra prediction. Meanwhile, when the current picture/slice is a P or B picture/slice, blocks included in the current picture/slice may be reconstructed based on intra prediction or inter prediction. In this case, intra prediction may be applied to some blocks in the current picture/slice, and inter prediction may be applied to the remaining blocks.

The intra prediction may represent a prediction for generating prediction samples for the current block based on reference samples in the picture (hereinafter, current picture) to which the current block belongs. In case that the intra prediction is applied to the current block, neighboring reference samples to be used for the intra prediction of the current block may be derived. The neighboring reference samples of the current block may include a sample adjacent to a left boundary of the current block having a size of nW×nH, total 2×nH samples neighboring the bottom-left, a sample adjacent to the top boundary of the current block, total 2×nW samples neighboring the top-right, and one sample neighboring the top-left of the current block.

Alternatively, the neighboring reference samples of the current block may include top neighboring sample of plural columns and left neighboring sample of plural rows. Alternatively, the neighboring reference samples of the current block may include total nH samples adjacent to the right boundary of the current block having a size of nW×nH, total nH samples adjacent to the right boundary of the current block, total nW samples adjacent to the bottom boundary of the current block, and one sample neighboring the bottom-right of the current block.

However, some of the neighboring reference samples of the current block may have not yet been decoded or may not be available. In this case, the decoder may configure the neighboring reference samples to be used for the prediction through substitution of available samples for the unavailable samples. Alternatively, the neighboring reference samples to be used for the prediction may be configured through interpolation of the available samples.

When neighboring reference samples are derived, there are two cases, that is, a case (i) in which a prediction sample may be derived based on an average or interpolation of neighboring reference samples of a current block, and a case (ii) in which the prediction sample may be derived based on a reference sample present in a specific (prediction) direction for the prediction sample among the neighboring reference samples of the current block. The case (i) may be called a non-directional mode or a non-angular mode, and the case (ii) may be called a directional mode or an angular mode. In addition, the prediction sample may also be generated through a first neighboring sample and a second neighboring sample located in a direction opposite to the prediction direction of the intra prediction mode of the current block based on the prediction sample of the current block among the neighboring reference samples. The above case may be referred to as linear interpolation intra prediction (LIP). In addition, chroma prediction samples may be generated based on luma samples by using a linear model. This case may be called an LM mode. In addition, a temporary prediction sample of the current block may be derived based on filtered neighboring reference samples. At least one reference sample, which is derived according to the intra prediction mode among the existing neighboring reference samples, that is, unfiltered neighboring reference samples, and the temporary prediction sample may be weighted-summed to derive the prediction sample of the current block. The above case may be called a position dependent intra prediction (PDPC). In addition, a reference sample line having the highest prediction accuracy among the neighboring multiple reference sample lines of the current block may be selected to derive the prediction sample by using the reference sample located in the prediction direction on the corresponding line, and the reference sample line used herein may be indicated (signaled) to a decoding apparatus, thereby performing intra-prediction encoding. The above case may be called multi-reference line (MRL) intra prediction or MRL-based intra prediction. In addition, intra prediction may be performed based on the same intra prediction mode by dividing the current block into vertical or horizontal sub-partitions, and neighboring reference samples may be derived and used in units of the sub-partitions. That is, in this case, the intra prediction mode for the current block is equally applied to the sub-partitions, and the intra prediction performance may be improved in some cases by deriving and using the neighboring reference samples in units of the sub-partitions. Such a prediction method may be called intra sub-partitions (ISP) or ISP-based intra prediction. The aforementioned intra prediction methods may be called an intra prediction type distinct to the intra prediction mode in the sections 1.2. The intra prediction type may be called in various terms such as an intra prediction technique or an additional intra prediction mode or the like. For example, the intra prediction type (or additional intra prediction mode or the like) may include at least one of the aforementioned LIP, PDPC, MRL, and ISP. A general intra prediction method except for the specific intra prediction type such as LIP, PDPC, MRL, or ISP may be called a normal intra prediction type. The normal intra prediction type may be generally applied when the specific intra prediction type is not applied, and prediction may be performed based on the aforementioned intra prediction mode. Meanwhile, optionally, post-processing filtering may be performed on the derived prediction sample.

Specifically, the intra prediction process may include an operation of determining an intra prediction mode/type, an operation of deriving a neighboring reference sample, and an operation of deriving a prediction sample based on the intra prediction mode/type. In addition, optionally, a post-processing filtering operation may be performed on the derived prediction sample.

A modified reconstructed picture may be generated through the in-loop filtering process, and the modified reconstructed picture may be output as a decoded picture in the decoding apparatus and may also be stored in a decoded picture buffer or memory of the encoding apparatus/decoding apparatus and used as a reference picture in the inter prediction process when the picture is encoded/decoded at a later time. The in-loop filtering process may include a deblocking filtering process, a sample adaptive offset (SAO) process, and/or an adaptive loop filter (ALF) process as described above. In this case, one or some of the deblocking filtering process, SAO process, ALF process, and bi-lateral filter process may be sequentially applied, or all of the processes may be sequentially applied. For example, the SAO process may be performed after the deblocking filtering process is applied to the reconstructed picture. Alternatively, for example, the ALF process may be performed after the deblocking filtering process is applied to the reconstructed picture. This may also be equally performed in the encoding apparatus.

The deblocking filtering is a filtering technique which removes distortion occurring at boundaries between blocks in the reconstructed picture. The deblocking filtering process may, for example, derive a target boundary in the reconstructed picture, determine a boundary strength (bS) for the target boundary, and perform deblocking filtering on the target boundary, based on the bS. The bS may be determined based on a prediction mode, a motion vector difference, whether reference pictures are identical, whether a non-zero significant coefficient exists, etc., of two blocks adjacent to the target boundary.

The SAO is a method in which an offset difference between the reconstructed picture and the original picture is compensated on a sample basis. For example, the SAO may be applied based on a type such as a band offset, an edge offset, or the like. According to the SAO, samples may be classified into different categories according to each SAO type, and an offset value may be added to each sample, based on the category. Filtering information for the SAO may include information on whether the SAO is applied, SAO type information, SAO offset value information, or the like. The SAO may be applied to the reconstructed picture after the deblocking filtering is applied.

The ALF is a technique for filtering the reconstructed picture on a sample basis, based on filter coefficients according to a filter shape. The encoding apparatus may determine whether the ALF is applied, an ALF shape, and/or an ALF filtering coefficient or the like by comparing the reconstructed picture and the original picture, and may signal the determination result to the decoding apparatus. That is, the filtering information for the ALF may include information on whether the ALF is applied, ALF filter shape information, ALF filtering coefficient information, or the like. The ALF may be applied to the reconstructed picture after the deblocking filtering is applied.

Figure 5A:
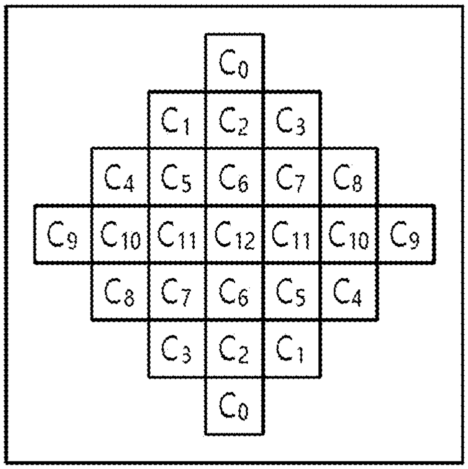
FIGS. 5A and 5B illustrate an example of an adaptive loop filtering (ALF) filter shape.
Figure 5B:
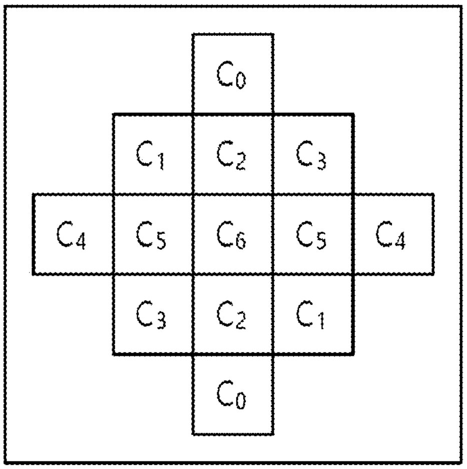

FIGS. 5A and 5B illustrate an example of an ALF filter shape.

FIG. 5A illustrates a 7×7 diamond filter shape, and FIG. 5B illustrates a 5×5 diamond filter shape. In FIGS. 5A and 5B, Cn in the filter shape represents a filter coefficient. When n is identical in the Cn, it means that the same filter coefficient may be allocated. In the present document, a location and/or unit in which the filter coefficient is allocated according to the ALF filter shape may be called a filter tap. In this case, one filter coefficient may be allocated to each filter tap, and a shape in which the filter tap is arranged may correspond to a filter shape. A filter tap located at a center of the filter shape may be called a center filter tap. The same filter coefficient may be allocated to two filter taps having the same value n and present at locations corresponding to each other with respect to the center filter tap. For example, in case of the 7×7 diamond filter shape, 25 filter taps are included, and filter coefficients C0 to C11 are allocated in a central symmetric shape. Therefore, filter coefficients may be allocated to the 25 filter taps by using only 13 filter coefficients. In addition, for example, in case of the 5×5 diamond filter shape, 13 filter taps are included, and filter coefficients C0 to C5 are allocated in the central symmetric shape. Therefore, filter coefficients may be allocated to the 13 filter taps by using only 7 filters. For example, in order to decrease a data amount of information on filter coefficients to be signaled, 12 filter coefficients out of the 13 filter coefficients for the 7×7 diamond filter shape may be (explicitly) signaled, and one filter coefficient may be (implicitly) derived. In addition, for example, 6 filter coefficients out of the 7 filter coefficients for the 5×5 diamond filter shape may be (explicitly) signaled, and one filter coefficient may be (implicitly) derived.

Figure 6:
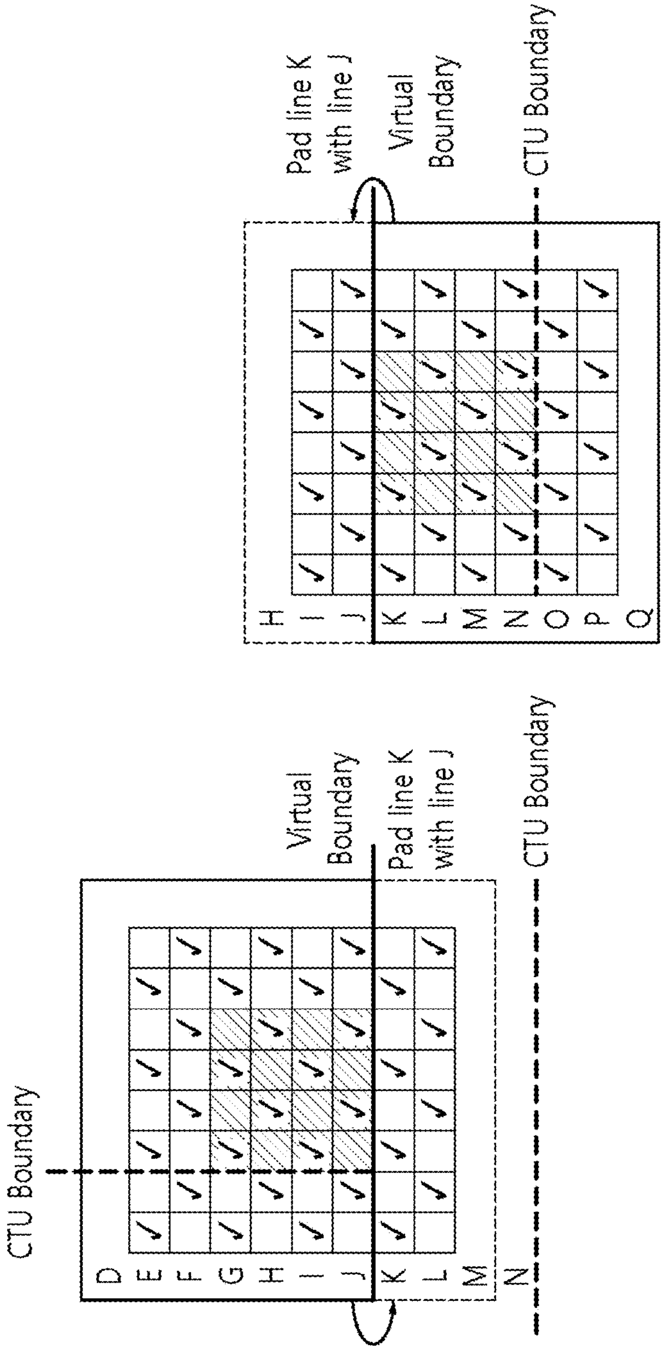
FIG. 6 is a view illustrating a virtual boundary applied to a filtering process according to an embodiment of the present document.

FIG. 6 is a diagram illustrating a virtual boundary applied to a filtering process according to an embodiment of the present document.

Referring to FIG. 6, a virtual boundary may be a line defined by shifting a horizontal CTU boundary by N samples. In an embodiment, N may be 4 for a luma component, and/or may be 2 for a chroma component.

In FIG. 6, modified block classification may be applied for the luma component. For the 1D Laplacian gradient calculation of the 4×4 block above the virtual boundary, only samples above the virtual boundary may be used. Similarly, for the 1D Laplacian gradient calculation of the 4×4 block below the virtual boundary, only samples below the virtual boundary may be used. Quantization of an activity value A may be accordingly scaled by considering the reduced number of samples used in the 1D Laplacian gradient calculation.

Figure 7:
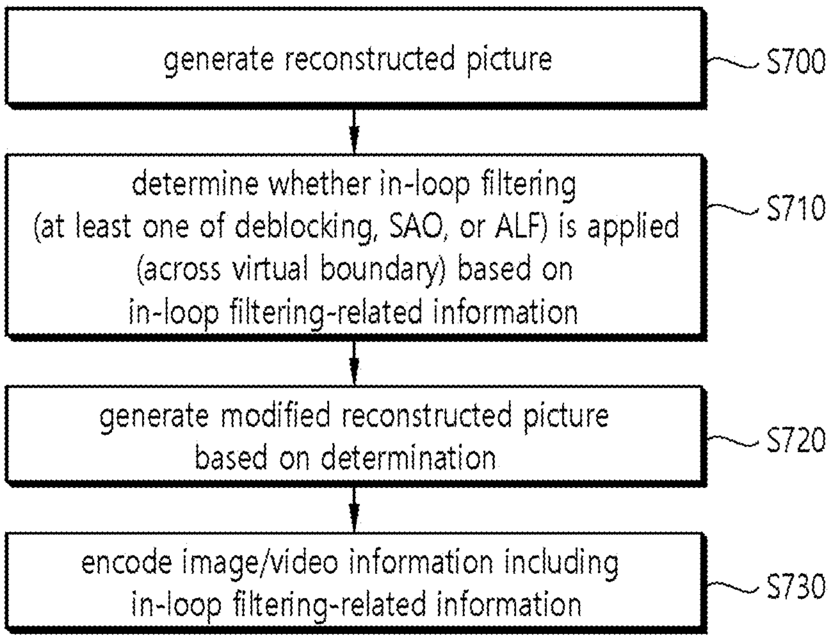
FIG. 7 is a flowchart illustrating an encoding method based on filtering in an encoding apparatus.

FIG. 7 is a flowchart illustrating an encoding method based on filtering in an encoding apparatus. The method of FIG. 7 may include steps S700 to S730.

In the step S700, the encoding apparatus may generate a reconstructed picture. The step S700 may be performed based on the aforementioned reconstructed picture (or reconstructed samples) generation process.

In the step S710, the encoding apparatus may determine whether in-loop filtering is applied (across a virtual boundary) based on in-loop filtering-related information. Herein, the in-loop filtering may include at least one of the aforementioned de-blocking filtering, SAO, and ALF.

In the step S720, the encoding apparatus may generate a modified reconstructed picture (modified reconstructed samples) based on the determination of the step S710. Herein, the modified reconstructed picture (modified reconstructed samples) may be a filtered reconstructed picture (filtered reconstructed samples).

In the step S730, the encoding apparatus may encode image/video information including the in-loop filtering-related information, based on the in-loop filtering process.

Figure 8:
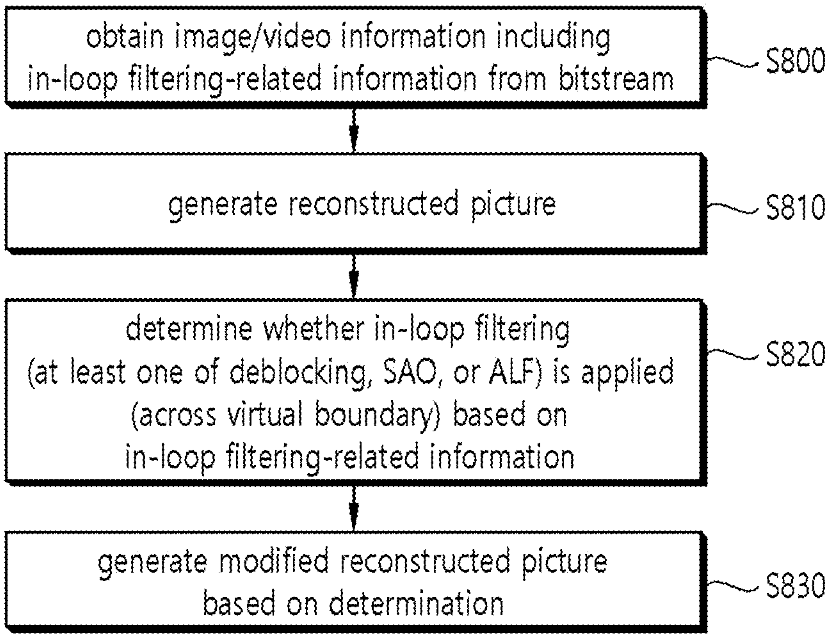
FIG. 8 is a flowchart illustrating a decoding method based on filtering in a decoding apparatus.

FIG. 8 is a flowchart illustrating a decoding method based on filtering in a decoding apparatus. The method of FIG. 8 may include steps S800 to S830.

In the step S800, the decoding apparatus may obtain image/video information including in-loop filtering-related information from a bitstream. Herein, the bitstream may be based on encoded image/video information transmitted from the encoding apparatus.

In the step S810, the decoding apparatus may generate a reconstructed picture. The step S810 may be performed based on the aforementioned reconstructed picture (or reconstructed samples).

In the step S820, the decoding apparatus may determine whether in-loop filtering is applied (across a virtual boundary) based on the in-loop filtering-related information. Herein, the in-loop filtering may include at least one of the aforementioned de-blocking filtering, SAO, and ALF.

In the step S830, the decoding apparatus may generate a modified reconstructed picture (modified reconstructed samples) based on the determination of the step S820. Herein, the modified reconstructed picture (modified reconstructed samples) may be a filtered reconstructed picture (filtered reconstructed samples).

As described above, the in-loop filtering process may be applied to the reconstructed picture. In this case, a virtual boundary may be defined to further improve subjective/objective visual quality of the reconstructed picture, and the in-loop filtering process may be applied across the virtual boundary. The virtual boundary may include, for example, a discontinuous edge such as a 360-degree image, a VR image, a bound, a Picture In Picture (PIP), or the like. For example, the virtual boundary may be present at a predetermined location, and a presence and/or location thereof may be signaled. For example, the virtual boundary may be located at an upper fourth sample line of a CTU row (specifically, for example, above the upper fourth sample of the CTU row). As another example, information on the present and/or location of the virtual boundary may be signaled through HLS. The HLS may include the SPS, the PPS, the picture header, the slice header, or the like as described above.

Hereinafter, a high-level syntax signaling and semantics will be described according to embodiments of the present disclosure.

An embodiment of the present document may include a method of controlling loop filters. The present method for controlling the loop filters may be applied to a reconstructed picture. In-loop filters (loop filters) may be used for decoding of encoded bitstreams. The loop filters may include the aforementioned deblocking, SAO, and ALF. The SPS may include flags related to each of the deblocking, SAO, and ALF. The flags may indicate whether each of tools is available for the coding of a coded layer video sequence (CLVS) or coded video sequence (CVS) referring to the SPS.

When the loop filters are available for the CVS, the applying of the loop filters may be controlled not to be across specific boundaries. For example, whether the loop filters are across sub-picture boundaries may be controlled. In addition, whether the loop filters are across tile boundaries may be controlled. In addition thereto, whether the loop filters are across virtual boundaries may be controlled. Herein, the virtual boundaries may be defined on CTUs based on availability of a line buffer.

Regarding whether the in-loop filtering process is performed across the virtual boundary, in-loop filtering-related information may include at least one of an SPS virtual boundaries enabled flag (a virtual boundaries enabled flag in an SPS), an SPS virtual boundaries present flag, a picture header virtual boundaries present flag, an SPS picture header virtual boundaries present flag, and information on a virtual boundaries position.

In embodiments included in the present document, the information on the virtual boundaries position may include information on an x-coordinate of a vertical virtual boundary and/or information on a y-coordinate of a horizontal virtual boundary. Specifically, the information on the virtual boundaries position may include the information on the x-coordinate of the vertical virtual boundary and/or the information on the y-axis of the horizontal virtual boundary in units of luma samples. In addition, the information on the virtual boundaries position may include information on the number of pieces of information (syntax elements) on the x-coordinate of the vertical virtual boundary which is present in the SPS. In addition, the information on the virtual boundaries position may include information on the number of pieces of information (syntax elements) on the y-coordinate of the horizontal virtual boundary which is present in the SPS. Alternatively, the information on the virtual boundaries position may include information on the number of pieces of information (syntax elements) on the x-coordinate of the vertical virtual boundary which is present in a picture header. In addition, the information on the virtual boundaries position may include information on the number of pieces of information (syntax elements) on the y-coordinate of the horizontal virtual boundary which is present in the picture header.

FIG. 14 to FIG. 15 show an exemplary syntax and semantics of an SPS according to the present embodiment.

FIG. 16 to FIG. 17 show an exemplary syntax and semantics of a picture parameter set (PPS) according to the present embodiment.

FIG. 18 to FIG. 21 show an exemplary syntax and semantics of a picture header according to the present embodiment.

FIG. 22 to FIG. 23 show an exemplary syntax and semantics of a slice header according to the present embodiment.

Hereinafter, signaling of information on virtual boundaries which may be used in in-loop filtering will be described.

In the existing design, in order to disable loop filters across virtual boundaries, there are two options, that is, an option i) in which an SPS virtual boundaries present flag (sps_loop_filter_across_virtual_boundaries_disabled_present_flag) may be set to 0, and for every picture header, a PH virtual boundaries present flag (ph_loop_filter_across_virtual_boundaries_disabled_present_flag) may be present and set to 0, and an option ii) in which the SPS virtual boundaries present flag (sps_loop_filter_across_virtual_boundaries_disabled_present_flag) may be set to 1, and information on the number of SPS vertical virtual boundaries (sps_num_ver_vertical_boudnaries) and information on the number of SPS horizontal virtual boundaries (sps_num_hor_ vertical_boudnaries) may be set to 0.

In the existing design, according to the option ii), the SPS virtual boundaries present flag (sps_loop_filter_across_virtual_boundaries_disabled_present_flag) is set to 1, and thus a decoder expects signaling on locations of virtual boundaries, which may cause a problem in a decoding process.

Embodiments described hereinafter may propose solutions for the aforementioned problem. The embodiments may be applied independently. Alternatively, at least two embodiments may be applied in combination.

In an embodiment of the present document, whether syntax elements for indicating virtual boundaries are included in the SPS may be controlled by flag(s). For example, the number of flag(s) may be 2 (e.g., SPS virtual boundaries enabled flag, SPS virtual boundaries present flag).

In an example according to the present embodiment, the SPS virtual boundaries enabled flag may be referred to as sps_loop_filter_across_virtual_boundaries_disabled_flag (or sps_virtual_boundaries_enabled_flag). The SPS virtual boundaries enabled flag may indicate whether a feature for disabling a loop filter across virtual boundaries is enabled.

In an example according to the present embodiment, the SPS virtual boundaries present flag may be referred to as sps_loop_filter_across_virtual_boundaries_disabled_present_flag (or sps_virtual_boundaries_present_flag). The SPS virtual boundaries present flag may indicate whether signaling information for virtual boundaries is included in the SPS or in a picture header (PH).

In an example according to the present embodiment, when the SPS virtual boundaries enabled flag (sps_loop_filter_across_virtual_boundaries_disabled_flag) is 1 and the SPS virtual boundaries present flag (sps_loop_filter_across_virtual_boundaries_disabled_present_flag) is 0, the signaling information for disabling the loop filter across the virtual boundaries may be included in the PH.

In an example according to the present embodiment, when information on positions of virtual boundaries (e.g., vertical virtual boundaries, horizontal virtual boundaries) is included in the SPS, it may be constrained that a sum of the number of vertical virtual boundaries and the number of horizontal virtual boundaries is greater than 0.

In an example according to the present embodiment, variable(s) indicating whether a filter is disabled at virtual boundaries for the current picture may be derived. For example, the variable(s) may include VirtualBoundariesDisabledFlag.

As one case of the present example, when the SPS virtual boundaries enable flag (sps_loop_filter_across_virtual_boundaries_disabled_flag) is 1 and the SPS virtual boundaries present flag (sps_loop_filter_across_virtual_boundaries_disabled_present_flag) is 1, VirtualBoundariesDisabledFlag may be 1.

As another case of the present example, when the SPS virtual boundaries enabled flag (sps_loop_filter_across_virtual_boundaries_disabled_flag) is 1, the SPS virtual boundaries present flag (sps_loop_filter_across_virtual_boundaries_disabled_present_flag) is 0, and a sum of information on the number of vertical virtual boundaries (e.g., ph_num_ver_ virtual_boundaries) and information on the number of horizontal virtual boundaries (e.g., ph_num_hor_virtual_boundaries) is greater than 0, VirtualBoundariesDisabledFlag may be 1.

In the other cases of the present example, VirtualBoundariesDisabledFlag may be 0.

FIG. 24 shows an exemplary syntax of the SPS according to the present embodiment.

FIG. 25 shows an exemplary semantics of syntax elements included in the syntax.

FIG. 26 shows an exemplary syntax of the header information (the picture header) according to the present embodiment.

FIG. 27 shows an exemplary semantics of syntax elements included in the syntax.

In an embodiment related to FIG. 24 to FIG. 27, image information obtained by the encoding apparatus and/or image information obtained through a bitstream received from the encoding apparatus to the decoding apparatus may include a sequence parameter set (SPS) and a picture header (PH). The SPS may include a virtual boundaries enabled flag (sps_loop_filter_across_virtual_boundaries_disabled_flag). The SPS may include an SPS virtual boundaries present flag (sps_loop_filter_across_virtual_boundaries_disabled_present_flag), based on the virtual boundaries enabled flag.

For example, when a value of the virtual boundaries enabled flag is 1, the SPS may include the SPS virtual boundaries present flag. Based on the virtual boundaries enabled flag and the SPS virtual boundaries present flag, the SPS may include information on the number of SPS vertical virtual boundaries (sps_num_ver_virtual_boundaries), information on an SPS vertical virtual boundaries position (sps_virtual_boundaries_pos_x[i]), information on the number of SPS horizontal virtual boundaries (sps_num_hor_virtual_boundaries), and information on an SPS horizontal virtual boundaries position (sps_virtual_boundaries_pos_y[i]). For example, when a value of the virtual boundaries enabled flag is 1 and a value of the SPS virtual boundaries present flag is 1, the SPS may include information on the number of the SPS vertical virtual boundaries, information on the SPS vertical virtual boundaries position, information on the number of the SPS horizontal virtual boundaries, and information on the SPS horizontal virtual boundaries position.

In an example, the number of pieces of information on the SPS vertical virtual boundaries position may be determined based on the information on the number of the SPS vertical virtual boundaries, and the number of pieces of information on the SPS horizontal virtual boundaries position may be determined based on the information on the number of the SPS horizontal virtual boundaries. Based on the virtual boundaries enabled flag and the SPS virtual boundaries present flag, the picture header may include information on the number of PH vertical virtual boundaries (ph_num_ver_virtual_boundaries), information on a PH vertical virtual boundaries position (ph_virtual_boundaries_pos_x[i]), information on the number of PH horizontal virtual boundaries (ph_num_hor_virtual_boundaries), and information on a PH horizontal virtual boundaries position (ph_virtual_boundaries_pos_y[i]).

For example, when a value of the virtual boundaries enabled flag is 1 and a value of the SPS virtual boundaries present flag is 0, the picture header may include information on the number of the PH vertical virtual boundaries, information on the PH vertical virtual boundaries position, information on the number of the PH horizontal virtual boundaries, and information on the PH horizontal virtual boundary position. In an example, the number of pieces of information on the PH vertical virtual boundaries position may be determined based on the information on the number of the PH vertical virtual boundaries, and the number of pieces of information on the PH horizontal virtual boundaries position may be determined based on the information on the number of the PH horizontal virtual boundaries.

In another embodiment of the present document, each piece of header information (picture headers) of pictures referring to the SPS may include a PH virtual boundaries present flag (ph_loop_filter_across_virtual_boundaries_disabled_present_flag or ph_virtual_boundaries_present_flag). The present embodiment may also be described together with the SPS virtual boundaries enabled flag (sps_loop_filter_across_virtual_boundaries_disabled_flag) and the SPS virtual boundaries present flag (sps_loop_filter_across_virtual_boundaries_disabled_present_flag).

In an example according to the present embodiment, when a value of the SPS virtual boundaries enabled flag (sps_loop_filter_across_virtual_boundaries_disabled_flag) is 1 and a value of the SPS virtual boundaries present flag (sps_loop_filter_across_virtual_boundaries_disabled_present_flag) is 0, each piece of information (picture headers) of pictures referring to the SPS may include a PH virtual boundaries present flag (ph_loop_filter_across_virtual_boundaries_disalbed_present_flag or ph_virtual_boundaries_present_flag).

In an example according to the present embodiment, when information on positions of virtual boundaries (e.g., vertical virtual boundaries, horizontal virtual boundaries) is included in the SPS, a sum of the number of vertical virtual boundaries and the number of horizontal virtual boundaries may be constraint to be greater than 0.

In an example according to the present embodiment, variable(s) indicating whether a filter is disabled at virtual boundaries may be derived for the current picture. For example, the variable(s) may include VirtualBoundariesDisabledFlag.

As one case of the present example, when the SPS virtual boundaries enabled flag (sps_loop_filter_across_virtual_boundaries_disabled_flag) is 1 and the SPS virtual boundaries present flag (sps_loop_filter_across_virtual_boundaries_disabled_present_flag) is 1, VirtualBoundariesDisabledFlag may be 1.

As another case of the present example, when the SPS virtual boundaries enabled flag (sps_loop_filter_across_virtual_boundaries_disabled_flag) is 1 and the PH virtual boundaries present flag (ph_loop_filter_across_virtual_boundaries_disabled_present_flag) is 1, VirtualBoundariesDisabledFlag may be 1.

In other cases of the present example, VirtualBoundariesDisabledFlag may be 0.

FIG. 28 shows an exemplary syntax of the SPS according to the present embodiment.

FIG. 29 shows an exemplary semantics of syntax elements included in the syntax.

FIG. 30 shows an exemplary syntax of the header information (the picture header) according to the present embodiment.

FIG. 31 to FIG. 32 show an exemplary semantics of syntax elements included in the syntax.

In an embodiment related to FIG. 28 to FIG. 32, image information obtained by the encoding apparatus and/or image information obtained through a bitstream received from the encoding apparatus to the decoding apparatus may include a sequence parameter set (SPS) and a picture header (PH). The SPS may include a virtual boundaries enabled flag (sps_loop_filter_across_virtual_boundaries_disabled_flag). The SPS may include an SPS virtual boundaries present flag (sps_loop_filter_across_virtual_boundaries_disabled_present_flag), based on the virtual boundaries enabled flag. For example, when a value of the virtual boundaries enabled flag is 1, the SPS may include the SPS virtual boundaries present flag. Based on the virtual boundaries enabled flag and the SPS virtual boundaries present flag, the SPS may include information on the number of SPS vertical virtual boundaries (sps_num_ver_virtual_boundaries), information on an SPS vertical virtual boundaries position (sps_virtual_boundaries_pos_x[i]), information on the number of SPS horizontal virtual boundaries (sps_num_hor_virtual_boundaries), and information on an SPS horizontal virtual boundaries position (sps_virtual_boundaries_pos_y[i]).

For example, when a value of the virtual boundaries enabled flag is 1 and a value of the SPS virtual boundaries present flag is 1, the SPS may include information on the number of the SPS vertical virtual boundaries, information on the SPS vertical virtual boundaries position, information on the number of the SPS horizontal virtual boundaries, and information on the SPS horizontal virtual boundaries position. In an example, the number of pieces of information on the SPS vertical virtual boundaries position may be determined based on the information on the number of the SPS vertical virtual boundaries, and the number of pieces of information on the SPS horizontal virtual boundaries position may be determined based on the information on the number of the SPS horizontal virtual boundaries. The picture header may include a PH virtual boundaries present flag, based on the virtual boundaries enabled flag and the SPS virtual boundaries present flag.

For example, when a value of the virtual boundaries enabled flag is 1 and a value of the SPS virtual boundaries present flag is 0, the picture header may include the PH virtual boundaries present flag. Based on the PH virtual boundaries present flag, the picture header may include information on the number of PH vertical virtual boundaries (ph_num_ver_virtual_boundaries), information on a PH vertical virtual boundaries position (ph_virtual_boundaries_pos_x[i]), information on the number of PH horizontal virtual boundaries (ph_num_hor_virtual_boundaries), and information on a PH horizontal virtual boundaries position (ph_virtual_boundaries_pos_y[i]).

For example, when a value of the PH virtual boundaries present flag is 1, the picture header may include information on the number of PH vertical virtual boundaries, information on the PH vertical virtual boundaries position, information on the number of PH horizontal virtual boundaries, and information on the PH horizontal virtual boundaries position. In an example, the number of pieces of information on the PH vertical virtual boundaries position may be determined based on the information on the number of the PH vertical virtual boundaries, and the number of pieces of information on the PH horizontal virtual boundaries position may be determined based on the information on the number of the PH horizontal virtual boundaries.

In another embodiment of the present document, whether syntax elements for indicating virtual boundaries are included in the SPS may be controlled by flag(s). For example, the number of flag(s) may be 2 (e.g., SPS virtual boundaries present flag, SPS PH virtual boundaries present flag).

In an example according to the present embodiment, the SPS virtual boundaries present flag may be referred to as sps_loop_filter_across_virtual_boundaries_disabled_present_flag (or sps_virtual_boundaries_present_flag). The SPS virtual boundaries present flag may indicate whether virtual boundaries information is included in the SPS.

In an example according to the disclosure, the SPS PH virtual boundaries present flag may be referred to as sps_ph_loop_filter_across_virtual_boundaries_disabled_present_flag.

The SPS PH virtual boundaries present flag may indicate whether virtual boundaries information is included in a picture header (PH).

In an example according to the present embodiment, it may be further constrained that, when the SPS virtual boundaries present flag (sps_loop_filter_across_virtual_boundaries_disabled_present_flag) is 1, the SPS PH virtual boundaries present flag (sps_ph_loop_filter_across_virtual_boundaries_disabled_present_flag) is not present and is inferred to be 0.

In an example according to the present embodiment, when the SPS PH virtual boundaries present flag (sps_ph_loop_filter_across_virtual_boundaries_disabled_present_flag) is 1, the signaling information for disabling the loop filter across the virtual boundaries may be included in the PH.

FIG. 33 shows an exemplary syntax of the SPS according to the present embodiment.

FIG. 34 shows an exemplary semantics of syntax elements included in the syntax.

FIG. 35 shows an exemplary syntax of the header information (the picture header) according to the present embodiment.

FIG. 36 to FIG. 37 show an exemplary semantics of syntax elements included in the syntax.

In an embodiment related to FIG. 33 to FIG. 37, image information obtained by the encoding apparatus and/or image information obtained through a bitstream received from the encoding apparatus to the decoding apparatus may include a sequence parameter set (SPS) and a picture header (PH). The SPS may include an SPS virtual boundaries present flag (sps_loop_filter_across_virtual_boundaries_disabled_present_flag). Based on the SPS virtual boundaries present flag, the SPS may include information on the number of SPS vertical virtual boundaries (sps_num_ver_virtual_boundaries), information on an SPS vertical virtual boundary position (sps_virtual_boundaries_pos_x[i]), information on the number of SPS horizontal virtual boundaries (sps_num_hor_virtual_boundaries), and information on an SPS horizontal virtual boundary position (sps_virtual_boundaries_pos_y[i]).

For example, when a value of the SPS virtual boundaries present flag is 1, the SPS may include information on the number of SPS vertical virtual boundaries, information on the SPS vertical virtual boundary position, information on the number of SPS horizontal virtual boundaries, and information on the SPS horizontal virtual boundary position. In an example, the number of pieces of information on the SPS vertical virtual boundaries position may be determined based on information on the SPS vertical virtual boundaries, and the number of pieces of information on the SPS horizontal virtual boundaries position may be determined based on the number of SPS horizontal virtual boundaries. The SPS may include the SPS PH virtual boundaries present flag, based on the SPS virtual boundaries present flag.

For example, when a value of the SPS virtual boundaries present flag is 0, the SPS may include an SPS PH virtual boundaries present flag. The picture header may include a PH virtual boundaries present flag, based on the SPS PH virtual boundaries present flag. For example, when a value of the SPS PH virtual boundaries present flag is 1, the picture header may include the PH virtual boundaries present flag. Based on the PH virtual boundaries present flag, the picture header may include information on the number of PH vertical virtual boundaries (ph_num_ver_virtual_boundaries), information on a PH vertical virtual boundaries position (ph_virtual_boundaries_pos_x[i]), information on the number of PH horizontal virtual boundaries (ph_num_hor_virtual_boundaries), and information on a PH horizontal virtual boundaries position (ph_virtual_boundaries_pos_y[i]).

For example, when a value of the PH virtual boundaries present flag is 1, the picture header may include information on the number of PH vertical virtual boundaries, information on the PH vertical virtual boundaries position, information on the number of PH horizontal virtual boundaries, and information on the PH horizontal virtual boundaries position. In an example, the number of pieces of information on the PH vertical virtual boundaries position may be determined based on the information on the number of the PH vertical virtual boundaries, and the number of pieces of information on the PH horizontal virtual boundaries position may be determined based on the information on the number of the PH horizontal virtual boundaries.

In another embodiment of the present document, when gradual decoding refresh (GDR) is available (i.e., a value of gdr_enabled_flag is 1), a feature in which loop filters are disabled at virtual boundaries is enabled, and virtual boundaries information may be signaled in a picture header (may be included in the picture header).

In another embodiment of the present document, when a function of disabling loop filters across virtual boundaries is enabled, information on signaling of a position of the virtual boundaries may be included in one or more parameter sets. For example, when the function of disabling the loop filters across the virtual boundaries is enabled, the information on the position of the virtual boundaries may be included in an SPS and a picture header.

In the present embodiment, when the SPS virtual boundaries enabled flag (sps_loop_filter_across_virtual_boundaries_disabled_flag) is 1 and signalling information on a position of virtual boundaries is included in one or more parameter sets, the followings may be applied.

a) Signalling information on the position of the virtual boundaries may be included only in the SPS, or included only in the picture header, or included both in the SPS and the picture header.

b) VirtualBoundariesDisabledFlag for each picture may be derived as follows.

When sps_loop_filter_across_virtual_boundaries_disabled_flag is 0, VirtualBoundariesDisabledFlag may be set to 0.

In another case of the present example, when the information on the position of the virtual boundaries is not signaled both in an SPS and a picture header associated with a picture, VirtualBoundariesDisabledFlag may be set to 0.

In other cases of the present example (when the position of the virtual boundaries is signaled only in the SPS or only in the picture header or both in the SPS and the picture header), VirtualBoundariesDisabledFlag may be set to 1.

c) Virtual boundaries applied to the picture may include a union of virtual boundaries signaled in a parameter set which is directly or indirectly referred to by the picture. For example, the virtual boundaries may include virtual boundaries (if present) signaled in the SPS. For example, the virtual boundaries may include virtual boundaries (if present) signaled in the picture associated with the picture.

d) A constraint may be applied such that the maximum number of virtual boundaries per picture does not exceed a pre-defined value. For example, the predefined value may be 8.

e) It may be further constrained that information (if present) on a position of a virtual boundary signaled in a picture header shall not coincide with information on virtual boundary positions included in another parameter set (e.g., SPS or PPS).

Alternatively, for any virtual boundary position applied to the current picture, the virtual boundary position (e.g., the same virtual boundary position signaled in the SPS and the picture header associated with the picture) may be included in two different parameter sets.

f) It may be further constrained that, when the SPS virtual boundaries present flag (sps_loop_filter_across_virtual_boundaries_disabled_present_flag) is 1, the SPS PH virtual boundaries present flag (sps_ph_loop_filter_across_virtual_boundaries_disabled_present_flag) is not present and is inferred to be 0.

FIG. 38 shows an exemplary syntax of the SPS according to the present embodiment.

FIG. 39 shows an exemplary semantics of syntax elements included in the syntax.

FIG. 40 shows an exemplary syntax of the header information (the picture header) according to the present embodiment.

FIG. 41 to FIG. 42 show an exemplary semantics of syntax elements included in the syntax.

In an embodiment related to FIG. 38 to FIG. 42, image information obtained by the encoding apparatus and/or image information obtained through a bitstream received from the encoding apparatus to the decoding apparatus may include a sequence parameter set (SPS) and a picture header (PH). The SPS may include a virtual boundaries enabled flag (sps_loop_filter_across_virtual_boundaries_disabled_flag). The SPS may include an SPS virtual boundaries present flag (sps_loop_filter_across_virtual_boundaries_disabled_present_flag), based on the virtual boundaries enabled flag. For example, when a value of the virtual boundaries enabled flag is 1, the SPS may include the SPS virtual boundaries present flag. Based on the virtual boundaries enabled flag and the SPS virtual boundaries present flag, the SPS may include information on the number of SPS vertical virtual boundaries (sps_num_ver_virtual_boundaries), information on an SPS vertical virtual boundaries position (sps_virtual_boundaries_pos_x[i]), information on the number of SPS horizontal virtual boundaries (sps_num_hor_virtual_boundaries), and information on an SPS horizontal virtual boundaries position (sps_virtual_boundaries_pos_y[i]).

For example, when a value of the virtual boundaries enabled flag is 1 and a value of the SPS virtual boundaries present flag is 1, the SPS may include information on the number of the SPS vertical virtual boundaries, information on the SPS vertical virtual boundaries position, information on the number of the SPS horizontal virtual boundaries, and information on the SPS horizontal virtual boundaries position. In an example, the number of pieces of information on the SPS vertical virtual boundaries position may be determined based on the information on the number of the SPS vertical virtual boundaries, and the number of pieces of information on the SPS horizontal virtual boundaries position may be determined based on the information on the number of the SPS horizontal virtual boundaries. The picture header may include a PH virtual boundaries present flag, based on the virtual boundaries enabled flag.

For example, when a value of the virtual boundaries enabled flag is 1, the picture header may include the PH virtual boundaries present flag. Based on the PH virtual boundaries present flag, the picture header may include information on the number of PH vertical virtual boundaries (ph_num_ver_virtual_boundaries), information on a PH vertical virtual boundaries position (ph_virtual_boundaries_pos_x[i]), information on the number of PH horizontal virtual boundaries (ph_num_hor_virtual_boundaries), and information on a PH horizontal virtual boundaries position (ph_virtual_boundaries_pos_y[i]). For example, when a value of the PH virtual boundaries present flag is 1, the picture header may include information on the number of PH vertical virtual boundaries, information on the PH vertical virtual boundaries position, information on the number of PH horizontal virtual boundaries, and information on the PH horizontal virtual boundaries position. In an example, the number of pieces of information on the PH vertical virtual boundaries position may be determined based on the information on the number of the PH vertical virtual boundaries, and the number of pieces of information on the PH horizontal virtual boundaries position may be determined based on the information on the number of the PH horizontal virtual boundaries.

In another embodiment of the present document, loop filtering may be performed according to the aforementioned embodiments by not restricting that a sum of the number of vertical virtual boundaries and the number of horizontal virtual boundaries is greater than 0.

In another embodiment of the present document, information on the virtual boundary may be signaled in both the SPS and the PH. In an example of the present embodiment, when a value of the SPS virtual boundaries enabled flag (sps_loop_filter_across_virtual_boundaries_disabled_flag) is 1, information on the number of vertical virtual boundaries, information on the number of horizontal virtual boundaries, and/or information on a virtual boundaries position may be included in the SPS. In addition thereto, when the value of the SPS virtual boundaries enabled flag (sps_loop_filter_across_virtual_boundaries_disabled_flag) is 1, information on the number of vertical virtual boundaries, information on the number of horizontal virtual boundaries, and/or information on a virtual boundaries position delta value (a delta value of a virtual boundaries position) may be included in the picture header. The delta value of the virtual boundaries position may refer to a difference between positions of virtual boundaries. Information on a sign of the virtual boundaries position may also be included in the picture header.

According to an example of the present embodiment, in order to derive virtual boundaries positions for respective pictures, if the delta value of the virtual boundaries position is not present in the picture header, information on the virtual boundaries position, signaled in the SPS, may be used for loop filtering. If the delta value of the virtual boundaries position is present in the picture header, the virtual boundaries position may be derived based on a sum of information on the virtual boundaries position, signaled in the SPS, and a delta value related thereto.

FIG. 43 shows an exemplary syntax of the SPS according to the present embodiment.

FIG. 44 shows an exemplary semantics of syntax elements included in the syntax.

FIG. 45 shows an exemplary syntax of the header information (the picture header) according to the present embodiment.

FIG. 46 to FIG. 47 show an exemplary semantics of syntax elements included in the syntax.

In an embodiment related to FIG. 43 to FIG. 47, image information obtained by the encoding apparatus and/or image information obtained through a bitstream received from the encoding apparatus to the decoding apparatus may include a sequence parameter set (SPS) and a picture header (PH). The SPS may include a virtual boundaries enabled flag (sps_loop_filter_across_virtual_boundaries_disabled_flag). Based on the virtual boundaries enabled flag, the SPS may include information on the number of SPS vertical virtual boundaries (sps_num_ver_virtual_boundaries), information on an SPS vertical virtual boundaries position (sps_virtual_boundaries_pos_x[i]), information on the number of SPS horizontal virtual boundaries (sps_num_hor_virtual_boundaries), and information on an SPS horizontal virtual boundaries position (sps_virtual_boundaries_pos_y[i]). For example, when a value of the virtual boundaries enabled flag is 1, the SPS may include information on the number of the SPS horizontal virtual boundaries, information on the SPS horizontal virtual boundaries position, information on the number of the SPS vertical virtual boundaries, and information on the SPS vertical virtual boundaries position.

In an example, the number of pieces of information on the SPS horizontal virtual boundaries position may be determined based on the information on the number of the SPS horizontal virtual boundaries, and the number of pieces of information on the SPS vertical virtual boundaries position may be determined based on the information on the number of the SPS vertical virtual boundaries. The picture header may include a PH virtual boundaries present flag, based on the virtual boundaries enabled flag. For example, when a value of the virtual boundaries enabled flag is 1, the picture header may include the PH virtual boundaries present flag. Based on the PH virtual boundaries present flag, the picture header may include information on a delta value of a PH horizontal virtual boundaries position (ph_virtual_boundaries_pos_x_delta[i]), information on a sign of the PH horizontal virtual boundaries position (ph_virtual_boundaries_pos_x_sign[i]), information on a delta value of a PH vertical virtual boundaries position (ph_virtual_boundaries_pos_y_delta[i]), and information on a sign of the PH vertical virtual boundaries position (ph_virtual_boundaries_pos_y_sign[i]).

For example, when a value of the PH virtual boundaries present flag is 1, the picture header may include information on the PH vertical virtual boundaries position delta value, information on a sign of the PH vertical virtual boundaries position, information on the PH horizontal virtual boundaries position delta value, and information a sign of the PH horizontal virtual boundaries position. In an example, the number of pieces of information on the PH vertical virtual boundaries position delta value and information on the number of pieces of information on a sign of the PH vertical virtual boundaries position may be determined based on information on the number of SPS vertical virtual boundaries, and the number of pieces of information on the PH horizontal virtual boundaries position delta value and information on the number of pieces of information a sign of the PH horizontal virtual boundaries position may be determined based on information on the number of the SPS horizontal virtual boundaries.

In another embodiment of the present document, signaling of information on a virtual boundaries position for each picture will be described. In an example, when the information on the virtual boundaries position is included in the SPS and the information on the virtual boundaries position delta value is not included in the picture header, information on the virtual boundaries, included in the SPS, may be used for loop filtering. When the information on the virtual boundaries position is not included in the SPS and the information on the virtual boundaries position delta value is included in the picture header, information on the virtual boundaries, included in the picture header, may be used for loop filtering. When the information on the virtual boundaries position is included in the SPS and the information on the virtual boundaries position delta value is included in the picture header, the virtual boundaries position may be derived based on a sum of information on the virtual boundaries position, signed in the SPS, and a delta value related thereto. When the information on the virtual boundaries position is not included in the SPS and the information on the virtual boundaries position delta value is not included in the picture header, the virtual boundary may not be applied to the picture.

FIG. 48 shows an exemplary syntax of the SPS according to the present embodiment.

FIG. 49 shows an exemplary semantics of syntax elements included in the syntax.

FIG. 50 shows an exemplary syntax of the header information (the picture header) according to the present embodiment.

FIG. 51 to FIG. 52 show an exemplary semantics of syntax elements included in the syntax.

In an embodiment related to FIG. 48 to FIG. 52, image information obtained by the encoding apparatus and/or image information obtained through a bitstream received from the encoding apparatus to the decoding apparatus may include a sequence parameter set (SPS) and a picture header (PH).

The SPS may include a virtual boundaries enabled flag (sps_loop_filter_across_virtual_boundaries_disabled_flag). The SPS may include an SPS virtual boundaries present flag (sps_loop_filter_across_virtual_boundaries_disabled_present_flag), based on the virtual boundaries enabled flag. For example, when a value of the virtual boundaries enabled flag is 1, the SPS may include the SPS virtual boundaries present flag. Based on the virtual boundaries enabled flag and the SPS virtual boundaries present flag, the SPS may include information on the number of SPS vertical virtual boundaries (sps_num_ver_virtual_boundaries), information on an SPS vertical virtual boundaries position (sps_virtual_boundaries_pos_x[i]), information on the number of SPS horizontal virtual boundaries (sps_num_hor_virtual_boundaries), and information on an SPS horizontal virtual boundaries position (sps_virtual_boundaries_pos_y[i]).

For example, when a value of the virtual boundaries enabled flag is 1 and a value of the SPS virtual boundaries present flag is 1, the SPS may include information on the number of the horizontal virtual boundaries, information on the horizontal virtual boundaries position, information on the number of the vertical virtual boundaries, and information on the vertical virtual boundaries position. In an example, the number of pieces of information on the horizontal virtual boundaries position may be determined based on the information on the number of the horizontal virtual boundaries, and the number of pieces of information on the vertical virtual boundaries position may be determined based on the information on the number of the vertical virtual boundaries. The picture header may include a PH virtual boundaries present flag, based on the virtual boundaries enabled flag.

For example, when a value of the virtual boundaries enabled flag is 1, the picture header may include the PH virtual boundaries present flag. The picture header may include information on the number of PH vertical virtual boundaries (ph_num_ver_virtual_boundaries), based on the PH virtual boundaries present flag and information on the number of the SPS vertical virtual boundaries. For example, when a value of the PH virtual boundaries present flag is 1 and a value of the information on the number of the SPS vertical virtual boundaries is 0, the picture header may include information on the number of the PH vertical virtual boundaries. In an example, based on information on the number of the PH vertical virtual boundaries, the picture header may include information on a delta value of a PH vertical virtual boundaries position (ph_virtual_boundaries_pos_x_delta[i]) and information on a sign of the PH vertical virtual boundaries position (ph_virtual_boundaries_pos_x_sign[i]). In an example, based on the information on the number of the PH vertical virtual boundaries, the number of pieces of information on the PH vertical virtual boundaries position delta value and the number of pieces of information on a sign of the PH vertical virtual boundaries position may be determined. The picture header may include information on the number of PH horizontal virtual boundaries (ph_num_ hor_virtual_boundaries), based on the PH virtual boundaries present flag and information on the number of the SPS horizontal virtual boundaries.

For example, when a value of the PH virtual boundaries present flag is 1 and a value of the information on the number of the SPS horizontal virtual boundaries is 0, the picture header may include information on the number of the PH horizontal virtual boundaries. In an example, based on information on the number of the PH horizontal virtual boundaries, the picture header may include information on a delta value of a PH horizontal virtual boundaries position (ph_virtual_boundaries_pos_y_delta[i]) and information on a sign of the PH horizontal virtual boundaries position (ph_virtual_boundaries_pos_y_sign[i]). In an example, based on the information on the number of the PH horizontal virtual boundaries, the number of pieces of information on the PH horizontal virtual boundaries position delta value and the number of pieces of information on a sign of the PH horizontal virtual boundaries position may be determined.

According to embodiments of the present document together with the tables above, information required to control in-loop filtering performed across virtual boundaries may be effectively signaled by a coding apparatus. In an example, information related to whether in-loop filtering is available across the virtual boundaries may be signaled.

Figure 9:
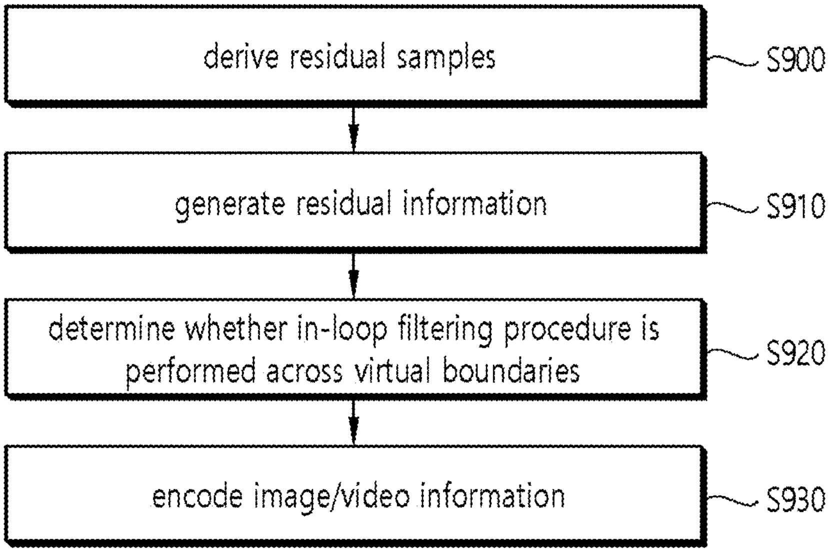
FIG. 9 and FIG. 10 schematically show an example of a video/image encoding method and related components according to embodiment(s) of the present document.
Figure 10:
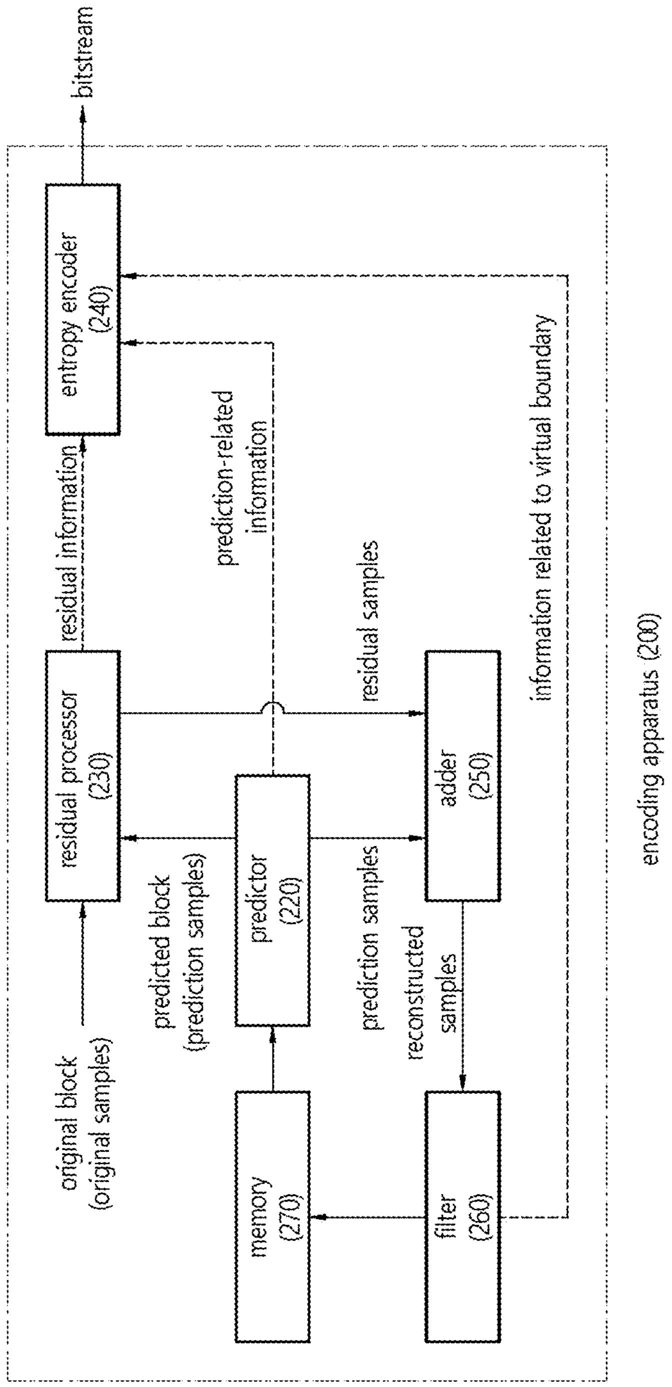

FIG. 9 and FIG. 10 schematically show an example of a video/image encoding method and related components according to embodiment(s) of the present document.

The method disclosed in FIG. 9 may be performed by the encoding apparatus disclosed in FIG. 2 or FIG. 10. Specifically, for example, S900 and S910 of FIG. 9 may be performed by a residual processor 230 of the encoding apparatus of FIG. 10, S920 of FIG. 9 may be performed by a filter 260 of the encoding apparatus of FIG. 10, and S930 of FIG. 9 may be performed by an entropy encoder 240 of the encoding apparatus of FIG. 10. In addition, although not shown in FIG. 9, prediction samples or prediction-related information may be derived by a predictor 220 of the encoding apparatus of FIG. 9, and a bitstream may be generated from the residual information or the prediction-related information by the entropy encoder 240 of the encoding device. The method disclosed in FIG. 9 may include the aforementioned embodiments in the present document.

Referring to FIG. 9, the encoding apparatus may derive residual samples (S900). The encoding apparatus may derive residual samples for a current block, and the residual samples for the current block may be derived based on original samples and prediction samples of the current block. Specifically, the encoding apparatus may derive the prediction samples of the current blocks, based on a prediction mode. In this case, various prediction methods disclosed in the present document, such as inter prediction or intra prediction, may be applied. The residual samples may be derived based on the prediction samples and the original samples.

The encoding apparatus may derive transform coefficients. The encoding apparatus may derive the transform coefficients, based on a transform process for the residual samples. For example, the transform process may include at least one of a discrete cosine transform (DCT), a discrete sine transform (DST), a graph-based transform (GBT), and a conditionally non-linear transform (CNT).

The encoding apparatus may derive quantized transform coefficients. The encoding apparatus may derive the quantized transform coefficients, based on a quantization process for the transform coefficients. The quantized transform coefficients may have a 1-dimensional vector form, based on a coefficient scan order.

The encoding apparatus may generate residual information (S910). The encoding apparatus may generate the residual information, based on the residual samples for the current block. The encoding apparatus may generate residual information indicating the quantized transform coefficients. The residual information may be generated through various encoding methods such as exponential Golomb, CAVLC, CABAC, or the like.

The encoding apparatus may generate reconstructed samples. The encoding apparatus may generate the reconstructed samples, based on the residual information. The reconstructed samples may be generated by adding the prediction sample and the residual samples based on the residual information. Specifically, the encoding apparatus may perform prediction (intra or inter prediction) on the current block, and may generate reconstructed samples, based on original samples and the prediction samples generated from the prediction.

The reconstructed samples may include reconstructed luma samples and reconstructed chroma samples. Specifically, the residual samples may include residual luma samples and residual chroma samples. The residual luma samples may be generated based on original luma samples and prediction luma samples. The residual chroma samples may be generated based on the original chroma samples and the prediction chroma samples. The encoding apparatus may derive transform coefficients for the residual luma samples (luma transform coefficients) and/or transform coefficients for the residual chroma samples (chroma transform coefficients). Quantized transform coefficients may include quantized luma transform coefficients and/or quantized chroma transform coefficients.

The encoding apparatus may determine whether the in-loop filtering process is performed for reconstructed samples of a current picture across virtual boundaries (S920). The virtual boundaries may be described according to the aforementioned content. The in-loop filtering process may include at least one of a deblocking process, an SAO process, and an ALF process.

The encoding apparatus may encode video/image information (S930). The encoding apparatus may encode the video/image information based on the residual information and the determination of the step S920. For example, the encoding apparatus may generate in-loop filtering-related information and/or virtual boundaries-related information, based on the determination of the step S920. The video/image information may include the residual information and the in-loop filtering-related information (and/or the virtual boundaries-related information). The image information may include prediction-related information regarding prediction for coding. The encoded video/image information may be output in the form of a bitstream. The bitstream may be transmitted to a decoding apparatus through a network or a storage medium.

The image/video information may include a variety of information according to an embodiment of the present document. For example, the image/video may include information disclosed in at least one of FIG. 14 to FIG. 52.

In an embodiment, the image information may include an SPS. The SPS may include an SPS virtual boundaries enabled flag. The encoding apparatus may generate the SPS virtual boundaries enabled flag, based on the determination of the step S920. For example, it may be determined that the in-loop filtering process is performed across the virtual boundaries, based on the SPS virtual boundaries enabled flag (or it may be determined that the process is performed not across the virtual boundaries). The SPS virtual boundaries enabled flag may indicate whether it is possible to disable the in-loop filtering process across the virtual boundaries.

In an embodiment, the SPS may include an SPS virtual boundaries present flag. For example, whether information on positions of the virtual boundaries and information on the number of the virtual boundaries are included in the SPS may be determined based on the SPS virtual boundaries present flag.

In an embodiment, the SPS may include information on the number of vertical virtual boundaries, based on that a value of the SPS virtual boundaries present flag is 1.

In an embodiment, the SPS may include information on positions of the vertical virtual boundaries. In addition, the number of pieces of the information on positions of the vertical virtual boundaries may be determined based on the information on the number of vertical virtual boundaries.

In an embodiment, the SPS may include information on the number of horizontal virtual boundaries, based on that a value of the SPS virtual boundaries present flag is 1.

In an embodiment, the SPS may include information on positions of the horizontal virtual boundaries. In addition, the number of pieces of the information on positions of the horizontal virtual boundaries may be determined based on the information on the number of horizontal virtual boundaries.

In an embodiment, the image information includes picture header information. In addition, the picture header information may include a picture header virtual boundaries present flag, based on that a value of the SPS virtual boundaries enabled flag is 1 and a value of the SPS virtual boundaries present flag is 0.

In addition, the picture header information may include information on the number of vertical virtual boundaries, based on that a value of the picture header virtual boundaries present flag is 1.

In an embodiment, the picture header information may include information on positions of vertical virtual boundaries. In addition, the number of pieces of the information on positions of the vertical virtual boundaries may be determined based on the information on the number of vertical virtual boundaries.

In addition, the picture header information may include information on the number of horizontal virtual boundaries, based on that a value of the picture header virtual boundaries present flag is 1.

In an embodiment, the picture header information may include information on positions of the horizontal virtual boundaries. In addition, the number of pieces of the information on positions of the horizontal virtual boundaries may be determined based on the information on the number of horizontal virtual boundaries.

In an embodiment, a sum of the number of vertical virtual boundaries and the number of horizontal virtual boundaries may be greater than 0, based on that the SPS includes information on positions of the vertical virtual boundaries and information on positions of the horizontal virtual boundaries.

In an embodiment, the image information (and/or in-loop filtering-related information, virtual boundaries-related information) may further include an SPS virtual boundaries present flag, a picture header virtual boundaries present flag, and a gradual decoding refresh (GDR) enabled flag. For example, based on that a value of the GDR enabled flag is 1, a value of the SPS virtual boundaries enabled flag (the virtual boundaries enabled flag) may be 1, a value of the SPS virtual boundaries present flag may be 0, and a value of the picture header virtual boundaries present flag may be 1 (signaling of the virtual boundaries-related information may be present in the picture header).

Figure 11:
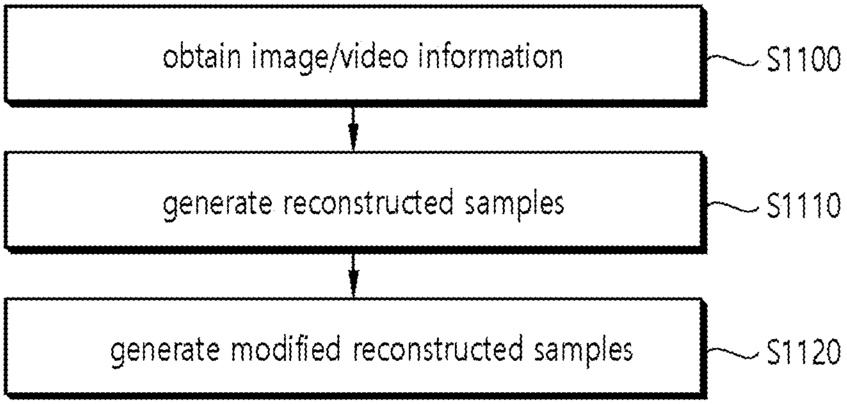
FIG. 11 and FIG. 12 schematically show an example of an image/video decoding method and related components according to an embodiment(s) of the present document.
Figure 12:
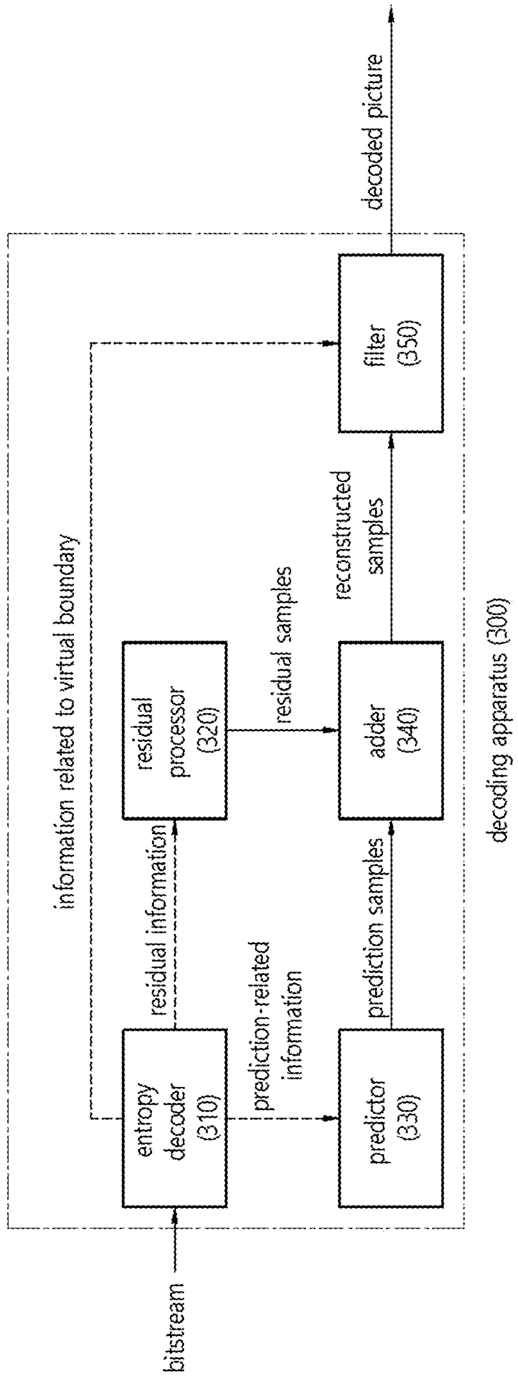

FIG. 11 and FIG. 12 schematically show an example of a video/image decoding method and related components according to embodiment(s) of the present document.

The method disclosed in FIG. 11 may be performed by the decoding apparatus disclosed in FIG. 3 or FIG. 12. Specifically, for example, S1100 of FIG. 11 may be performed by an entropy decoder 310 of the decoding apparatus, S1110 may be performed by a residual processor 320 and/or adder 340 of the decoding apparatus, and S1120 may be performed by a filter 350 of the decoding apparatus. The method disclosed in FIG. 11 may include the aforementioned embodiments in the present document.

Referring to FIG. 11, the decoding apparatus may receive/obtain video/image information (S1100). The video/image information may include at least one of residual information, prediction-related information, and/or in-loop filtering-related information (and/or virtual boundaries-related information). The decoding apparatus may receive/obtain the image/video information through a bitstream.

The image/video information may include a variety of information according to an embodiment of the present document. For example, the image/video may include information disclosed in at least one of FIG. 14 to FIG. 52.

The decoding apparatus may derive quantized transform coefficients. The decoding apparatus may derive the quantized transform coefficients, based on the residual information. The quantized transform coefficients may have a 1-dimensional vector form, based on a coefficient scan order. Quantized transform coefficients may include quantized luma transform coefficients and/or quantized chroma transform coefficients.

The decoding apparatus may derive the transform coefficients. The decoding apparatus may derive the transform coefficients, based on a dequantization process for the quantized transform coefficients. The decoding apparatus may derive luma transform coefficients through dequantization, based on the quantized luma transform coefficients. The decoding apparatus may derive chroma transform coefficients through dequantization, based on the quantized chroma transform coefficients.

The decoding apparatus may generate/derive residual samples. The decoding apparatus may derive the residual samples, based on the inverse-transform process for the transform coefficients. The decoding apparatus may derive residual luma samples through the inverse-transform process, based on the luma transform coefficients. The decoding apparatus may derive residual chroma samples through the inverse-transform, based on the chroma transform coefficients.

The decoding apparatus may generate/derive reconstructed samples (S1110). For example, the decoding apparatus may generate/derive reconstructed luma samples and/or reconstructed chroma samples. The decoding apparatus may generate the reconstructed luma samples and/or the reconstructed chroma samples, based on the residual information. The decoding apparatus may generate reconstructed samples, based on the residual information. The reconstructed samples may include the reconstructed luma samples and/or the reconstructed chroma samples. A luma component of the reconstructed samples may correspond to the reconstructed luma samples, and a chroma component of the reconstructed samples may correspond to the reconstructed chroma samples. The decoding apparatus may generate prediction luma samples and/or prediction chroma samples through a prediction process. The decoding apparatus may generate the reconstructed luma samples, based on the prediction luma samples and the residual luma samples. The decoding apparatus may generate the reconstruction chroma samples, based on the prediction chroma samples and the residual chroma samples.

The decoding apparatus may generate modified (filtered) reconstructed samples (S1120). The decoding apparatus may generate the modified reconstructed samples by performing an in-loop filtering process for the reconstructed samples of the current picture. The decoding apparatus may generate the modified reconstructed samples, based on in-loop filtering-related information (and/or virtual boundaries-related information). The decoding apparatus may use a deblocking process, an SAO process, and/or an ALF process to generate the modified reconstructed samples.

The step S1120 may include determining whether the in-loop filtering process is performed across the virtual boundaries. That is, the decoding apparatus may determine whether the in-loop filtering process is performed across the virtual boundaries. The decoding apparatus may determine whether the in-loop filtering process is performed based on the in-loop filtering-related information (and/or the virtual boundaries-related information).

In an embodiment, the image information may include an SPS. The SPS may include an SPS virtual boundaries enabled flag. For example, it may be determined that the in-loop filtering process is performed across the virtual boundaries, based on the SPS virtual boundaries enabled flag (or it may be determined that the process is performed not across the virtual boundaries). The SPS virtual boundaries enabled flag may indicate whether it is possible to disable the in-loop filtering process across the virtual boundaries.

In an embodiment, the SPS may include an SPS virtual boundaries present flag. For example, whether information on positions of the virtual boundaries and information on the number of the virtual boundaries are included in the SPS may be determined based on the SPS virtual boundaries present flag.

In an embodiment, the SPS may include information on the number of vertical virtual boundaries, based on that a value of the SPS virtual boundaries present flag is 1.

In an embodiment, the SPS may include information on positions of the vertical virtual boundaries. In addition, the number of pieces of the information on positions of the vertical virtual boundaries may be determined based on the information on the number of vertical virtual boundaries.

In an embodiment, the SPS may include information on the number of horizontal virtual boundaries, based on that a value of the SPS virtual boundaries present flag is 1.

In an embodiment, the SPS may include information on positions of the horizontal virtual boundaries. In addition, the number of pieces of the information on positions of the horizontal virtual boundaries may be determined based on the information on the number of horizontal virtual boundaries.

In an embodiment, the image information includes picture header information. In addition, the picture header information may include a picture header virtual boundaries present flag, based on that a value of the SPS virtual boundaries enabled flag is 1 and a value of the SPS virtual boundaries present flag is 0.

In addition, the picture header information may include information on the number of vertical virtual boundaries, based on that a value of the picture header virtual boundaries present flag is 1.

In an embodiment, the picture header information may include information on positions of vertical virtual boundaries. In addition, the number of pieces of the information on positions of the vertical virtual boundaries may be determined based on the information on the number of vertical virtual boundaries.

In addition, the picture header information may include information on the number of horizontal virtual boundaries, based on that a value of the picture header virtual boundaries present flag is 1.

In an embodiment, the picture header information may include information on positions of the horizontal virtual boundaries. In addition, the number of pieces of the information on positions of the horizontal virtual boundaries may be determined based on the information on the number of horizontal virtual boundaries.

In an embodiment, a sum of the number of vertical virtual boundaries and the number of horizontal virtual boundaries may be greater than 0, based on that the SPS includes information on positions of the vertical virtual boundaries and information on positions of the horizontal virtual boundaries.

In an embodiment, the image information (and/or in-loop filtering-related information, virtual boundaries-related information) may further include an SPS virtual boundaries present flag, a picture header virtual boundaries present flag, and a gradual decoding refresh (GDR) enabled flag. For example, based on that a value of the GDR enabled flag is 1, a value of the SPS virtual boundaries enabled flag (the virtual boundaries enabled flag) may be 1, a value of the SPS virtual boundaries present flag may be 0, and a value of the picture header virtual boundaries present flag may be 1 (signaling of the virtual boundaries-related information may be present in the picture header).

In the presence of the residual sample for the current block, the decoding apparatus may receive residual information for a current block. The residual information may include a transform coefficient for residual samples. The decoding apparatus may derive residual samples (or a residual sample array) for the current block, based on the residual information. Specifically, the decoding apparatus may derive quantized transform coefficients, based on the residual information. The quantized transform coefficients may have a 1-dimensional vector form, based on a coefficient scan order. The decoding apparatus may derive the transform coefficients, based on a dequantization process for the quantized transform coefficients. The decoding apparatus may derive residual samples, based on the transform coefficients.

The decoding apparatus may generate reconstructed samples, based on (intra) prediction samples and residual samples, and may derive a reconstructed block or reconstructed picture, based on the reconstructed samples. Specifically, the decoding apparatus may include reconstructed samples, based on a sum between the (intra) prediction samples and the residual samples. Thereafter, as described above, the decoding apparatus may optionally apply the in-loop filtering process such as the deblocking filtering and/or the SAO process to the reconstructed picture to improve subjective/objective image quality.

For example, the decoding apparatus may obtain image information including all or parts of the above-described pieces of information (or syntax elements) by decoding the bitstream or the encoded information. Further, the bitstream or the encoded information may be stored in a computer readable storage medium, and may cause the above-described decoding method to be performed.

Although methods have been described on the basis of a flowchart in which steps or blocks are listed in sequence in the above-described embodiments, the steps of the present document are not limited to a certain order, and a certain step may be performed in a different step or in a different order or concurrently with respect to that described above. Further, it will be understood by those ordinary skilled in the art that the steps of the flowcharts are not exclusive, and another step may be included therein or one or more steps in the flowchart may be deleted without exerting an influence on the scope of the present disclosure.

The aforementioned method according to the present disclosure may be in the form of software, and the encoding apparatus and/or decoding apparatus according to the present disclosure may be included in a device for performing image processing, for example, a TV, a computer, a smart phone, a set-top box, a display device, or the like.

When the embodiments of the present disclosure are implemented by software, the aforementioned method may be implemented by a module (process or function) which performs the aforementioned function. The module may be stored in a memory and executed by a processor. The memory may be installed inside or outside the processor and may be connected to the processor via various well-known means. The processor may include Application-Specific Integrated Circuit (ASIC), other chipsets, a logical circuit, and/or a data processing device. The memory may include a Read-Only Memory (ROM), a Random Access Memory (RAM), a flash memory, a memory card, a storage medium, and/or other storage device. In other words, the embodiments according to the present disclosure may be implemented and executed on a processor, a micro-processor, a controller, or a chip. For example, functional units illustrated in the respective figures may be implemented and executed on a computer, a processor, a microprocessor, a controller, or a chip. In this case, information on implementation (for example, information on instructions) or algorithms may be stored in a digital storage medium.

In addition, the decoding apparatus and the encoding apparatus to which the embodiment(s) of the present document is applied may be included in a multimedia broadcasting transceiver, a mobile communication terminal, a home cinema video device, a digital cinema video device, a surveillance camera, a video chat device, and a real time communication device such as video communication, a mobile streaming device, a storage medium, a camcorder, a video on demand (VoD) service provider, an Over The Top (OTT) video device, an internet streaming service provider, a 3D video device, a Virtual Reality (VR) device, an Augment Reality (AR) device, an image telephone video device, a vehicle terminal (for example, a vehicle (including an autonomous vehicle) terminal, an airplane terminal, or a ship terminal), and a medical video device; and may be used to process an image signal or data. For example, the OTT video device may include a game console, a Bluray player, an Internet-connected TV, a home theater system, a smartphone, a tablet PC, and a Digital Video Recorder (DVR).

In addition, the processing method to which the embodiment(s) of the present document is applied may be produced in the form of a program executed by a computer and may be stored in a computer-readable recording medium. Multimedia data having a data structure according to the embodiment(s) of the present document may also be stored in the computer-readable recording medium. The computer readable recording medium includes all kinds of storage devices and distributed storage devices in which computer readable data is stored. The computer-readable recording medium may include, for example, a Bluray disc (BD), a universal serial bus (USB), a ROM, a PROM, an EPROM, an EEPROM, a RAM, a CD-ROM, a magnetic tape, a floppy disk, and an optical data storage device. The computer-readable recording medium also includes media embodied in the form of a carrier wave (for example, transmission over the Internet). In addition, a bitstream generated by the encoding method may be stored in the computer-readable recording medium or transmitted through a wired or wireless communication network.

In addition, the embodiment(s) of the present document may be embodied as a computer program product based on a program code, and the program code may be executed on a computer according to the embodiment(s) of the present document. The program code may be stored on a computer-readable carrier.

Figure 13:
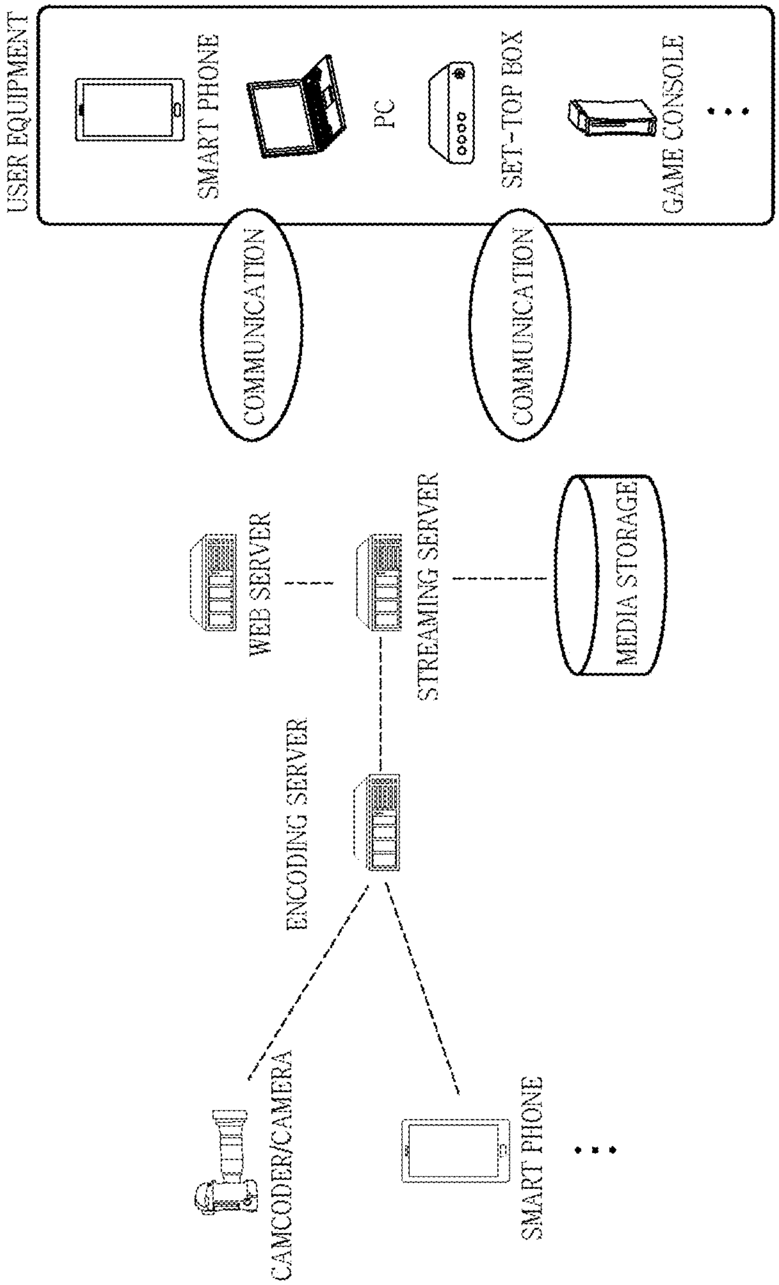
FIG. 13 shows an example of a content streaming system to which embodiment(s) disclosed in the present document may be applied.

FIG. 13 represents an example of a contents streaming system to which the embodiment of the present document may be applied.

Referring to FIG. 13, the content streaming system to which the embodiments of the present document is applied may generally include an encoding server, a streaming server, a web server, a media storage, a user device, and a multimedia input device.

The encoding server functions to compress to digital data the contents input from the multimedia input devices, such as the smart phone, the camera, the camcorder and the like, to generate a bitstream, and to transmit it to the streaming server. As another example, in a case where the multimedia input device, such as, the smart phone, the camera, the camcorder or the like, directly generates a bitstream, the encoding server may be omitted.

The bitstream may be generated by an encoding method or a bitstream generation method to which the embodiments of the present document is applied. And the streaming server may temporarily store the bitstream in a process of transmitting or receiving the bitstream.

The streaming server transmits multimedia data to the user equipment on the basis of a user's request through the web server, which functions as an instrument that informs a user of what service there is. When the user requests a service which the user wants, the web server transfers the request to the streaming server, and the streaming server transmits multimedia data to the user. In this regard, the contents streaming system may include a separate control server, and in this case, the control server functions to control commands/responses between respective equipment in the content streaming system.

The streaming server may receive contents from the media storage and/or the encoding server. For example, in a case the contents are received from the encoding server, the contents may be received in real time. In this case, the streaming server may store the bitstream for a predetermined period of time to provide the streaming service smoothly.

For example, the user equipment may include a mobile phone, a smart phone, a laptop computer, a digital broadcasting terminal, a personal digital assistant (PDA), a portable multimedia player (PMP), a navigation, a slate PC, a tablet PC, an ultrabook, a wearable device (e.g., a watch-type terminal (smart watch), a glass-type terminal (smart glass), a head mounted display (HMD)), a digital TV, a desktop computer, a digital signage or the like.

Each of servers in the contents streaming system may be operated as a distributed server, and in this case, data received by each server may be processed in distributed manner.

Claims in the present description can be combined in a various way. For example, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A decoding apparatus for image decoding, the decoding apparatus comprising:
- a memory; and
- at least one processor connected to the memory, the at least one processor configured to:
- receive a bitstream comprising image information, wherein the image information includes residual information and a sequence parameter set (SPS);
- parse an SPS virtual boundaries enabled flag included in the SPS;
- parse an SPS virtual boundaries present flag included in the SPS;
- generate reconstructed samples of a current picture, based on the residual information;
- generate modified reconstructed samples by performing an in-loop filtering process for the reconstructed samples of the current picture, and
- determine whether the in-loop filtering process is enabled across virtual boundaries,
- wherein whether the in-loop filtering process is enabled across the virtual boundaries is determined, based on the SPS virtual boundaries enabled flag,
- wherein based on the SPS virtual boundaries present flag, it is determined whether information on positions of the virtual boundaries and information on a number of the virtual boundaries are included in the SPS, and
- wherein based on a value of the SPS virtual boundaries enabled flag being 1 and a value of the SPS virtual boundaries present flag being 1, a sum of information on a number of vertical virtual boundaries and information on a number of horizontal virtual boundaries is greater than 0.

2. An encoding apparatus for image encoding, the encoding apparatus comprising:
- a memory; and
- at least one processor connected to the memory, the at least one processor configured to:
- derive residual samples for a current block;
- generate residual information, based on the residual samples for the current block;
- generate a sequence parameter set (SPS) virtual boundaries enabled flag and an SPS virtual boundaries present flag;
- determine whether an in-loop filtering process is enabled for reconstructed samples for a current picture across virtual boundaries; and
- encode image information including the residual information, the SPS virtual boundaries enabled flag and the SPS virtual boundaries present flag, based on the determination,
- wherein the image information includes a sequence parameter set (SPS),
- wherein the SPS includes the SPS virtual boundaries enabled flag and the SPS virtual boundaries present flag,
- wherein a value of the SPS virtual boundaries enabled flag is determined based on whether the in-loop filtering process is enabled across the virtual boundaries,
- wherein based on the SPS virtual boundaries present flag, it is determined whether information on positions of the virtual boundaries and information on a number of the virtual boundaries are included in the SPS, and
- wherein based on a value of the SPS virtual boundaries enabled flag being 1 and a value of the SPS virtual boundaries present flag being 1, a sum of information on a number of vertical virtual boundaries and information on a number of horizontal virtual boundaries is greater than 0.

3. An apparatus for transmitting data for an image, the apparatus comprising:
- at least one processor configured to obtain a bitstream for the image, wherein the bitstream is generated based on deriving residual samples for a current block, generating residual information, based on the residual samples for the current block, generating a sequence parameter set (SPS) virtual boundaries enabled flag and an SPS virtual boundaries present flag, determining whether an in-loop filtering process is enabled for reconstructed samples for a current picture across virtual boundaries, and encoding image information including the residual information, the SPS virtual boundaries enabled flag and the SPS virtual boundaries present flag, based on the determination; and
- a transmitter configured to transmit the data comprising the bitstream,
- wherein the image information includes a sequence parameter set (SPS),
- wherein the SPS includes the SPS virtual boundaries enabled flag and the SPS virtual boundaries present flag,
- wherein a value of the SPS virtual boundaries enabled flag is determined based on whether the in-loop filtering process is enabled across the virtual boundaries,
- wherein based on the SPS virtual boundaries present flag, it is determined whether information on positions of the virtual boundaries and information on a number of the virtual boundaries are included in the SPS, and
- wherein based on a value of the SPS virtual boundaries enabled flag being 1 and a value of the SPS virtual boundaries present flag being 1, a sum of information on a number of vertical virtual boundaries and information on a number of horizontal virtual boundaries is greater than 0.

* * * * *